United States Patent
Noguchi et al.

(10) Patent No.: US 10,496,228 B2
(45) Date of Patent: Dec. 3, 2019

(54) DISPLAY DEVICE

(71) Applicant: Japan Display Inc., Tokyo (JP)

(72) Inventors: Koji Noguchi, Tokyo (JP); Kazuyuki Kobayashi, Tokyo (JP); Yasuyuki Teranishi, Tokyo (JP); Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 289 days.

(21) Appl. No.: 15/191,018

(22) Filed: Jun. 23, 2016

(65) Prior Publication Data

US 2017/0024038 A1    Jan. 26, 2017

(30) Foreign Application Priority Data

Jul. 24, 2015 (JP) .................................. 2015-146350
Mar. 8, 2016 (JP) .................................. 2016-044631

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0414* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 9,389,743 B2 | 7/2016 | Tsuzaki et al. | |
| 9,811,226 B2 | 11/2017 | Itaya et al. | |
| 2010/0020041 A1* | 1/2010 | Park | G06F 3/0412 345/174 |
| 2013/0021295 A1* | 1/2013 | Kimura | G02F 1/13338 345/174 |
| 2013/0021544 A1 | 1/2013 | Fukuyama | |
| 2015/0331531 A1 | 11/2015 | Aoyama et al. | |

FOREIGN PATENT DOCUMENTS

| | | |
|---|---|---|
| CN | 102822777 | 12/2012 |
| JP | 2000-066837 | 3/2000 |
| JP | 2010-055213 | 3/2010 |
| JP | 2012-178050 | 9/2012 |
| JP | 2015-055896 | 3/2015 |
| WO | 2014/156066 | 10/2014 |

OTHER PUBLICATIONS

Chinese Office Action dated Aug. 1, 2018 in corresponding Chinese Application No. 201610577191.7.
Japanese Office Action dated Sep. 24, 2019 in corresponding Japanese Application No. 2016-044631.

* cited by examiner

*Primary Examiner* — Brian M Butcher
(74) *Attorney, Agent, or Firm* — K&L Gates LLP

(57) ABSTRACT

To improve detection reliability of an input device provided with a display device.
A display device includes an array substrate having an upper surface and a lower surface on an opposite side of the upper surface, a display functional layer provided on the upper surface side of the array substrate, a plurality of first wirings provide on the upper surface side of the array substrate and applied with a signal for driving the display functional layer, a conductive pattern provided on the lower surface of the array substrate so as to be separated from the array substrate, and a detection circuit unit detecting a change in a capacitance value between the plurality of first wirings and the conductive pattern.

21 Claims, 31 Drawing Sheets

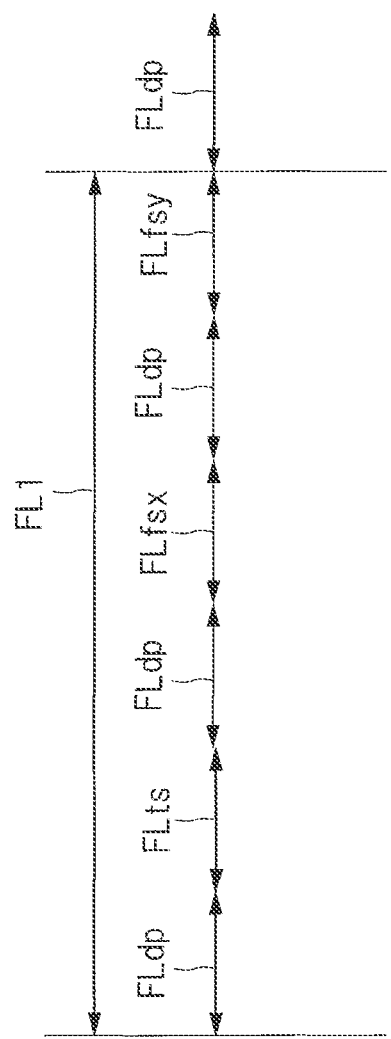

DISPLAY DEVICE

CROSS-REFERENCE TO RELATED APPLICATION

The present application claims priority from Japanese Patent Application No. 2015-146350 filed on Jul. 24, 2015, and Japanese Patent Application No. 2016-044631 filed on Mar. 8, 2016, the content of which are hereby incorporated by reference into this application.

FIELD OF THE INVENTION

The present invention relates to a display device, and in particular relates to a technique effective by applying to a display device including an input device of a pressure detection method.

BACKGROUND

There is a technique for detecting pressure applied from the outside to a display device to utilize the detected value as input information.

For example, in Japanese Patent Application Laid-Open Publication No. 2000-66837 (Patent Document 1) describes a pressure detection mechanism for detecting pressure with respect to a liquid crystal display element based on capacitance change due to the fact that a liquid crystal display cell is deformed by being pressed.

SUMMARY OF THE INVENTION

When pressure applied to a display device is detected, as described in Patent Document 1, since some of constituent members of the display device are elastically deformed depending on the pressure, it is necessary to electrically detect elastic deformation.

However, in order to meet a demand of thinning of the display device, a thickness of the constituent member of the display device is smaller. Thus, a degree of elastic deformation is decreased when the pressure is applied to the display device, thereby causing decrease in accuracy of pressure detection. Accordingly, in order to detect pressure applied from the outside of the display device and utilize the detected value as input information, a technique is necessary for improving detection reliability of the pressure.

An object of the present invention is to provide a technique for improving reliability of the display device.

A display device as one aspect of the present invention includes: a first substrate having a first surface and a second surface on an opposite side of the first surface; a display function layer provided on the first surface side of the first substrate;

a plurality of first wirings provided on the first surface side of the first substrate and supplied with a signal for forming an image;

a first conductive film provided on the second surface side of the first substrate so as to be separated from the first substrate; and a first circuit detecting a change in a capacitance value between the plurality of first wirings and the first conductive film. Further, the display device calculates pressure due to contact of an external object by the change in the capacitance value.

BRIEF DESCRIPTION OF THE DRAWINGS

FIG. 36 is an explanatory diagram illustrating an example of timing for performing a display operation, a touch detection operation, and a pressure detection operation of the display device.

DESCRIPTIONS OF THE PREFERRED EMBODIMENTS

Figure 1:
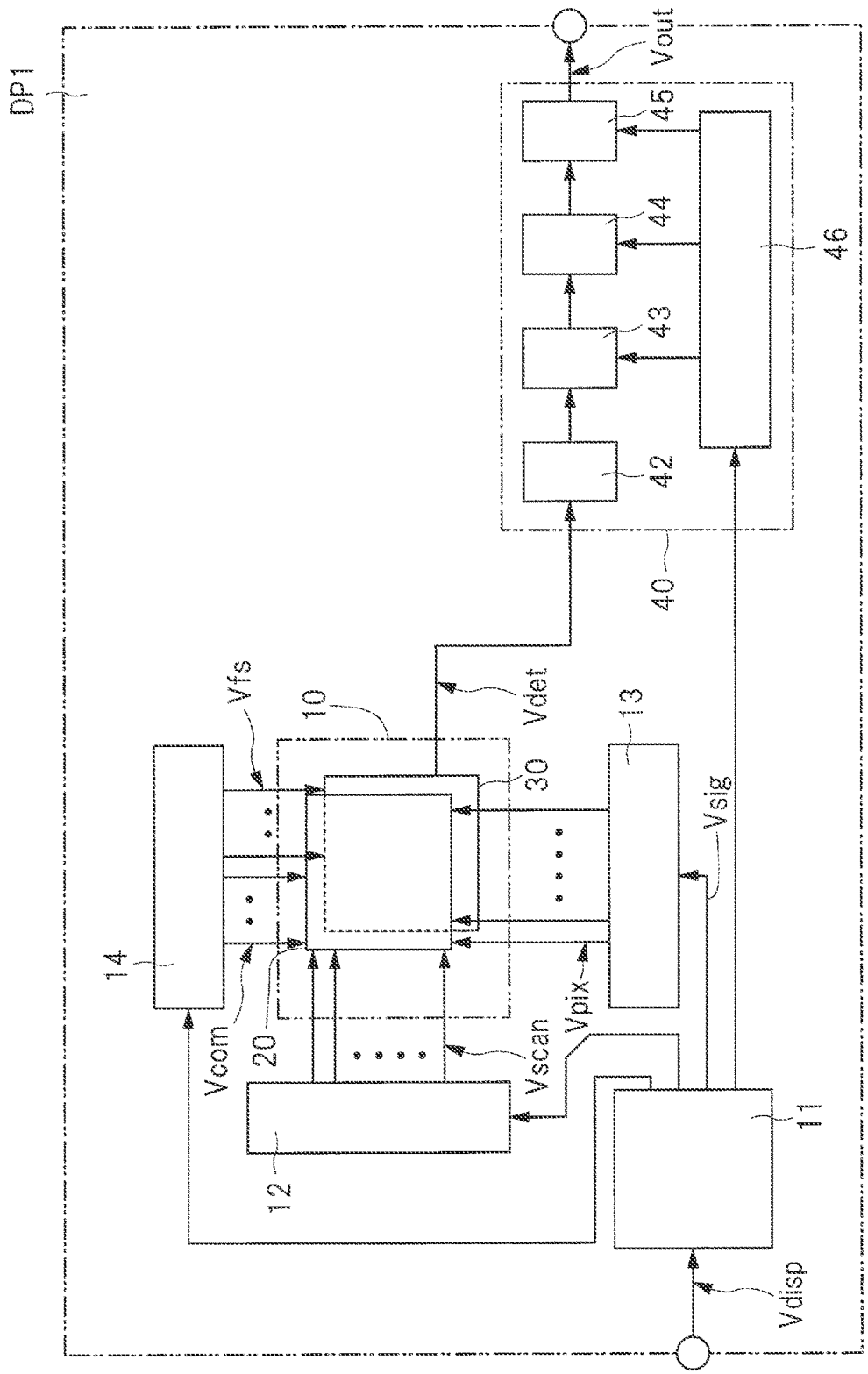
FIG. 1 is a block diagram illustrating an overall configuration of a display device of one embodiment.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention. Further, in the specification and drawings, elements which are similar to those already mentioned with respect to previous drawings are denoted by the same reference characters, and detailed descriptions thereof will be suitably omitted.

Moreover, a technique to be described in the following embodiments is widely applicable to a display device having a mechanism in which signals are supplied to a plurality of display pixels in a display region on which a display functional layer is formed from the periphery of the display region. The above-mentioned display device is exemplified by various display devices, such as, a liquid crystal display device and an organic EL (Electro-Luminescence) display device. In the following embodiments, descriptions will be given to the liquid crystal display device as a representative example of display devices.

The liquid crystal display device is also broadly classified into two categories, described below, depending on an application direction of an electric field for changing an orientation of liquid crystal molecules in the liquid crystal layer serving as the display functional layer. More specifically, the first category is a so-called vertical electric field mode in which an electric field is applied in a thickness direction (or an out-of-plane direction) of the liquid crystal display device. Examples of the vertical electric field mode include a Twisted Nematic (TN) mode and a Vertical Alignment (VA) mode. The second category is a so-called horizontal electric field mode in which an electric field is applied in a planar direction (or an in-plane direction) of the liquid crystal display device. Examples of the horizontal electric field mode include an In-Plane Switching (IPS) mode and a Fringe Field Switching (FFS) mode serving as one type of the IPS mode. While a technique described below is applicable to both the vertical electric field mode and the horizontal electric field mode. However, a display device in the horizontal electric field mode will be described as an example in the present embodiment.

An "input device" referred in the present application means a device for inputting information such as a command to a circuit included in a display device from the outside of the display device. The display device outputs a processing result by processing the information input from the input device by an operation processing circuit, a control circuit, or the like. In the present application, as an input method of the information included in the input device, two types of methods will be described.

A first input method is an input method utilizing a pressure sensor (Force Sensing). In the input method utilizing the pressure sensor, information is input by detecting that pressure is applied from the outside, and the strength of the detected pressure by the pressure sensor. In the following embodiments, as an example of the pressure sensor, a pressure sensor of the electrostatic capacitance detection method will be described, which detects presence or absence of elastic deformation by utilizing that a distance between electrodes of the pressure sensor is changed due to elastic deformation of a part of the pressure sensor, and electrostatic capacitance is changed.

A second input method is an input method utilizing a touch sensor (Touch Sensing). In the input method utilizing the touch sensor, information is input by detecting that an input tool such as a human finger or a stylus is close to an input device, and the position to which the input tool is close. In a second embodiment to be described later, as an example of a touch sensor, a touch sensor of the capacitance detection method will be described which detects presence or absence of the input tool by utilizing that electrostatic capacitance of the touch sensor is changed when the input tool as a dielectric is brought close to an electrode of the touch sensor.

In the following embodiments, there will be described an example of a so-called in-cell type display device with the input device, in which constituent components of the pressure sensor or some of the constituent components of the pressure sensor and the touch sensor are also used also as constituent components of the display device. The display device described above is specifically a display device with a pressure sensor, or a display device with the pressure sensor and the touch sensor; however, in the present specification, the "display device" includes a display device to which the input device is not added, in addition to the display device with the pressure sensor, and the display device with the pressure sensor and the touch sensor.

First Embodiment

Overall Configuration of Display Device

First, a basic configuration a display device of the first embodiment will be described. FIG. 1 is a block diagram illustrating an overall configuration of the display device of the first embodiment.

A display device DP1 includes a main body unit 10 including a pressure detection function and a display function, a control unit 11, a gate driver 12, a source driver 13, a drive driver 14, and a detection circuit unit 40.

The main body unit 10 includes a display unit 20 as the display device for outputting an image or video, and a pressure detection unit 30 as the pressure sensor. In the present embodiment, as described above, the display unit 20 is a display device using a liquid crystal layer as a display function layer. The pressure detection unit 30 is a pressure detection unit of the electrostatic capacitance detection method. Thus, the display device DP1 is a display device including an input device having the pressure detection function. In addition, the main body unit 10 is a display device into which the display unit 20 and the pressure detection unit 30 are integrated, and is a display device incorporating the pressure detection function, that is, an in-cell type display device with the pressure detection function.

The display unit 20 performs display by sequentially performing scanning each one horizontal line in a display area in accordance with a scanning signal Vscan supplied from the gate driver 12. The pressure detection unit 30, as described later, operates based on a principle of pressure detection utilizing an electrostatic capacitance change due to a change in the distance between electrical electrodes, and outputs a detection signal Vdet.

The control unit 11 is a control circuit for supplying respective control signals to the gate driver 12, the source driver 13, the drive driver 14, and the detection circuit unit 40, based on a video signal Vdisp supplied from the outside, so that the drivers and the unit operate in synchronization with each other.

The gate driver 12 has a function for sequentially selecting a horizontal line as a target of display drive of the main body unit 10, based on the control signal supplied from the control unit 11. The source driver 13 is a circuit for supplying a pixel signal Vpix to each of a plurality of sub-pixels included in the display unit 20, based on the control signal of an image signal Vsig supplied from the control unit 11. The display unit 20 forms a display image based on a selection signal of the horizontal line supplied from the gate driver 12 and the pixel signal Vpix supplied from the source driver 13.

The drive driver 14 is a circuit for supplying a drive signal Vfs to a drive electrode COML (see FIG. 6 and FIG. 7 described later) included in the main body unit 10, based on the control signal supplied from the control unit 11.

The detection circuit unit 40 is a circuit for detecting presence or absence of pressure application to the pressure detection unit 30, based on the control signal supplied from the control unit 11 and the detection signal Vdet supplied from the pressure detection unit 30 of the main body unit 10. The detection circuit unit 40 is a circuit for electrically determining presence or absence of pressure application to a pressure detection area of the pressure detection unit 30 of the main body unit to output the obtained information. The detection circuit unit 40, for example, in an example illustrated in FIG. 1, includes a detection signal amplification unit 42, an A/D (Analog/Digital) conversion unit 43, a signal processing unit 44, a coordinate extraction unit 45, and a detection control unit 46.

The detection signal amplification unit 42 amplifies the detection signal Vdet supplied from the pressure detection unit 30. The detection signal amplification unit 42 can include a low pass analog filter that removes a high frequency component included in the detection signal Vdet, that is, a noise component, and takes out pressure components of a detection target to output each component.

<Principle of Pressure Detection Utilizing Electrostatic Capacitance Change>

Figure 2:
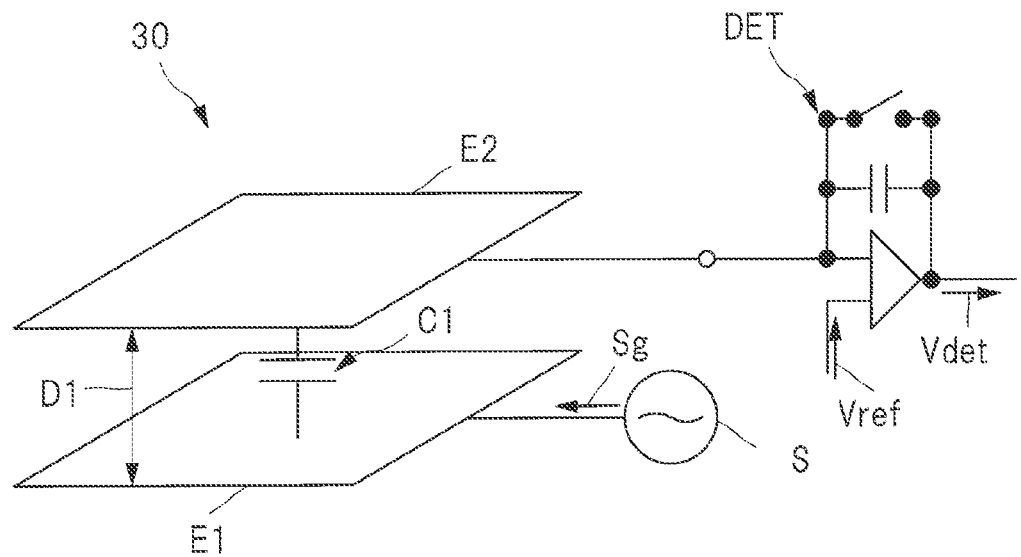
FIG. 2 is an explanatory diagram schematically illustrating a state in which pressure from the outside is not applied to a pressure sensor.
Figure 3:
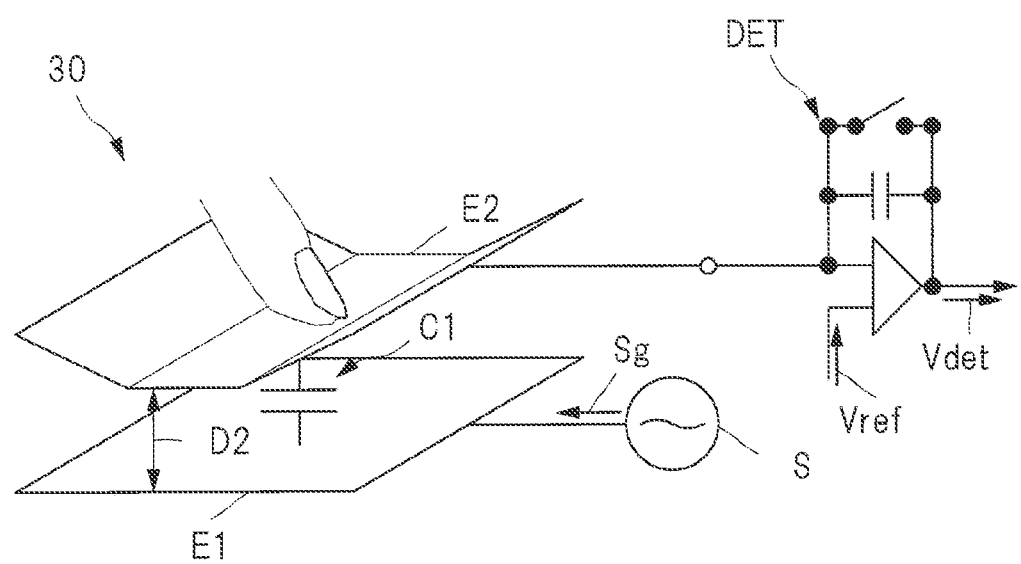
FIG. 3 is an explanatory diagram schematically illustrating a state in which pressure from the outside is applied to the pressure sensor.
Figure 4:
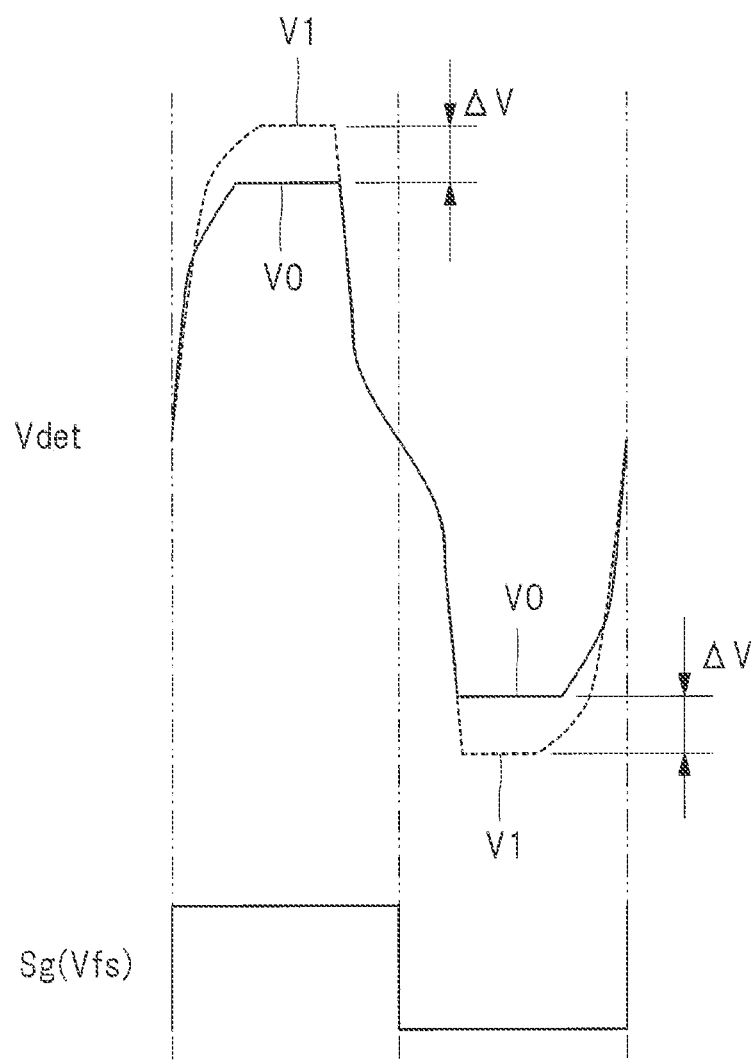
FIG. 4 is a diagram illustrating a waveform example of a detection signal of when the pressure is applied and when the pressure is not applied.

Next, a principle of pressure detection will be described in the display device DP1 of the present embodiment with reference to FIG. 1 to FIG. 4. FIG. 2 is an explanatory diagram schematically illustrating a state in which pressure from the outside is not applied to the pressure sensor. FIG. 3 is an explanatory diagram schematically illustrating a state in which pressure from the outside is applied to the pressure sensor. FIG. 4 is a diagram illustrating a waveform example of the detection signal of when the pressure is applied and when the pressure is not applied.

As illustrated in FIG. 2, an electrostatic capacitance-type pressure sensor includes an electrode E1 and an electrode E2 arranged to be separated from and to be opposite to each other. A capacitive element C1 is formed between the electrode E1 and the electrode E2. One end of the capacitive element C1 is connected to an AC signal source S as a drive signal source, and the other end of the capacitive element C1 is connected to a voltage detector DET as a pressure detection circuit. The voltage detector DET includes, for example, an integration circuit included in the detection signal amplification unit 42 illustrated in FIG. 1. As illustrated in FIG. 2, the voltage detector DET includes an integrator, and one input terminal of the integrator is connected to the electrode E2. A reference potential Vref is input to the other input terminal of the integrator.

When an AC square wave Sg including a frequency of about, for example, a few kHz to a few hundred kHz is applied to one end of the capacitive element C1, for example, to the electrode E1 from the AC signal source S, the detection signal Vdet as an output waveform is generated via the voltage detector DET connected to the other end of the capacitive element C1, for example, to the electrode E2 side. Incidentally, the AC square wave Sg corresponds to, for example, the drive signal Vfs illustrated in FIG. 4.

In a state in which the pressure is not applied to the pressure sensor, as illustrated in FIG. 2, current flows depending on a capacitance value of the capacitive element C1 in association with charging and discharging to the capacitive element C1. The voltage detector DET converts variation of the current depending on the AC square wave Sg into variation of the voltage. The variation of the voltage is illustrated by a waveform V0 of a solid line in FIG. 4.

On the other hand, as illustrated in FIG. 3, in a state in which the pressure is applied to the pressure sensor due to contact of an external object such as a finger, a separation distance D2 between the electrode E1 and the electrode E2 becomes smaller than a separation distance D1 illustrated in FIG. 2 due to deformation of a part of the pressure sensor. Thus, the capacitance value of the capacitive element C1 is increased. Thus, the current flowing through the capacitive element C1 illustrated in FIG. 3 varies. The voltage detector DET converts variation of the current depending on the AC square wave Sg into variation of the voltage. The variation of the voltage is illustrated by a waveform V1 of a dashed line in FIG. 4. In this case, amplitude of the waveform V1 becomes larger compared to that of the waveform V0 described above. Thus, an absolute value |ΔV| of voltage difference between the waveform V0 and the waveform V1 is changed depending on influence of deformation of the pressure sensor.

In the example illustrated in FIG. 1, the pressure detection unit 30 performs pressure detection for each one detection block corresponding to one or a plurality of drive electrodes, in accordance with the drive signal Vfs supplied from the drive driver 14. That is, the pressure detection unit 30 outputs the detection signal Vdet via the voltage detector DET illustrated in FIG. 2 and FIG. 3 for each one detection block corresponding to each of the one or the plurality of drive electrodes COML, and supplies the detection signal Vdet that is output, to the detection signal amplification unit 42 of the detection circuit unit 40.

The A/D conversion unit 43 is a circuit for sampling each analog signal output from the detection signal amplification unit 42 at timing synchronization with the drive signal Vfs to convert the analog signal into a digital signal.

The signal processing unit 44 includes a digital filter for reducing the frequency component other than the frequency for sampling the drive signal Vfs included in an output signal of the A/D conversion unit 43, that is, the noise component. The signal processing unit 44 is a logic circuit for calculating presence or absence of pressure application to the pressure detection unit 30, based on the output signal of the A/D conversion unit 43. The signal processing unit 44 performs processing for taking out only a differential voltage depending on presence or absence of pressure application. The differential voltage is the absolute value |ΔV| of the difference between the waveform V0 and the waveform V1 described above. The signal processing unit 44 can perform an operation for averaging the absolute value |ΔV| per one detection block to obtain an average value of the absolute value |ΔV|. Thus, the signal processing unit 44 is able to reduce influence of noise. The signal processing unit 44 compares the differential voltage that is detected with a predetermined threshold voltage, and determines that it is the state in which the pressure is applied when the differential voltage is equal to or larger than the threshold voltage, and determines that it is the state in which the pressure is not applied when the differential voltage is less than the threshold voltage. In this way, the pressure detection is performed by the detection circuit unit 40.

The coordinate extraction unit 45 is a logic circuit for calculating a coordinate of a position at which pressure application is detected, that is, an input position in the input device, when pressure application is detected in the signal processing unit 44. The detection control unit 46 performs control so that the A/D conversion unit 43, the signal processing unit 44, and the coordinate extraction unit 45 operate in synchronization with each other. The coordinate extraction unit 45 outputs the coordinates of the pressure sensor as an output signal Vout.

<Detail of Display Unit>

Figure 5:
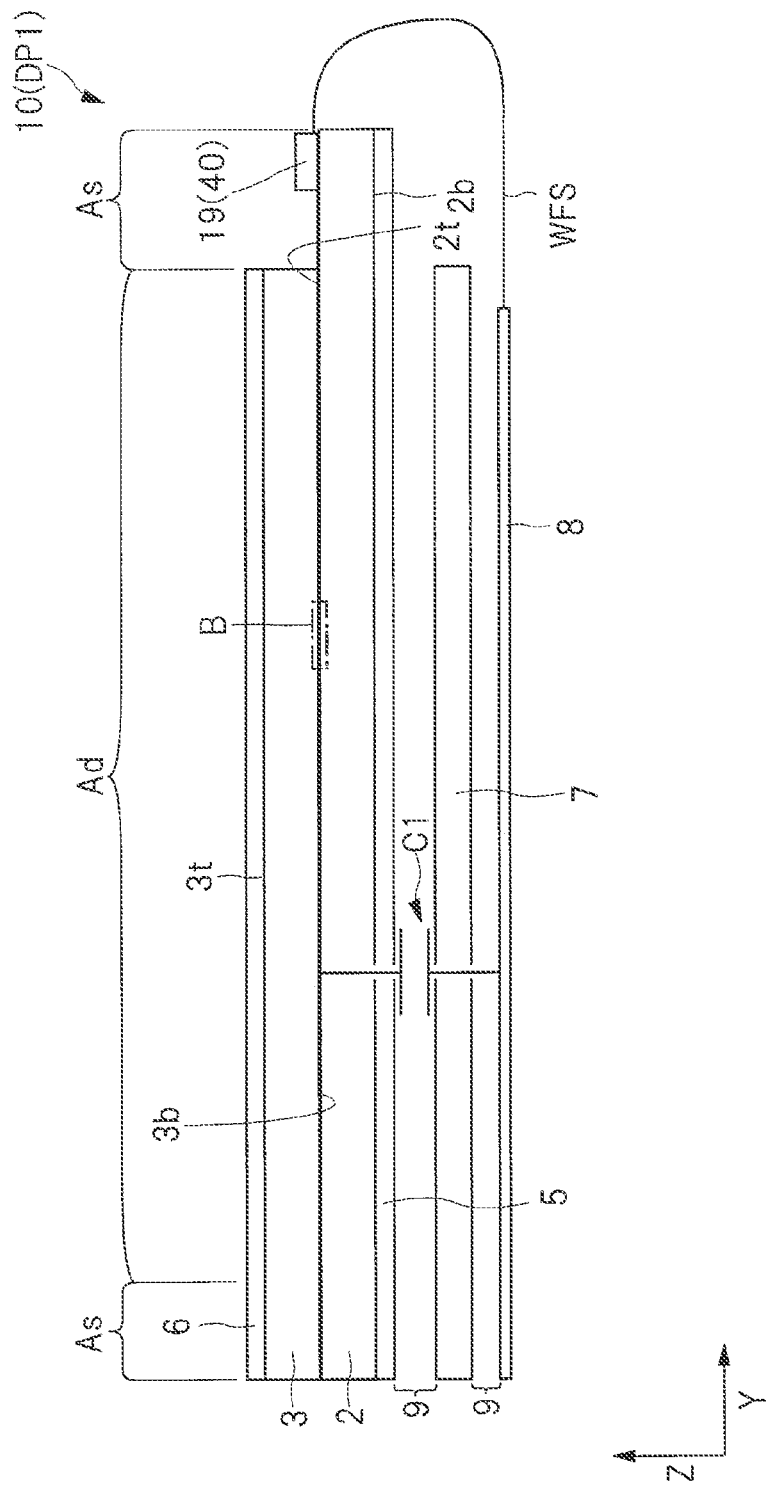
FIG. 5 is a cross-sectional view illustrating an example of the display device illustrated in FIG. 1.
Figure 6:
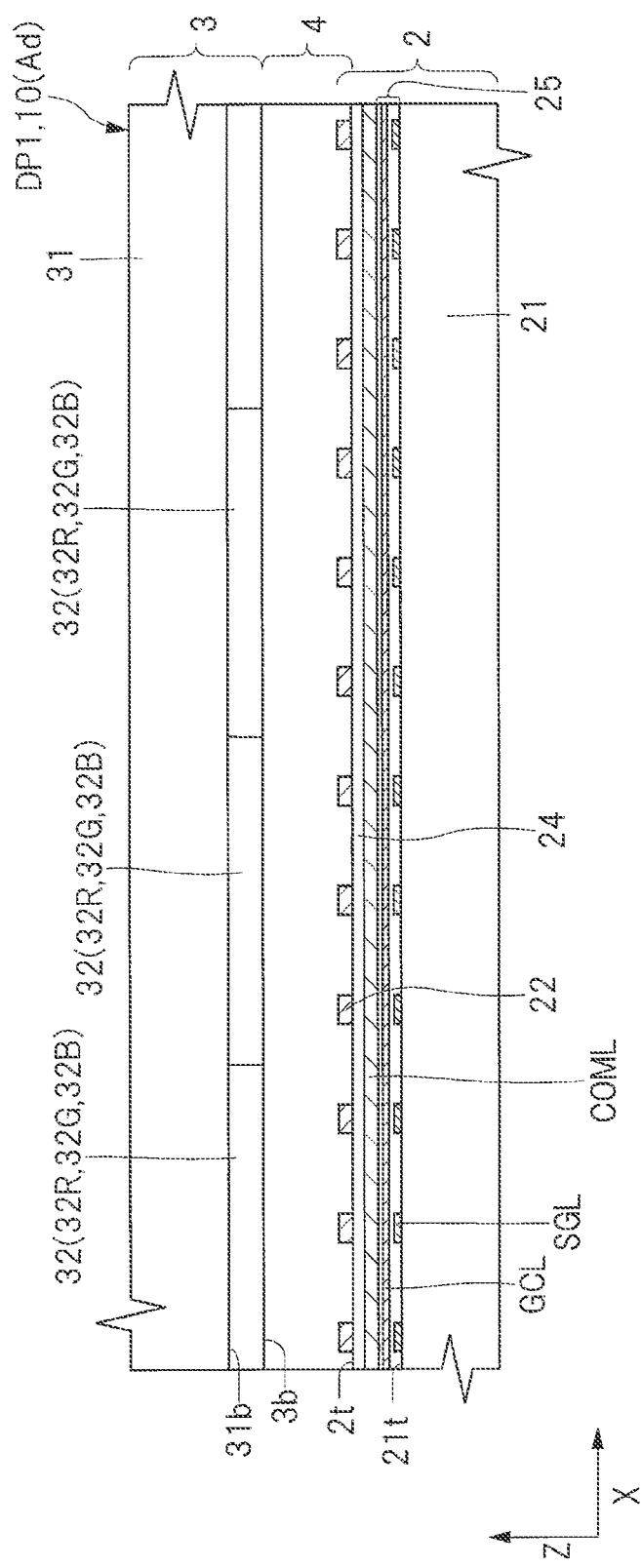
FIG. 6 is an enlarged cross-sectional view illustrating an enlarged view of a peripheral structure of a liquid crystal layer included in the display device illustrated in FIG. 5.
Figure 7:
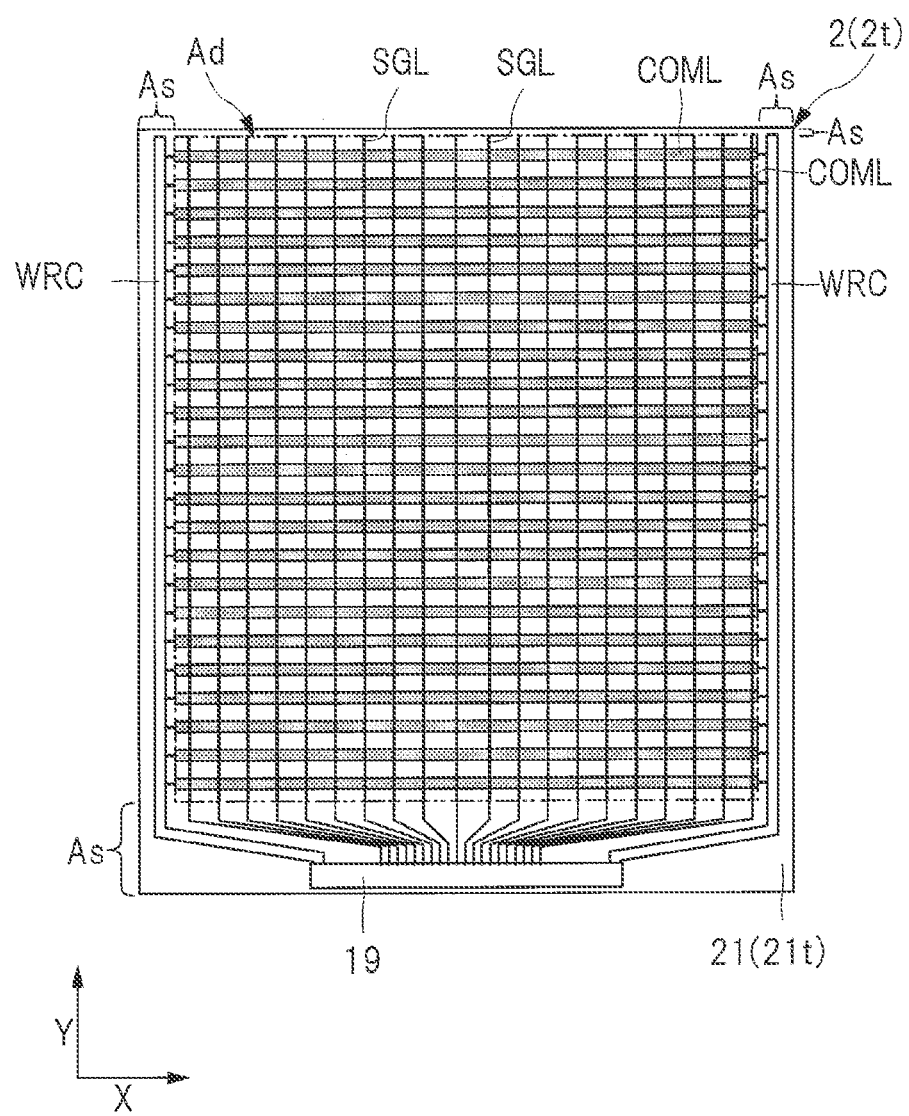
FIG. 7 is a plan view illustrating a configuration example of an array substrate illustrated in FIG. 5.
Figure 8:
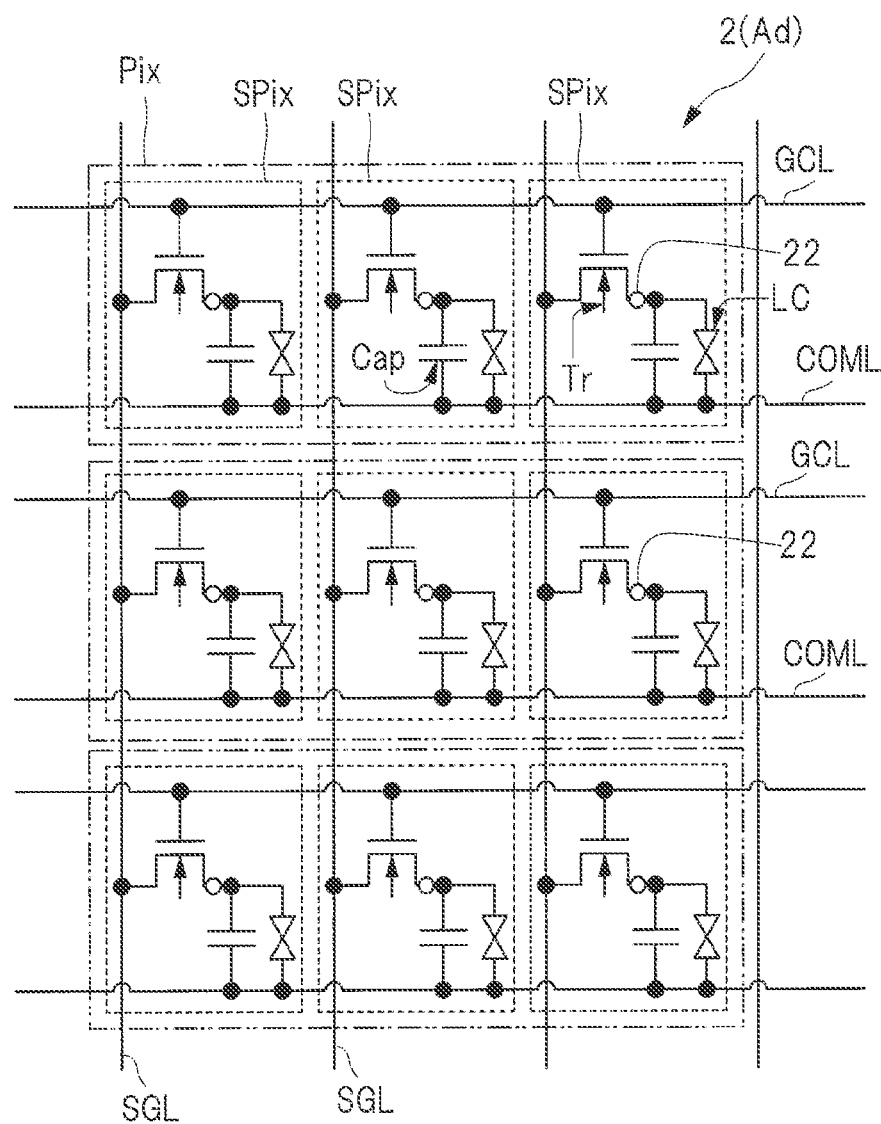
FIG. 8 is an explanatory diagram illustrating an example of an array of a plurality of TFT elements provided on the array substrate illustrated in FIG. 7.

Next, a configuration example of the display unit 20 illustrated in FIG. 1 will be described in detail with reference to FIG. 5 to FIG. 8. FIG. 5 is a cross-sectional view illustrating an example of the display device illustrated in FIG. 1. FIG. 6 is an enlarged cross-sectional view illustrating an enlarged view of a peripheral structure of a liquid crystal layer included in the display device illustrated in FIG. 5. FIG. 7 is a plan view illustrating a configuration example of an array substrate illustrated in FIG. 5. FIG. 8 is an explanatory diagram illustrating an example of an array of a plurality of TFT elements provided on the array substrate illustrated in FIG. 7.

Figure 10:
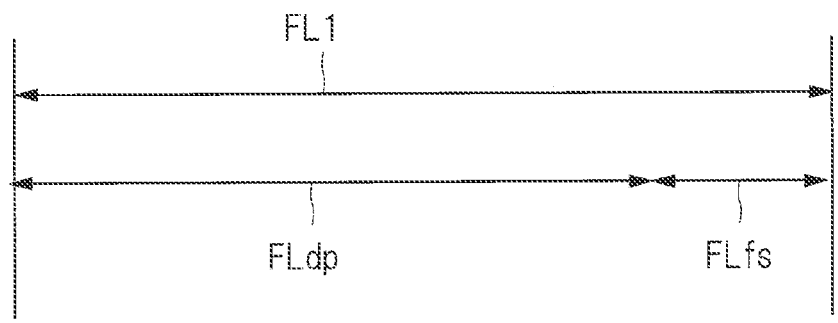
FIG. 10 is an explanatory diagram illustrating an example of timing for performing a display operation and a pressure detection operation of the display device illustrated in FIG. 1.

Incidentally, in FIG. 5, the capacitive element C1 of the electrostatic capacitance-type pressure sensor included in the display device DP1 is schematically illustrated. Although FIG. 5 and FIG. 6 are cross-sectional views, for ease of viewing of constituent members, hatching is omitted in some of the constituent members. In FIG. 6, hatching is added to each of pixel electrodes 22, the drive electrode COML, a scanning line GCL, and signal lines SGL. FIG. 5 is a cross-sectional view along the Y direction illustrated in FIG. 7, and FIG. 6 is a cross-sectional view along the X direction illustrated in FIG. 7. Although FIG. 7 is a plan view, in order to easily distinguish the drive electrode COML and the signal lines SGL from each other, the drive electrode COML is illustrated with a pattern. In the present section, operation of each unit in a display operation period FLdp will be mainly described in a case in which a unit frame FL1 is time-divided into the display operation period FLdp and a pressure detection operation period FLfs, as illustrated in FIG. 10 described later.

As illustrated in FIG. 5, the main body unit 10 of the display device DP1 includes an array substrate 2, a counter substrate 3, a liquid crystal layer 4 (see FIG. 6), a polarizing plate 5, a polarizing plate 6, a light-guiding plate 7, and a conductor pattern 8. The array substrate 2 includes an upper surface 2t as a main surface of the array substrate 2, and a lower surface 2b positioned on the opposite side of the upper surface 2t. The counter substrate 3 includes a lower surface 3b as a main surface of the counter substrate 3, and an upper surface 3t positioned on the opposite side of the lower surface 3b. The array substrate 2 and the counter substrate 3 are provided so that the upper surface 2t of the array substrate 2 and the lower surface 3b of the counter substrate 3 are opposite to each other. The liquid crystal layer 4 serving as the display function layer of the display unit 20 (see FIG. 1) is provided between the array substrate 2 and the counter substrate 3. A periphery of the liquid crystal layer 4 is sealed between the array substrate 2 and the counter substrate 3, and the liquid crystal layer 4 is enclosed in a sealed space.

As illustrated in FIG. 6, the array substrate 2 includes a substrate 21. The substrate 21 includes an upper surface 21t as one main surface, and a lower surface positioned on the opposite side of the upper surface 21t. The lower surface of the substrate 21 is the same surface as the lower surface 2b of the array substrate 2 illustrated in FIG. 5. The counter substrate 3 includes a substrate 31. The substrate 31 includes a lower surface 31b as one main surface, and an upper surface positioned on the opposite side of the lower surface 31b. The upper surface of the substrate 31 is the same surface as the upper surface 3t of the counter substrate 3 illustrated in FIG. 5.

Incidentally, as the substrate 21 and the substrate 31, various transparent substrates can be used, such as glass substrate, or a film made of, for example, resin. In the present specification, "transparent" in the transparent substrate means that transmittance to visible light is, for example, equal to or larger than 80%.

As illustrated in FIG. 5 and FIG. 7, the upper surface 2t of the array substrate includes a display area Ad, and a peripheral area As as an area positioned on an outer periphery side of the array substrate 2 from the display area Ad. In other words, the peripheral area As is an area positioned on an outer periphery side of the array substrate 2 from the display area Ad. Incidentally, in the present specification, "in a planar view" means a case viewed from a direction perpendicular to the upper surface 21t of the substrate 21 or the lower surface 31b (see FIG. 6) of the substrate 31 (see FIG. 6) as the counter substrate.

As illustrated in FIG. 6, on the upper surface 2t side of the array substrate 2, a TFT layer 25 in which a plurality of TFT elements Tr (see FIG. 8) are provided in a matrix form, the drive electrode COML, an insulating film 24, and a plurality of pixel electrodes 22 are stacked in this order.

In the TFT layer 25, the plurality of TFT elements Tr (see FIG. 8) are provided in a matrix form, serving as thin film transistors (TFT) for driving a plurality of liquid crystal elements LC (see FIG. 8) included in the liquid crystal layer 4 serving as the display function layer.

As illustrated in FIG. 8, the plurality of scanning lines GCL, the plurality of signal lines SGL, and the plurality of TFT elements Tr are formed in the display area Ad of the substrate 21. Incidentally, the scanning lines GCL mean gate wirings connected to respective gate electrodes of the TFT elements Tr, and the signal lines SGL mean source wirings or drain wirings connected to respective source electrodes or drain electrodes of the TFT elements Tr. In the display device DP1, in the display operation period FLdp (see FIG. 10 described later) for forming the image, the scanning signal Vscan (see FIG. 1) is input to the scanning lines GCL, and a video signal (for example, the pixel signal Vpix illustrated in FIG. 1) is input to the signal lines SGL. Accordingly, the scanning lines GCL and the signal lines SGL are both wirings to be supplied with the signal for forming the image. FIG. 7 illustrates an example of an array of the plurality of signal lines SGL provided on the upper surface 21t of the substrate 21.

Although the details will be described later, in the present embodiment, in the pressure detection operation period FLfs illustrated in FIG. 10 described later, each of the plurality of signal lines SGL is utilized as the electrode E2 for the pressure detection unit 30 described with reference to FIG. 2 and FIG. 3.

As illustrated in FIG. 8, the scanning lines GCL extend in the X direction in the display area Ad, and the plurality of scanning lines GCL are arrayed along the Y direction. The plurality of signal lines SGL extend in the Y direction in the display area Ad, and the plurality of signal lines SGL are arrayed along the X direction. Accordingly, each of the plurality of signal lines SGL intersects with a plurality of scanning lines GCL in a planar view. In this way, in a planar view, sub-pixels SPix are arranged at intersections of the plurality of scanning lines GCL and the plurality of signal lines SGL intersecting with each other, and one pixel Pix is formed by the plurality of different colors of sub-pixels SPix. That is, the plurality of sub-pixels SPix provided on the substrate 21 (see FIG. 7) are arranged in the display area Ad, and arrayed in a matrix form in the X-axis direction and in the Y-axis direction, in a planar view.

In a planar view, the TFT element Tr is formed in an intersecting portion in which each of the plurality of scanning lines GCL intersects with each the plurality of signal lines SGL. Accordingly, in the display area Ad, the plurality of TFT elements Tr are formed on the substrate 21 (see FIG. 7), and the plurality of TFT elements Tr are arrayed in a matrix form in the X-axis direction and in the Y-axis direction. That is, the TFT element Tr is provided in each of the plurality of sub-pixels SPix. Further, the liquid crystal element LC is provided in each of the plurality of sub-pixels SPix in addition to the TFT element Tr.

The TFT element Tr is composed of, for example, a thin film transistor as an n-channel type MOS (Metal Oxide Semiconductor). The gate electrode of the TFT element Tr is connected to the scanning line GCL. One of the source electrode or the drain electrode of the TFT element Tr is connected to the signal line SGL. The other of the source electrode or the drain electrode of the TFT element Tr is connected to one end of the liquid crystal element LC. For example, one end of the liquid crystal element LC is connected to the source electrode or the drain electrode of the TFT element Tr, and the other end is connected to the drive electrode COML.

As illustrated in FIG. 8, the plurality of sub-pixels SPix arrayed along the X direction, that is, the plurality of sub-pixels SPix belonging to the same row of a liquid crystal display device are connected to each other by the scanning line GCL. The scanning line GCL is connected to the gate driver 12 (see FIG. 1), and supplied with the scanning signal Vscan (see FIG. 1) by the gate driver 12. The plurality of sub-pixels SPix arrayed in the Y-axis direction, that is, the plurality of sub-pixels SPix belonging to the same column of the display unit 20 (see FIG. 1) are connected to each other by the signal line SGL. The signal line SGL is connected to the source driver 13 (see FIG. 1), and supplied with the pixel signal Vpix (see FIG. 1) by the source driver 13.

As illustrated in FIG. 6, the drive electrode COML is formed on the TFT layer 25. In an example illustrated in FIG. 6, the drive electrode COML is covered by the insulating film 24, and the plurality of pixel electrodes 22 are formed on the insulating film 24. In other words, in the example illustrated in FIG. 6, the drive electrode COML is formed between the substrate 21 and the pixel electrodes 22. In a thickness direction of the array substrate 2, that is, in a direction from one to the other of the upper surface 2t and the lower surface 2b illustrated in FIG. 5, the drive electrode COML is provided to overlap with the plurality of pixel electrodes 22.

As illustrated in FIG. 7, the array substrate 2 includes the plurality of drive electrodes COML extending along the X direction in the present embodiment. The drive electrodes COML are patterned conductive films (also referred to as conductor films, or conductor patterns), and composed of transparent conductive material such as indium tin oxide (ITO), indium zinc oxide (IZO), or tin oxide (SnO). When the plurality of drive electrodes COML are provided as in the present embodiment, each of the plurality of drive electrodes COML is formed between the substrate 21 and the pixel electrodes 22 illustrated in FIG. 6. Furthermore, each of the plurality of drive electrodes COML is provided to overlap with the plurality of pixel electrodes 22 in a thickness direction of the array substrate 2.

The drive electrodes COML illustrated in FIG. 8 are connected to the drive driver 14 (see FIG. 1), and supplied with a drive signal Vcom (see FIG. 1) by the drive driver 14. That is, in an example illustrated in FIG. 8, the plurality of sub-pixels SPix belonging to the same column share one drive electrode COML. The plurality of drive electrodes COML each extend in the Y direction, and are arrayed along the X direction in the display area Ad. As described above, the plurality of signal lines SGL each extend in the Y direction, and are arrayed along the X direction in the display area Ad, so that a direction in which each of the plurality of drive electrodes COML extends is parallel to a direction in which each of the plurality of signal lines SGL extends.

The plurality of pixel electrodes 22 illustrated in FIG. 6 are each formed in each of the plurality of sub-pixels SPix arrayed in a matrix form in the X direction and in the Y direction in the display area Ad, in a planar view, as schematically illustrated in FIG. 8. Accordingly, although not illustrated in FIG. 7, the plurality of pixel electrodes 22 are arrayed in a matrix form in the X direction and in the Y direction.

As illustrated in FIG. 7, the plurality of drive electrodes COML are electrically connected to a routing wiring WRC provided in the peripheral area As around the display area Ad, in a planar view. The plurality of drive electrodes COML are provided on the upper surface 21t side as one main surface of the substrate 21, inside the display area Ad, in a planar view, as illustrated in FIG. 7. The routing wiring WRC is wiring for electrically connecting the drive electrodes COML with the semiconductor chip 19 (see FIG. 5), and is formed on the upper surface 21t of the substrate 21 in the peripheral area As in a planar view. The insulating film 24 (see FIG. 6) is formed on the upper surface 21t of the substrate 21 including the surface of each of the plurality of drive electrodes COML and the surface of each of the plurality of routing wirings WRC. In the display area Ad, the plurality of pixel electrodes 22 are formed on the insulating film 24. Accordingly, the insulating film 24 electrically insulates the drive electrodes COML and the pixel electrodes 22 from each other.

Incidentally, the routing wiring WRC illustrated in FIG. 7 extends in the Y direction in a planar view, so that the routing wiring WRC arranged in the peripheral area As is illustrated in the plan view of FIG. 7 in a planar view, but is not illustrated in the cross-sectional view of FIG. 6.

Incidentally, in the example illustrated in FIG. 6, the arrangement of the drive electrode COML and the pixel electrodes 22 is the arrangement in an FFS mode as a horizontal electric field mode. However, the arrangement of the drive electrode COML and the pixel electrodes 22 can be the arrangement in an IPS mode as the horizontal electric field mode, in which the drive electrode COML and the pixel electrodes 22 do not overlap with each other in a planar view. Alternatively, the arrangement of the drive electrode COML and the pixel electrodes 22 can be the arrangement in a TN mode or a VA mode as a vertical electric field mode.

A direction in which each of the plurality of drive electrodes COML extends is not limited, and, for example, the direction in which each of the plurality of drive electrodes COML extends can be a direction parallel to a direction in which each of the plurality of scanning lines GCL extends.

As illustrated in FIG. 6, the liquid crystal layer 4 is provided between the array substrate 2 and the counter substrate 3. The liquid crystal layer 4 modulates light passing through an electric field depending on a state of the electric field, and, for example, a liquid crystal layer is used corresponding to the horizontal electric field mode such as the FFS mode, or the IPS mode described above. That is, as the liquid crystal display device, a liquid crystal display device is used according to the horizontal electric field mode such as the FFS mode or the IPS mode. Alternatively, as described above, the liquid crystal display device can be used according to the vertical electric field mode such as the TN mode or the VA mode. Incidentally, an oriented film can be provided between the counter substrate 3 and the liquid crystal layer 4, and between the array substrate 2 and the liquid crystal layer 4 illustrated in FIG. 6.

As illustrated in FIG. 6, the counter substrate 3 includes the substrate 31, and a color filter layer 32. The substrate 31 includes the upper surface, and the lower surface 31b on the opposite side of the upper surface. The color filter layer 32 is provided on the lower surface 31b of the substrate 31.

As the color filter layer 32, for example, color filters colored in three colors of red (R), green (G), and blue (B) are arrayed in the X-axis direction. Thus, as illustrated in FIG. 6, the plurality of sub-pixels SPix are formed each corresponding to each of color areas 32R, 32G, and 32B of three colors of R, G, and B, and one pixel Pix is formed by the plurality of sub-pixels SPix each corresponding to each of one set of color areas 32R, 32G, and 32B. The pixels Pix are arrayed in a matrix form along a direction in which the scanning line GCL extends (the X-axis direction), and a direction in which the signal line SGL extends (the Y-axis direction). An area in which the pixels Pix are arrayed in a matrix form is, for example, the display area Ad described above. Incidentally, a dummy area can be provided in which a dummy pixel is provided, in the periphery of the display area Ad.

A combination of colors of the color filter layer 32 can be a combination of a plurality of colors including colors other than R, G, and B. The color filter layer 32 may not be provided. Alternatively, one pixel Pix can include a sub-pixel SPix not provided with the color filter layer 32, that is, a white sub-pixel SPix. With a COA (Color filter On Array) technique, the color filter can be provided on the array substrate 2.

As illustrated in FIG. 5, the main body unit 10 includes the semiconductor chip 19. The semiconductor chip 19 is a chip mounted on the substrate 21 as illustrated in FIG. 7, and incorporates each of the circuits necessary for display operation, such as the control unit 11, the gate driver 12, and the source driver 13 illustrated in FIG. 1. The semiconductor chip 19 can incorporate the drive driver 14. The semiconductor chip 19 and each of the plurality of drive electrodes COML are electrically connected to each other by the routing wiring WRC as illustrated in FIG. 7.

When the image is formed by the display device DP1, the gate driver 12 illustrated in FIG. 1 applies the scanning signal Vscan to the gate electrode of the TFT element Tr of each of the sub-pixels SPix via the scanning line GCL illustrated in FIG. 8. Thus, one row of the sub-pixels SPix formed in a matrix form in the display unit 20, that is, one horizontal line is sequentially selected as a target of display drive. The source driver 13 illustrated in FIG. 1 supplies the pixel signal Vpix to each of the plurality of sub-pixels SPix configuring the one horizontal line sequentially selected by the gate driver 12 via the signal line SGL illustrated in FIG. 7 and FIG. 8. In the plurality of sub-pixels SPix configuring the one horizontal line, display is performed depending on the pixel signal Vpix that is supplied.

The drive driver 14 applies the drive signal Vcom to drive the drive electrode COML for each one drive block corresponding to the one or the plurality of drive electrodes COML (see FIG. 6 to FIG. 8). In the liquid crystal display device, the gate driver 12 operates to sequentially scan the scanning line GCL (see FIG. 8) in a time division manner, so that the sub-pixels SPix (see FIG. 8) are sequentially selected for each one horizontal line. In the display unit 20, the source driver 13 supplies the pixel signal Vpix (see FIG. 1) to the sub-pixels SPix belonging to one horizontal line, so that display is performed for each one horizontal line. When the display operation is performed, the drive driver 14 applies the drive signal Vcom to the drive block including the drive electrode COML corresponding to the one horizontal line.

Then, voltage is applied between each of the plurality of pixel electrodes 22 and each of the drive electrodes COML illustrated in FIG. 8, and an electric field is formed in the liquid crystal element LC provided in each of the plurality of sub-pixels SPix, so that the image is in the display area Ad. At that time, capacitance Cap illustrated in FIG. 8 is formed between the drive electrodes COML and the pixel electrode 22, and the capacitance Cap functions as a holding capacitor.

In this way, when the main body unit 10 includes the display unit 20 as the liquid crystal display device, a display control unit for controlling display of the image is formed by the liquid crystal element LC, the plurality of pixel electrodes 22, the drive electrode COML, the plurality of scanning lines GCL, and the plurality of signal lines SGL. The display control unit is provided between the array substrate 2 and the counter substrate 3. Incidentally, the main body unit 10 illustrated in FIG. 1 can include various display devices such as an organic EL display device, instead of the liquid crystal display device as the display device.

When a device is used such as the organic EL display device, the polarizing plate 5, the polarizing plate 6, or the light-guiding plate 7 illustrated in FIG. 5 may not be provided.

<Detail of Pressure Detection Unit>

Figure 9:
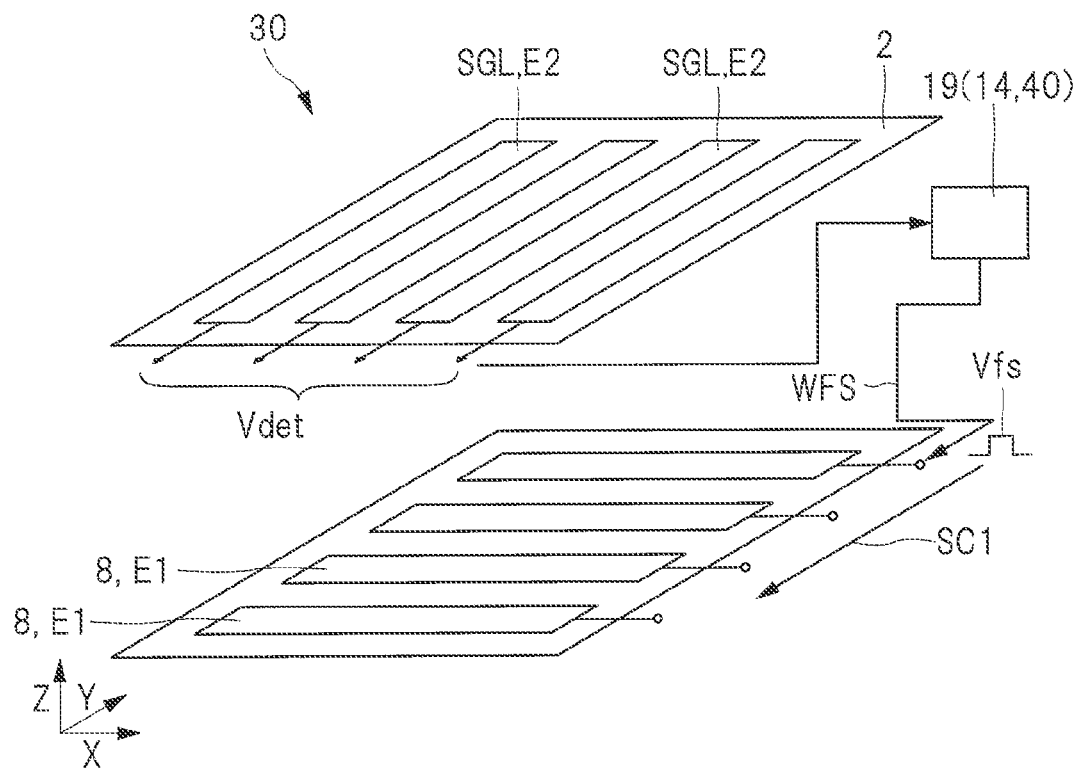
FIG. 9 is an explanatory diagram illustrating an example of a configuration included in a pressure detection unit (pressure sensor) illustrated in FIG. 1.

Next, a configuration of the pressure detection unit 30 illustrated in FIG. 1 will be described. FIG. 9 is an explanatory diagram illustrating an example of a configuration included in the pressure detection unit illustrated in FIG. 1. FIG. 10 is an explanatory diagram illustrating an example of timing for performing a display operation and a pressure detection operation of the display device illustrated in FIG. 1. In the present section, operation of each unit in the pressure detection operation period FLfs will be mainly described in a case in which the unit frame FL1 is time-divided into the display operation period FLdp and the pressure detection operation period FLfs, as illustrated in FIG. 10.

The plurality of signal lines SGL (see FIG. 6 and FIG. 7) included in the display device DP1 of the present embodiment illustrated in FIG. 1 operate as wiring to which a signal is input for driving the liquid crystal element LC (see FIG. 8) included in the liquid crystal layer 4 (see FIG. 6) serving as the display function layer, and operate as detection electrodes of the pressure detection unit 30.

As illustrated in FIG. 9, the pressure detection unit 30 includes the plurality of signal lines SGL provided on the array substrate 2 and operating as the detection electrodes for pressure detection, and the conductor pattern 8 provided to be separated from the array substrate 2 and operating as drive electrodes for pressure detection. In an example illustrated in FIG. 9, the plurality of conductor patterns 8 are provided to be separated from the array substrate 2.

The conductor pattern 8 is a patterned conductive film (also referred to as a conductor film), and the plurality of conductor patterns 8 each extend in a direction intersecting with a direction in which each of the plurality of signal lines SGL extends, in a planar view. In other words, the plurality of conductor patterns 8 are arrayed to be spaced from each other so as to intersect with each of the plurality of signal lines SGL in a planar view. The plurality of conductor patterns 8 are opposite to the respective signal lines SGL (see FIG. 6) in a direction perpendicular to the upper surface 21t (see FIG. 6 and FIG. 7) of the substrate 21 included in the array substrate 2. Incidentally, in the example illustrated in FIG. 9, the conductor pattern 8 is a conductive film in which films composed of conductive material are patterned in a belt shape. However, in the present specification, whether or not patterning is performed, it is referred to as the conductor pattern, or the conductive film, or the conductor film. For example, as a conductor pattern 8A illustrated in FIG. 11 described later, in a case of a configuration in which a film composed of one sheet of conductive material uniformly spreads, patterning processing of the conductive film may not be performed. Even in a case of the conductive film to which the patterning processing is not performed in this way, it is referred to as the conductor pattern, or the conductive film, or the conductor film.

The detection circuit unit 40 is formed on, for example, the semiconductor chip 19 illustrated in FIG. 5, and the plurality of signal lines SGL illustrated in FIG. 9 are each connected to the detection signal amplification unit 42 (see FIG. 1) of the detection circuit unit 40.

The drive driver 14 for outputting the drive signal Vfs in the pressure detection operation period FLfs (see FIG. 10) is formed on the semiconductor chip 19 illustrated in FIG. 5, and the plurality of conductor patterns 8 illustrated in FIG. 9 are electrically connected to the drive driver 14 of the semiconductor chip 19 via wiring WFS.

In an intersecting portion between each of the plurality of conductor patterns 8 and each of the plurality of signal lines SGL illustrated in FIG. 9 in a planar view, electrostatic capacitance is generated. That is, the capacitive element C1 illustrated in FIG. 2 is formed. A detection signal is generated depending on the electrostatic capacitance between each of the plurality of conductor patterns 8 and each of the plurality of signal lines SGL, and the detection signal that is generated is transmitted to the detection circuit unit 40 illustrated in FIG. 1 through wiring connected to the signal lines SGL. Further, processing to the detection signal is performed in the detection circuit unit 40, and the output signal Vout is output as a command signal input from the outside. That is, by an electrode substrate such as the substrate 31 (see FIG. 6) on which the conductor pattern 8 is formed and by the signal lines SGL, a detection unit for detecting the command from the outside, that is, the input device is formed.

As material of the conductor pattern 8, metal material containing metal can be used, and, for example, the transparent conductive material can be used such as indium tin oxide (ITO), indium zinc oxide (IZO), or tin oxide (SnO). The conductor patterns 8 can be, for example, a conductor film in which a conductor material is deposited on a base material such as a resin film, or can be the one in which a conductor material is deposited in a film shape on a member such as the light-guiding plate 7. In an example illustrated in FIG. 5, the light-guiding plate 7 is provided between the conductor pattern 8 and the array substrate 2; however, the conductor pattern 8 can be provided between the light-guiding plate 7 and the array substrate 2.

In the pressure detection unit 30, when detection operation is performed, one detection block corresponding to the one or the plurality of conductor patterns 8 is sequentially selected along a scan direction SC1, by the drive driver 14

(see FIG. 1). In the detection block selected, the drive signal Vfs for measuring the electrostatic capacitance between the signal line SGL and the conductor pattern 8 is input to the conductor pattern 8, and the detection signal Vdet for detecting the input position is output from the signal line SGL. In this way, in the pressure detection unit 30, pressure detection is performed for each one detection block. That is, the one detection block corresponds to the electrode E2 in the principle of pressure detection previously described, and the conductor pattern 8 corresponds to the electrode E1.

Incidentally, a range of the drive block during display operation and a range of the detection block during pressure detection operation can be common to each other, and can be different from each other.

As illustrated in FIG. 9, the plurality of conductor patterns 8 and the plurality of signal lines SGL intersecting with each other, in a planar view, configure electrostatic capacitive pressure sensors arrayed in a matrix form. Thus, by scanning an entire pressure detection surface of the pressure detection unit 30, a place to which the pressure is applied from the outside can be detected.

By the way, as described above, in the pressure detection unit 30, a change in the capacitance value of the capacitive element C1 is detected as a signal of voltage by utilizing that the separation distance D2 between the electrode E1 and the electrode E2 becomes smaller than the separation distance D1 illustrated in FIG. 2 due to deformation of a part of the pressure sensor as illustrated in FIG. 3. Thus, when the capacitance value of the capacitive element C1 is changed due to a factor other than pressure applied from the outside, it becomes a cause of decrease in accuracy of pressure detection. Thus, it is preferable that an amount of change in the capacitance value of the capacitive element C1, which changes due to the pressure applied from the outside, is sufficiently large compared to other noise components.

For example, when a difference is large between the separation distance D1 illustrated in FIG. 2 and the separation distance D2 illustrated in FIG. 3 due to pressure applied from the outside, the amount of change in the capacitance value of the capacitive element C1 becomes large, and influence of the noise component can be reduced.

However, in order to meet demand of thinning of the display device, the thickness of constituent members of the display device has become smaller. For example, as a soft member that is deformed due to pressure applied from the outside, the liquid crystal layer 4 illustrated in FIG. 6 can be considered. However, the thickness of the liquid crystal layer 4 is extremely thin compared to the thickness of the substrate 21 or the substrate 31. For example, the thickness of the liquid crystal layer 4, when compared to the thickness of the substrate 21 or the substrate 31, is in a range from about 0.1% to about 10%. In the example illustrated in FIG. 6, the thickness of the liquid crystal layer 4 is, for example, in a range from about 3 μm to about 4 μm. Thus, when only the liquid crystal layer 4 (see FIG. 6) is interposed between the electrode E1 and the electrode E2 illustrated in FIG. 3, an amount of deformation due to pressure is small, and sufficient capacitance change is not obtained.

Accordingly, in the present embodiment, one of a pair of electrodes configuring the pressure sensor is provided on the upper surface 2t side of the array substrate 2 illustrated in FIG. 5, and the other electrode is provided on the lower surface 2b side of the array substrate 2 so as to be separated from the array substrate 2, as illustrated in FIG. 5. That is, as illustrated in FIG. 9, the plurality of signal lines SGL as the detection electrodes of the pressure sensor are provided on the array substrate 2, and the conductor pattern 8 as the drive electrodes of the pressure sensor is provided at a position separated from the array substrate 2.

In a part of the lower surface 2b (see FIG. 5) side of the array substrate 2, a space is easily secured compared to a part between the array substrate 2 and the counter substrate 3. For example, in the example illustrated in FIG. 5, the polarizing plate 5, the light-guiding plate 7, and a hollow space 9 are provided between the conductor pattern 8 and the array substrate 2. The hollow space 9 is an elastic deformation layer elastically deformed locally depending on pressure when the pressure is applied from the outside to the display device DP1. In other words, the hollow space 9 is an elastic deformation layer that is provided between the array substrate 2 and the conductor pattern 8 and is elastically deformed more easily than the array substrate 2, that is, is composed of a lower elastic material than the array substrate 2.

The thickness of the hollow space 9, that is, the length in a direction perpendicular to the lower surface 2b of the array substrate 2 is large compared to the thickness of the liquid crystal layer 4 illustrated in FIG. 6. In the example illustrated in FIG. 5, the example is illustrated in which the hollow space 9 is provided in two places between the conductor pattern 8 and the array substrate 2, and a total thickness of the hollow spaces 9 in a plurality of layers is equal to or larger than the thickness of the array substrate 2. In this way, when the hollow spaces in the plurality of layers 9 are provided, the amount of change in the capacitance value of the capacitive element C1 illustrated in FIG. 3 can be increased as a total thickness of the hollow spaces 9 is larger, so that detection sensitivity can be improved. When any substance (for example, air) is placed in the hollow space 9, the amount of change in the capacitance value of the capacitive element C1 illustrated in FIG. 3 can be increased as a dielectric constant of the substance to be placed is lower, so that the detection sensitivity can be improved. That is, according to the present embodiment, the change in the capacitance value that changes due to pressure applied from the outside can be increased, so that influence of the noise component can be reduced. Thus, detection accuracy of the pressure sensor can be improved.

Incidentally, when the plurality of hollow spaces 9 are provided between the conductor pattern 8 and the array substrate 2 as described above, "a thickness of the hollow space" means a total thickness of the plurality of hollow spaces 9. Although the details will be described later, as a modification example of the present embodiment, a substance other than the air (for example, an elastic body 9A illustrated in FIG. 19 described later) can be arranged in the hollow space 9. In this case, "a thickness of the hollow space" described above can be read as "a thickness of the elastic deformation layer," or "a thickness of the elastic body."

When external force is applied by the finger to the pressure sensor as schematically illustrated in FIG. 3, the electrostatic capacitance of the finger influences the value of the capacitive element C1 when the distance is small between the finger and the pressure sensor, so that the electrostatic capacitance becomes a noise source in pressure detection. Accordingly, from the viewpoint of improving the detection accuracy of the pressure sensor, it is preferable to reduce noise influence to the capacitive element C1 due to the dielectric such as the finger to be the noise source.

Generally, when the command is input by pressing a part of the display device with the finger and the like, the device is often pressed from the display surface side that is opposite to an observer, that is, from the upper surface 3t side of the counter substrate 3 in the example illustrated in FIG. 5. In the present embodiment, the electrodes configuring the pressure sensor are provided on the array substrate 2, and the lower surface 2*b* side of the array substrate 2, that is, the substrate on the opposite side of the display surface. In this case, the distance from the finger can be increased compared to the case in which some of the electrodes configuring the pressure sensor are provided on the counter substrate 3 side (in other words, the substrate arranged in the display surface side).

In the present embodiment, as illustrated in FIG. 6, the drive electrode COML covering the plurality of signal lines SGL is provided on the display surface side from the plurality of signal lines SGL. In other words, in the present embodiment, as illustrated in FIG. 6, the drive electrode COML is provided between the plurality of signal lines SGL and the liquid crystal layer 4 serving as the display function layer. In a planar view, the drive electrode COML is provided to overlap with the plurality of signal lines SGL. In this way, by providing the conductor pattern covering the plurality of signal lines SGL between the display surface and the plurality of signal lines SGL functioning as the detection electrodes of the pressure sensor, the conductor pattern can be used as a shield layer.

Specifically, when the finger is in contact with the display surface side of the display device illustrated in FIG. 6, influence of the electrostatic capacitance of the finger extends to the pressure sensor in some cases, depending on the separation distance between the finger and the plurality of signal lines SGL. However, in the case of the display device DP1, the drive electrode COML is provided between the plurality of signal lines SGL and the display surface as the conductor pattern covering the plurality of signal lines SGL, so that the influence of the electrostatic capacitance of the finger can be reduced by the drive electrode COML.

Particularly, when a fixed potential or a pulse potential is supplied to the drive electrode COML at the time of performing pressure detection operation, the drive electrode COML functions as the shield layer, and the influence of the electrostatic capacitance of the finger can be significantly reduced. As a result, the detection accuracy of the pressure sensor can be improved.

When the drive electrode COML is made to function as the shield layer, a potential supplied to the drive electrode COML can be, for example, a ground potential, or a potential different from the ground potential. The potential supplied to the drive electrode COML can be a fixed potential, or a pulse potential.

When a potential supplied to the drive electrode COML during display operation is different from a potential supplied to the drive electrode COML during pressure detection, it is preferable to time-divide the unit frame FL1 into the display operation period FLdp and the pressure detection operation period FLfs as illustrated in FIG. 10. In other words, it is preferable that the display operation period FLdp and the pressure detection operation period FLfs are performed in different timings from each other. In this case, in the display operation period FLdp and the pressure detection operation period FLfs, different potentials from each other can be supplied to the drive electrode COML (see FIG. 6), so that suitable potentials can be supplied depending on the function of the drive electrode COML during each operation. When the unit frame FL1 is time-divided into the display operation period FLdp and the pressure detection operation period FLfs, influence of the current flowing during display operation can be suppressed when the plurality of signal lines SGL illustrated in FIG. 6 are utilized as the detection electrodes of the pressure sensor. Thus, the pressure detection accuracy of the pressure detection unit 30 illustrated in FIG. 1 can be improved.

By the way, in the example illustrated in FIG. 9, the method has been described in which, in a planar view, the plurality of signal lines SGL, as the detection electrodes, of the pressure sensor and the plurality of conductor patterns 8, as the drive electrodes, of the pressure sensor are arrayed to intersect with each other, and the drive signal Vfs is applied sequentially for each one detection block corresponding to the one or the plurality of conductor patterns 8 along the scan direction SC1. However, the method for detecting pressure by utilizing the change in the capacitance value of the capacitive element of the pressure sensor, that is, the electrostatic capacitance-type pressure sensor includes various modification examples.

Figure 11:
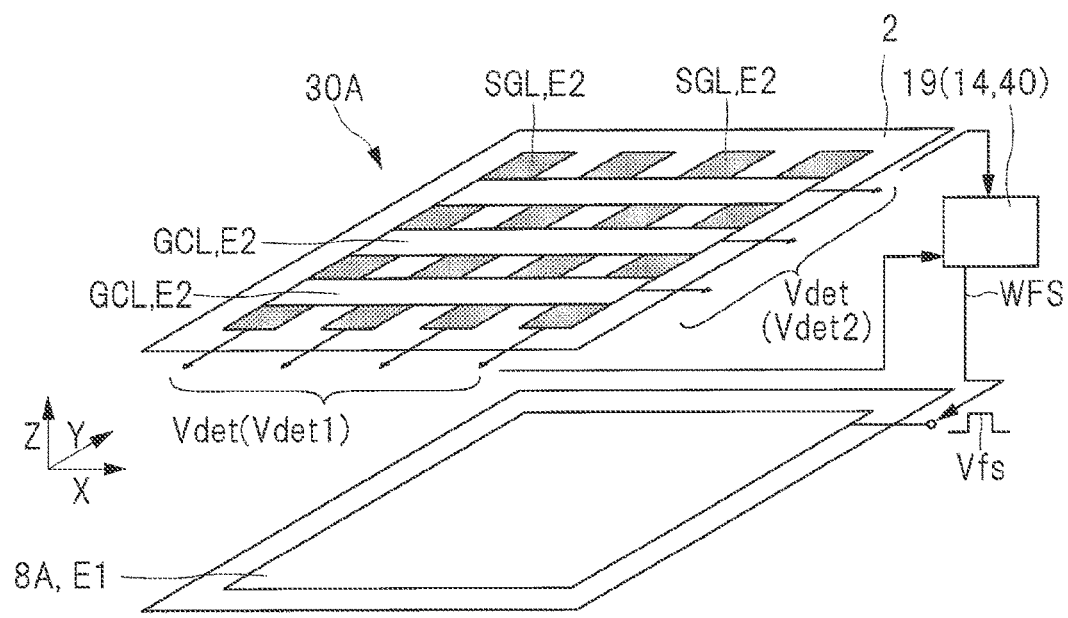
FIG. 11 is an explanatory diagram illustrating a pressure sensor that is a modification example of the pressure sensor of FIG. 9.

For example, a pressure detection unit 30A illustrated in FIG. 11 is different from the pressure detection unit 30 illustrated in FIG. 9 in that the plurality of scanning lines GCL are utilized as the detection electrodes of the pressure sensor, in addition to the plurality of signal lines SGL. FIG. 11 is an explanatory diagram illustrating a pressure sensor that is a modification example of the pressure sensor of FIG. 9. Incidentally, in FIG. 11, in order to easily see the distinction between the plurality of signal lines SGL and the plurality of scanning lines GCL, the signal lines SGL are each illustrated with a pattern.

The pressure detection unit 30A illustrated in FIG. 11 includes, as the detection electrodes of the pressure sensor, the plurality of signal lines SGL extending in the Y direction, and the plurality of scanning lines GCL extending in the X direction intersecting with the Y direction. In a planar view, the plurality of signal lines SGL and the plurality of scanning lines GCL intersect with each other. In pressure detection operation using the pressure detection unit 30A, the detection signal Vdet is output from each of the plurality of signal lines SGL and the plurality of scanning lines GCL. Specifically, a detection signal Vdet1 is output from the plurality of signal lines SGL, and a detection signal Vdet2 is output from the plurality of scanning lines GCL.

In the case of the pressure detection unit 30A of the above configuration, a coordinate of a plane position to which the pressure is applied can be calculated, by combining the detection signal Vdet1 and the detection signal Vdet2 in the coordinate extraction unit 45 (see FIG. 1) of the detection circuit unit 40. Thus, it is not necessary to provide the plurality of conductor patterns 8 to sequentially apply the drive signal Vfs thereto, as in the pressure detection unit 30 illustrated in FIG. 9. Thus, as illustrated in FIG. 11, a conductor pattern 8A as one sheet of conductive film (also referred to as conductor film) is provided at a position overlapping with each of the plurality of signal lines SGL and the plurality of scanning lines GCL in a planar view.

In pressure detection operation using the pressure detection unit 30A, the drive signal Vfs is applied to the conductor pattern 8A. Then, the detection signal Vdet is output collectively from the plurality of signal lines SGL and the plurality of scanning lines GCL. In other words, the detection signal Vdet1 from the plurality of signal lines SGL is output in parallel with the detection signal Vdet2 from the plurality of scanning lines GCL. In this case, operation time can be shortened compared to pressure detection operation using the pressure detection unit 30 illustrated in FIG. 9.

Incidentally, in pressure detection operation using the pressure detection unit 30A, the plurality of signal lines SGL or the plurality of scanning lines GCL can be divided into the plurality of detection blocks to output the detection signal Vdet for each of the detection blocks. Pressure is applied simultaneously to the plurality of positions of the pressure sensor in some cases. At that time, from the viewpoint of improving the detection accuracy of coordinates of the above plurality of positions, it is preferable to output the detection signal Vdet for each of the detection blocks as described above.

As a modification example of the pressure detection unit 30 illustrated in FIG. 9, the following pressure sensor can be used although not illustrated. That is, as the detection electrodes of the pressure sensor, the plurality of scanning lines GCL (see FIG. 11 and FIG. 8) can be used instead of the plurality of signal lines SGL. In this case, the plurality of conductor patterns 8 illustrated in FIG. 9 are provided to intersect with each of the plurality of scanning lines GCL in a planar view. Thus, the change in the capacitance value of the capacitive element formed between the plurality of scanning lines GCL and the conductor pattern 8 can be detected, and the position to which the pressure is applied can be detected.

Incidentally, during the pressure detection operation period in which the plurality of signal lines SGL, the plurality of scanning lines GCL, or both of the plurality of signal lines SGL and the plurality of scanning lines GCL are used as the pressure detection electrode, the plurality of signal lines SGL and the plurality of scanning lines GCL can be disconnected from the source driver 13 and the gate driver 12 illustrated in FIG. 1. In other words, during the pressure detection operation period, the plurality of signal lines SGL and the plurality of scanning lines GCL can be electrically separated from the source driver 13 and the gate driver 12 illustrated in FIG. 1. When the plurality of signal lines SGL and the plurality of scanning lines GCL are utilized as the detection electrodes for pressure detection, as with the pressure detection unit 30A as illustrated in FIG. 11 and the pressure detection unit 30B described below, a circuit connected to the plurality of signal lines SGL and the plurality of scanning lines GCL includes various embodiments. The various embodiments of the circuit connected to the plurality of signal lines SGL and the plurality of scanning lines GCL will be described later.

Figure 12:
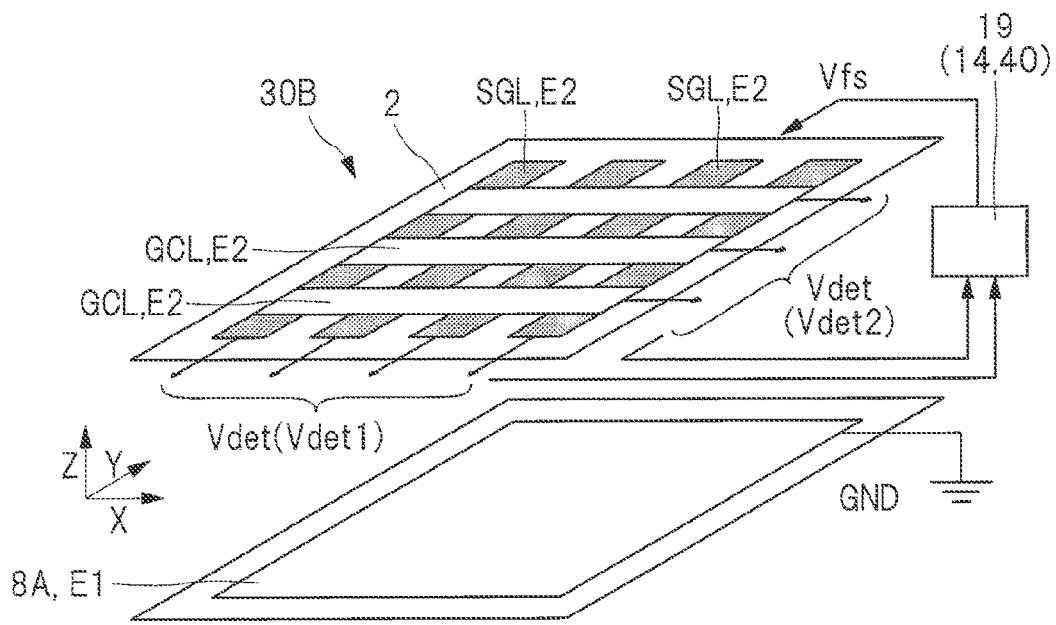
FIG. 12 is an explanatory diagram illustrating a pressure sensor that is a modification example of the pressure sensor of FIG. 11.
Figure 13:
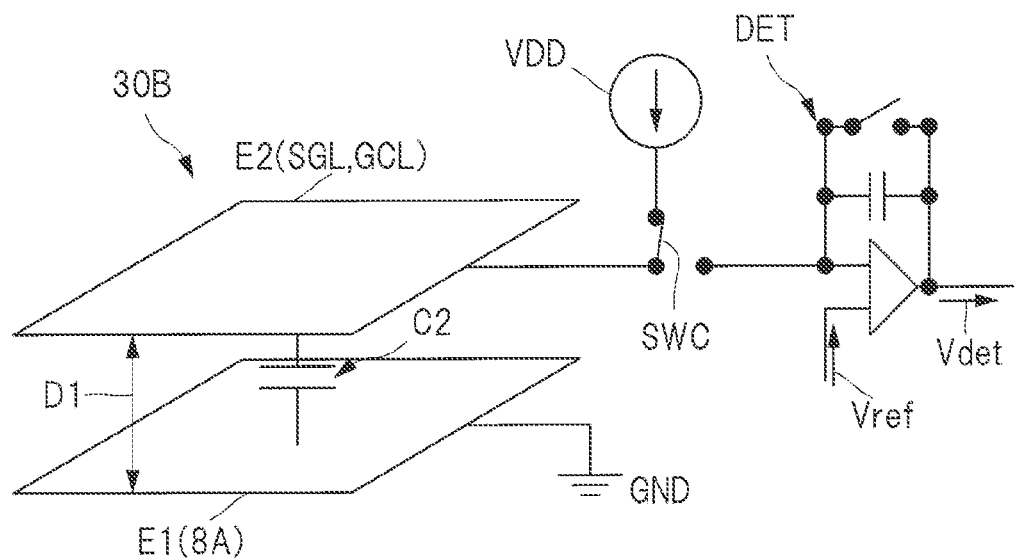
FIG. 13 is an explanatory diagram schematically illustrating a detection principle of the pressure sensor of a self-capacitance method illustrated in FIG. 12.
Figure 14:
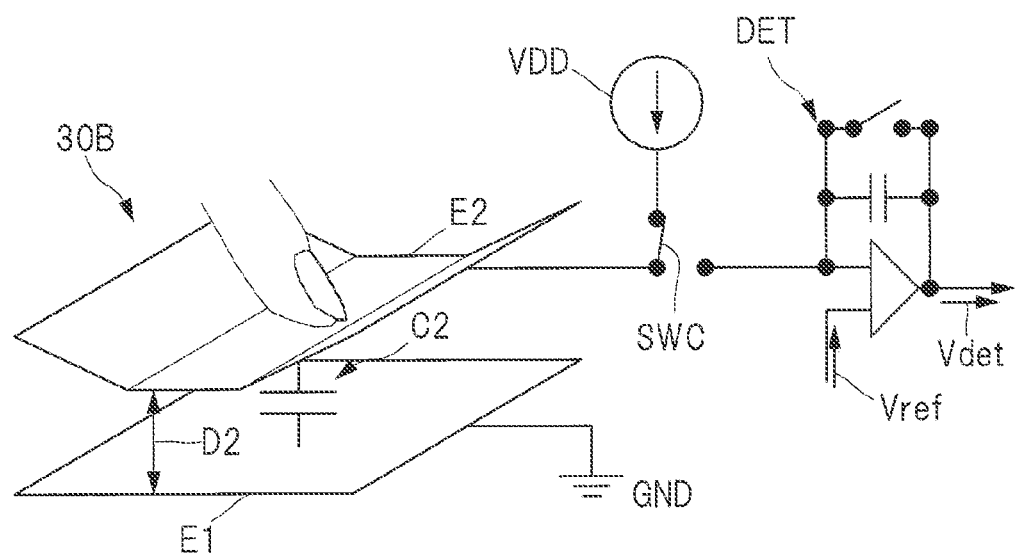
FIG. 14 is an explanatory diagram schematically illustrating a detection principle of the pressure sensor of the self-capacitance method illustrated in FIG. 12.
Figure 15:
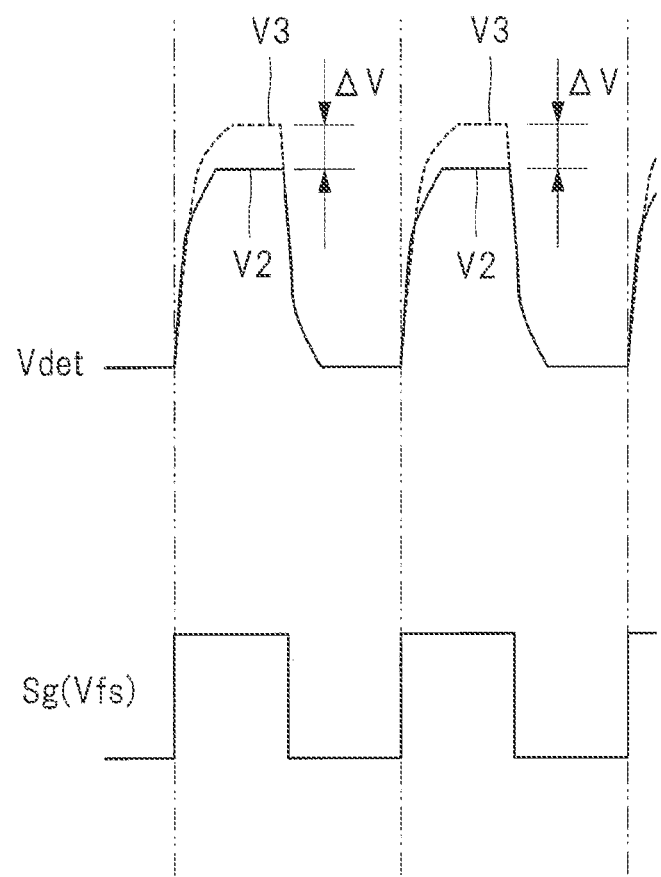
FIG. 15 is a diagram illustrating a waveform example of a detection signal in a case of the pressure sensor of the self-capacitance method of when the pressure is applied and when the pressure is not applied.

As another modification example, both of the plurality of signal lines and the plurality of scanning lines, or either one of the plurality of signal lines and the plurality of scanning lines can be made to be the pressure sensor of the self-capacitance method. For example, in a case of the pressure detection unit 30B illustrated in FIG. 12, the drive signal Vfs is supplied to both of the plurality of signal lines SGL and the plurality of scanning lines GCL, or either one of the plurality of signal lines SGL and the plurality of scanning lines GCL. A fixed potential such as a ground potential GND is supplied to the conductor pattern 8A. FIG. 12 is an explanatory diagram illustrating a pressure sensor that is a modification example of the pressure sensor of FIG. 11. FIG. 13 and FIG. 14 are explanatory diagrams schematically illustrating a detection principle of the pressure sensor of the self-capacitance method illustrated in FIG. 12. FIG. 15 is a diagram illustrating a waveform example of a detection signal in a case of the pressure sensor of the self-capacitance method of when the pressure is applied and the pressure is not applied.

A method for detecting pressure with the electrostatic capacitance method is referred to as the mutual-capacitance method. In the mutual-capacitance method, the drive signal Vfs is applied to the conductor pattern 8 or the conductor pattern 8A as the drive electrode as in the pressure detection unit 30 illustrated in FIG. 9 and the pressure detection unit 30A illustrated in FIG. 11, and pressure due to a change in the air gap between the drive electrode and the detection electrode (as the signal line SGL or the scanning line GCL), that is, the pressure due to the change in the distance between the electrodes is detected with the electrostatic capacitance method.

On the other hand, a method for detecting pressure with the electrostatic capacitance method is referred to as the self-capacitance method. In the self-capacitance method, a fixed potential such as the ground potential GND is supplied to the conductor pattern 8A as in the pressure detection unit 30B illustrated in FIG. 12 to FIG. 14, the drive signal Vfs supplied to the signal line SGL or the scanning line GCL is detected, and pressure due to change in the air gap between the signal line SGL or the scanning line GCL and the conductor pattern 8A, that is, the pressure due to the change in the distance between the electrodes is detected with the electrostatic capacitance method.

In pressure detection operation of the self-capacitance method, as illustrated in FIG. 13 and FIG. 14, a switch SWC is provided between the electrode E2 and a power source VDD for supplying the drive signal Vfs (see FIG. 12), and between the electrode E2 and the voltage detector DET. In pressure detection operation of the self-capacitance method, by switching the switch SWC, the power source VDD and the electrode E2, or the voltage detector DET and the electrode E2 are electrically connected to each other alternately via the switch SWC. As illustrated in FIG. 13 and FIG. 14, while the electrode E2 is electrically connected to the power source VDD, charge is accumulated in a capacitive element C2. Then, when the electrode E2 is disconnected from the power source VDD and connected to the voltage detector DET, the charge accumulated in the capacitive element C2 is discharged.

Here, as can be seen by comparing FIG. 13 with FIG. 14, the capacitance value of the capacitive element C2 is different between a case in which the pressure is applied to the pressure detection unit 30B as the pressure sensor and a case in which the pressure is not applied. That is, the amount of charge accumulated in the capacitive element C2 is different between the case in which the pressure is applied to the pressure detection unit 30B and the case in which the pressure is not applied. As a result, in the case in which the pressure is applied to the pressure detection unit 30B, current flowing through the voltage detector DET is increased compared to the case in which the pressure is not applied.

In the case of the pressure sensor of the self-capacitance method, by alternately switching the switch SWC illustrated in FIG. 13 and FIG. 14, a waveform of the detection signal Vdet illustrated in FIG. 15 is obtained. In other words, in the case of the self-capacitance method, a potential corresponding to the AC square wave Sg illustrated in FIG. 15 is applied to the electrode E2 by charging, and the detection signal Vdet is output based on the applied potential by discharging. That is, in a state in which the pressure is not applied to the pressure sensor, when the electrode E2 is connected to the voltage detector DET via the switch SWC in association with charging and discharging to the capacitive element C2 due to switching operation of the switch SWC illustrated in FIG. 13, current flows depending on the capacitance value of the capacitive element C2. The voltage detector DET converts variation of the current into variation of the voltage. The variation of the voltage is illustrated by a waveform V2 of a solid line in FIG. 15.

On the other hand, in a state in which the pressure is applied to the pressure sensor, as illustrated in FIG. 14, due to deformation of a part of the pressure sensor, the separation distance D2 between the electrode E1 and the electrode E2 becomes smaller than the separation distance D1 illustrated in FIG. 13. Thus, the capacitance value of the capacitive element C2 is increased. Thus, the current flowing through the capacitive element C2 illustrated in FIG. 14 varies. The voltage detector DET converts variation of the current into variation of the voltage. The variation of the voltage is illustrated by a waveform V3 of a dashed line in FIG. 15. In this case, amplitude of the waveform V3 becomes larger compared to amplitude of the waveform V2 described above. Thus, an absolute value |ΔV| of voltage difference between the waveform V2 and the waveform V3 is changed depending on influence of deformation of the pressure sensor. Thus, the change in the capacitance value of the capacitive element C2 due to presence or absence of pressure applied from the outside can be detected as the change in the voltage.

Utilizing the pressure detection unit 30B of the self-capacitance method as described above is preferable in the following points compared to the mutual-capacitance method. That is, as illustrated in FIG. 12, the conductor pattern 8A only has to be connected to a fixed potential such as the ground potential GND, so that the conductor pattern 8A and the semiconductor chip 19 may not be connected to each other. In other words, the conductor pattern 8A can be electrically separated from the semiconductor chip 19. For example, when connected to the ground potential GND, the conductor pattern 8A may be connected to an optional member such as a housing (not illustrated) of constituent components of a module in which the display device DP1 illustrated in FIG. 1 is incorporated. In other words, according to the present modification example, the wiring WFS illustrated in FIG. 5, FIG. 9, or FIG. 11 can be omitted. Thus, a wiring layout can be simplified compared to the pressure detection unit 30 or the pressure detection unit 30A of the mutual-capacitance method illustrated in FIG. 9 and FIG. 11.

Incidentally, when the self-capacitance method is adopted, in order to identify a position coordinate of the X-Y plane in FIG. 12, both of the plurality of signal lines SGL extending along the X direction and the plurality of scanning lines GCL extending along the Y direction are used as the detection electrodes as illustrated in FIG. 12. However, as a modification example, either one of the plurality of signal lines SGL and the plurality of scanning lines GCL can be used. In this case, the coordinate position of any direction of the X direction and the Y direction illustrated in FIG. 12 is not detected. However, information can be acquired, such as strength of the pressure applied and time in which the pressure is applied.

During the pressure detection operation period in which the plurality of signal lines SGL, the plurality of scanning lines GCL, or both of the plurality of signal lines SGL and the plurality of scanning lines GCL are used as the pressure detection electrodes of the self-capacitance method, the plurality of signal lines SGL and the plurality of scanning lines GCL can be connected to the drive driver 14 illustrated in FIG. 1. In this case, the drive driver 14 is available as the power source VDD for charging the capacitive element C2 illustrated in FIG. 13 and FIG. 14. However, as the power source VDD for charging the capacitive element C2 illustrated in FIG. 13 and FIG. 14, a drive circuit different from the drive driver 14 illustrated in FIG. 1 can be available during the pressure detection operation period.

As with the modification example described above, in pressure detection operation using the pressure detection unit 30B, the plurality of signal lines SGL or the plurality of scanning lines GCL can be divided into the plurality of detection blocks to output the detection signal Vdet for each of the detection blocks. Pressure is applied simultaneously to the plurality of positions of the pressure sensor in some cases. At that time, from the viewpoint of improving the detection accuracy of coordinates of the above plurality of positions, it is preferable to output the detection signal Vdet for each of the detection blocks as described above.

On the other hand, from the viewpoint of shortening the pressure detection operation period FLfs illustrated in FIG. 10, it is preferable to output the detection signal Vdet collectively from the plurality of signal lines SGL and the plurality of scanning lines GCL.

In the case of the pressure sensor of the self-capacitance method, compared to the pressure sensor of the mutual-capacitance method, influence of parasitic capacitance, which is generated between the detection electrodes and the conductor pattern provided in the periphery of the detection electrodes, is large. Accordingly, from the viewpoint of improving the detection accuracy of the pressure sensor of the self-capacitance method, the following configuration is preferable.

That is, the same signal waveform as that of the drive signal Vfs illustrated in FIG. 15 is applied to the conductor pattern around the electrode E2 (see FIG. 12) as the detection target. It is preferable that timing for applying the same waveform as that of the drive signal Vfs is synchronized with timing for applying the drive signal Vfs to the electrode E2 as the detection target. Thus, the influence of the parasitic capacitance formed between the detection electrodes and the conductor pattern around the detection electrodes can be significantly reduced.

Hereinafter, in the present application, a method is referred to as the active shield method which applies a pulse potential having the same waveform as that of the drive signal Vfs to the conductor pattern around the detection electrodes in synchronization with the timing in which the drive signal Vfs is applied to the detection electrodes. For example, "to apply the pulse potential having the same waveform as that of the drive signal Vfs to a first conductor pattern in synchronization with the timing in which the drive signal Vfs is applied to the detection electrodes" is described as to apply the active shield method to the first conductor pattern.

As for the parasitic capacitance formed between the conductor patterns, the parasitic capacitance value is increased as a plane area of the conductor pattern is increased. In addition, as for the parasitic capacitance formed between the conductor patterns, the parasitic capacitance value is increased as a distance between the conductor patterns is decreased. Accordingly, it is preferable to apply the active shield method to the drive electrode COML illustrated in FIG. 6. In pressure detection operation of the self-capacitance method, when the detection signal Vdet is output collectively from the plurality of signal lines SGL and the plurality of scanning lines GCL, all of the plurality of signal lines SGL and the plurality of scanning lines GCL operate as the detection electrode, so that the active shield method cannot be applied.

However, as described as the modification example, when either one of the plurality of signal lines SGL and the plurality of scanning lines GCL is utilized as the detection electrode, it is preferable to apply the active shield method to the conductor pattern not utilized as the detection electrode.

As described as another modification example, the plurality of signal lines SGL or the plurality of scanning lines GCL is divided into the plurality of detection blocks to output the detection signal Vdet for each of the detection blocks in some cases. In this case, it is preferable to apply the active shield method to the conductor pattern (for example, signal lines SGL, or scanning lines GCL) in which the detection signal Vdet is not output for the detection block.

As illustrated in FIG. 8, the plurality of signal lines SGL are provided for each column of the sub-pixels SPix, that is, each vertical line of the sub-pixels SPix along the Y direction illustrated in FIG. 8. The plurality of scanning lines GCL are provided for each row of the sub-pixels SPix, that is, each horizontal line of the sub-pixels SPix along the X direction illustrated in FIG. 8. Thus, when the voltage detector DET illustrated in FIG. 13 is connected to each of the plurality of signal lines SGL and the plurality of scanning lines GCL, a large number of voltage detectors DET is required. In this case, a component size including the plurality of voltage detectors DET is large.

For example, in the example of the present embodiment, the plurality of voltage detectors DET are formed on the semiconductor chip 19 illustrated in FIG. 5. In this case, from the viewpoint of downsizing the plane area of the semiconductor chip 19, it is preferable that the number of voltage detectors DET is small. Accordingly, the inventors of the present application have studied a technique for reducing the number of voltage detectors DET used in the same timing, and has found the following modification example.

Figure 16:
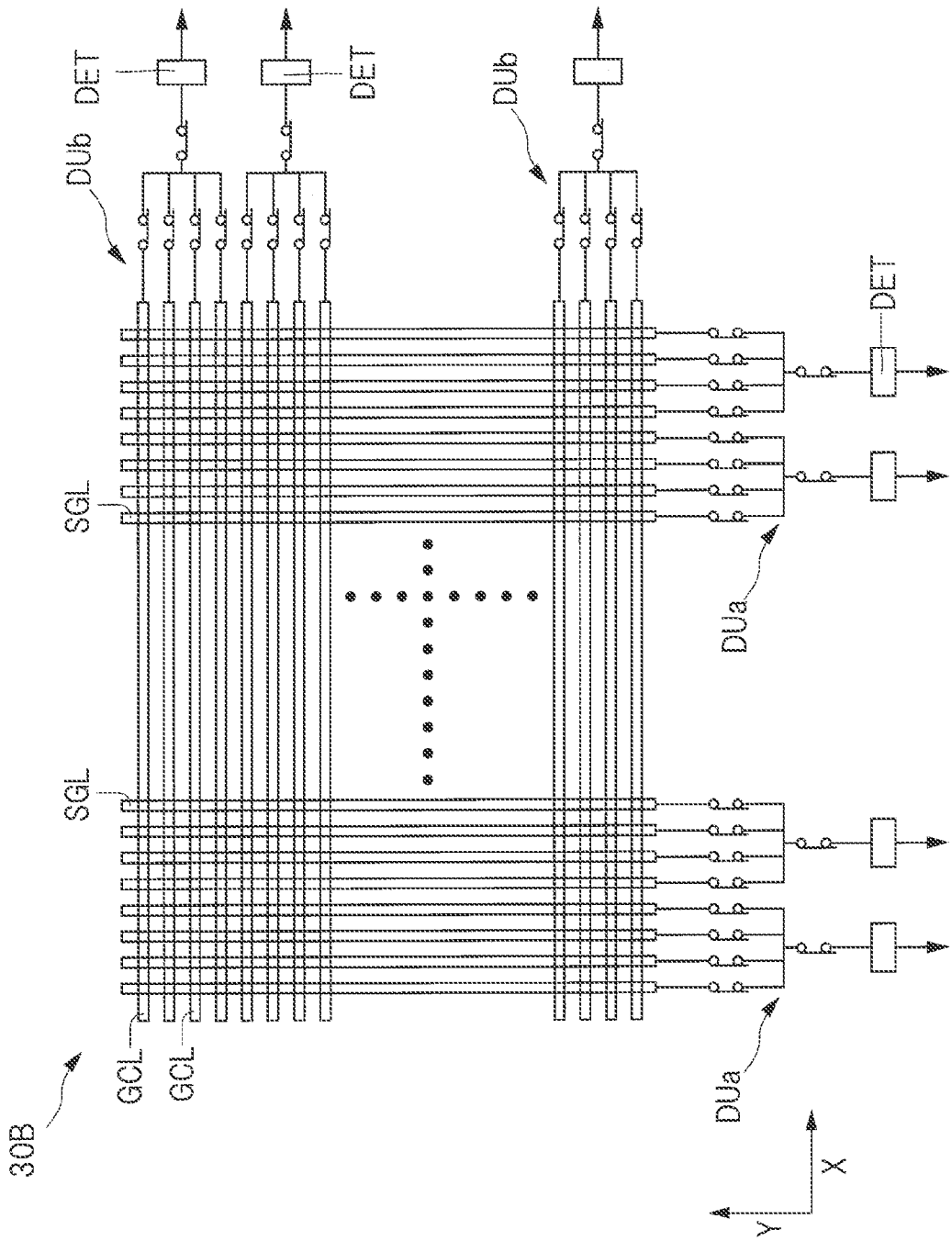
FIG. 16 is an explanatory diagram illustrating a connection example between voltage detectors and signal lines and scanning lines configuring detection electrodes of the pressure sensor illustrated in FIG. 12.

FIG. 16 is an explanatory diagram illustrating a connection example between voltage detectors and signal lines and scanning lines configuring detection electrodes of the pressure sensor illustrated in FIG. 12. Incidentally, in FIG. 16, it is illustrated as a connection example of the pressure detection unit 30B illustrated in FIG. 12; however, it can also be applied as a connection example of the pressure detection unit 30A illustrated in FIG. 11.

The plurality of signal lines SGL and the plurality of scanning lines GCL, configuring the detection electrodes of the pressure detection unit 30B illustrated in FIG. 16, are electrically connected to the voltage detectors DET as described below. That is, the plurality of signal lines SGL form a plurality of detection blocks DUa by electrically connecting some of the plurality of signal lines SGL arranged to be adjacent to each other. In addition, the plurality of scanning lines GCL form a plurality of detection blocks DUb by electrically connecting some of the plurality of scanning lines GCL arranged to be adjacent to each other. In the pressure detection operation period, each of the plurality of detection blocks DUa and the plurality of detection blocks DUb is connected to the plurality of voltage detectors DET.

In other words, in the plurality of signal lines SGL configuring the detection electrodes of the pressure detection unit 30B, some of the plurality of signal lines SGL, which are arranged to be adjacent to each other, are connected in parallel to each other to be connected to one voltage detector DET. In addition, in the plurality of scanning lines GCL configuring the detection electrodes of the pressure detection unit 30B, some of the plurality of scanning lines GCL, which are arranged to be adjacent to each other, are connected in parallel to each other to be connected to one voltage detector DET.

As described above, the plurality of signal lines SGL illustrated in FIG. 8 are provided for each column of the sub-pixels SPix. The plurality of scanning lines GCL are provided for each row of the sub-pixels SPix. The size of the sub-pixel SPix influences the resolution of the display unit 20 (see FIG. 1), so that the plane size is extremely small from the viewpoint of improving the quality of the display image. On the other hand, when the coordinate position of pressure detection is detected, the resolution can be lower than the resolution required for the display unit 20.

Accordingly, in an example illustrated in FIG. 16, some of the plurality of the signal lines SGL are connected in parallel to each other to be connected to one voltage detector DET. In addition, some of the plurality of the scanning lines GCL are connected in parallel to each other to be connected to one voltage detector DET. Thus, for example, even when the detection signal Vdet (see FIG. 12) is output collectively from the plurality of signal lines SGL and the plurality of scanning lines GCL, the number of voltage detectors DET can be reduced.

Incidentally, in the example illustrated in FIG. 16, four signal lines SGL and four scanning lines GCL are each connected in parallel to each other. However, the number of the signal lines SGL or the scanning lines GCL connected in parallel to each other can be the number other than four depending on the resolution required. When the number of the signal lines SGL or the scanning lines GCL connected in parallel to each other is decreased, the resolution of the coordinates of pressure detection is improved. On the other hand, when the number of the signal lines SGL or the scanning lines GCL connected in parallel to each other is increased, the resolution is decreased, but the number of the voltage detectors DET can be reduced.

As described in the pressure detection unit 30 illustrated in FIG. 9 and the modification example thereof, when either only one of the plurality of signal lines SGL and the plurality of scanning lines GCL is used as the detection electrodes, the number of voltage detectors can be further reduced. In this case, as already described above, the detection accuracy can be improved by applying the detection waveform of the waveform V2 illustrated in FIG. 15 to the wiring not used as the detection electrodes.

Figure 17:
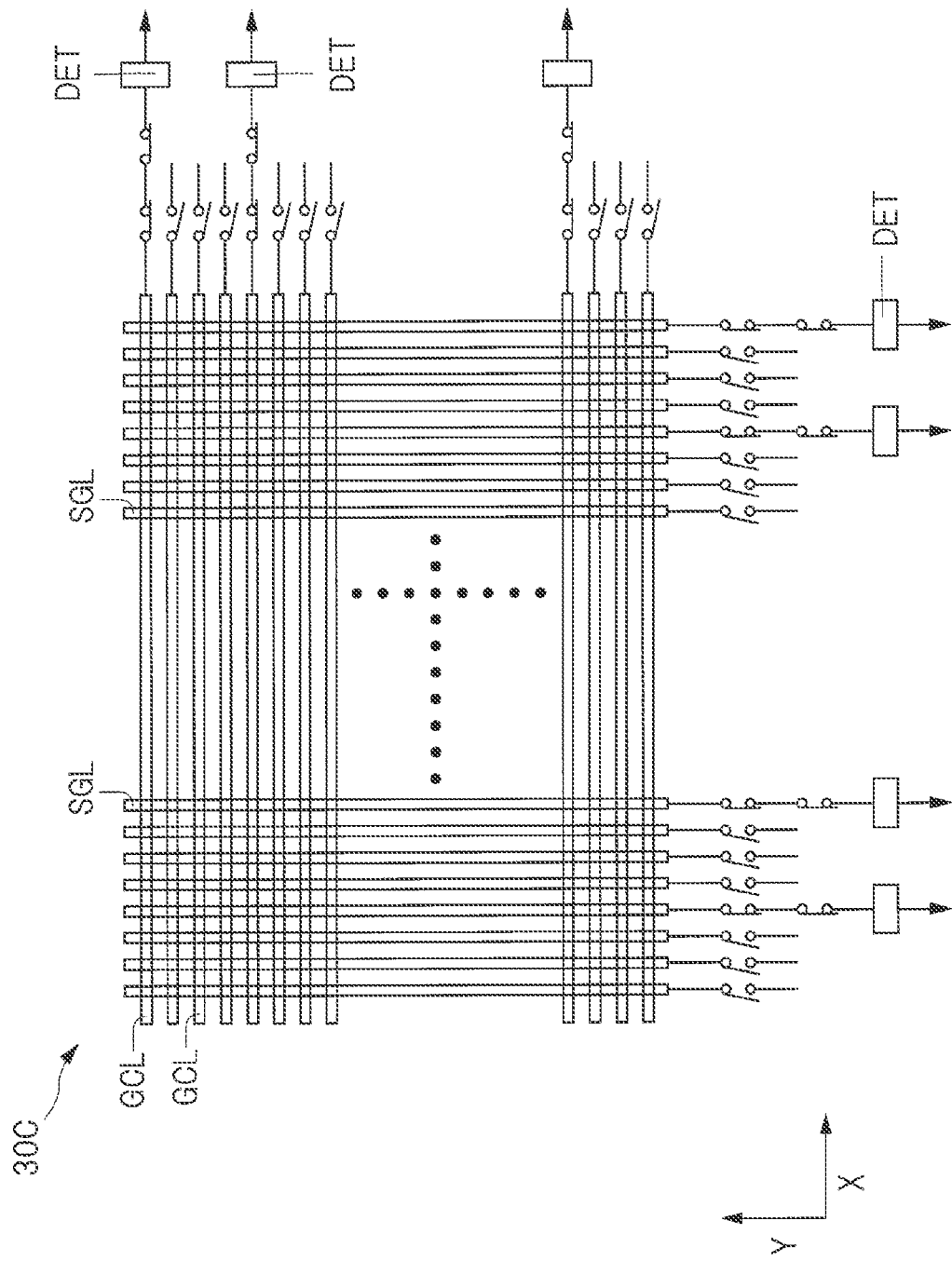
FIG. 17 is an explanatory diagram illustrating a connection example between voltage detectors, and signal lines and scanning lines configuring detection electrodes of a pressure sensor that is a modification example of the pressure sensor of FIG. 16.

As a modification example of the connection example of FIG. 16, it is possible to adopt the connection example as seen in a pressure detection unit 30C illustrated in FIG. 17. FIG. 17 is an explanatory diagram illustrating a connection example between voltage detectors, and signal lines and scanning lines configuring detection electrodes of a pressure sensor that is a modification example of the pressure sensor of FIG. 16.

The plurality of signal lines SGL and the plurality of scanning lines GCL configuring the detection electrodes of the pressure detection unit 30C illustrated in FIG. 17 are electrically connected to the voltage detectors DET as described below. That is, in the plurality of signal lines SGL, some of the plurality of signal lines SGL adjacent to each other are connected to the voltage detectors DET, and the others are electrically separated from the voltage detectors DET. In the plurality of scanning lines GCL, some of the plurality of scanning lines GCL adjacent to each other are connected to the voltage detectors DET, and the others are electrically separated from the voltage detectors DET.

In a case of a configuration in which some of the plurality of signal lines SGL or some of the plurality of scanning lines GCL are not connected to the voltage detectors DET, as in the pressure detection unit 30C, the number of voltage detectors DET can be reduced, as with the pressure detection unit 30B illustrated in FIG. 16. However, the capacitance value of the capacitive element C2 illustrated in FIG. 13 and FIG. 14 is increased as the plane area of the detection electrodes is increased. Accordingly, the pressure detection unit 30B illustrated in FIG. 16 is preferable, from the viewpoint of improving the detection accuracy by increasing the capacitance of the capacitive element C2.

In the case of the pressure detection unit 30C illustrated in FIG. 17, when the signal lines SGL or the scanning lines GCL, which are not connected to the respective voltage detectors DET, are connected to the other circuit during the pressure detection operation period, it is preferable to adopt the active shield method by applying the detection waveform of the waveform V2 illustrated in FIG. 15 to the above signal lines SGL or scanning lines GCL not connected to the respective voltage detectors DET. Thus, formation of the parasitic capacitance can be suppressed between the signal lines SGL or the scanning lines GCL connected to the respective voltage detectors DET. Alternatively, as illustrated in FIG. 17, it is preferable to electrically separate the above signal lines SGL or scanning lines GCL not connected to the voltage detectors DET from the other circuit during pressure detection operation. The parasitic capacitance is hardly formed in the conductor pattern of floating not connected to the other circuit.

Figure 18:
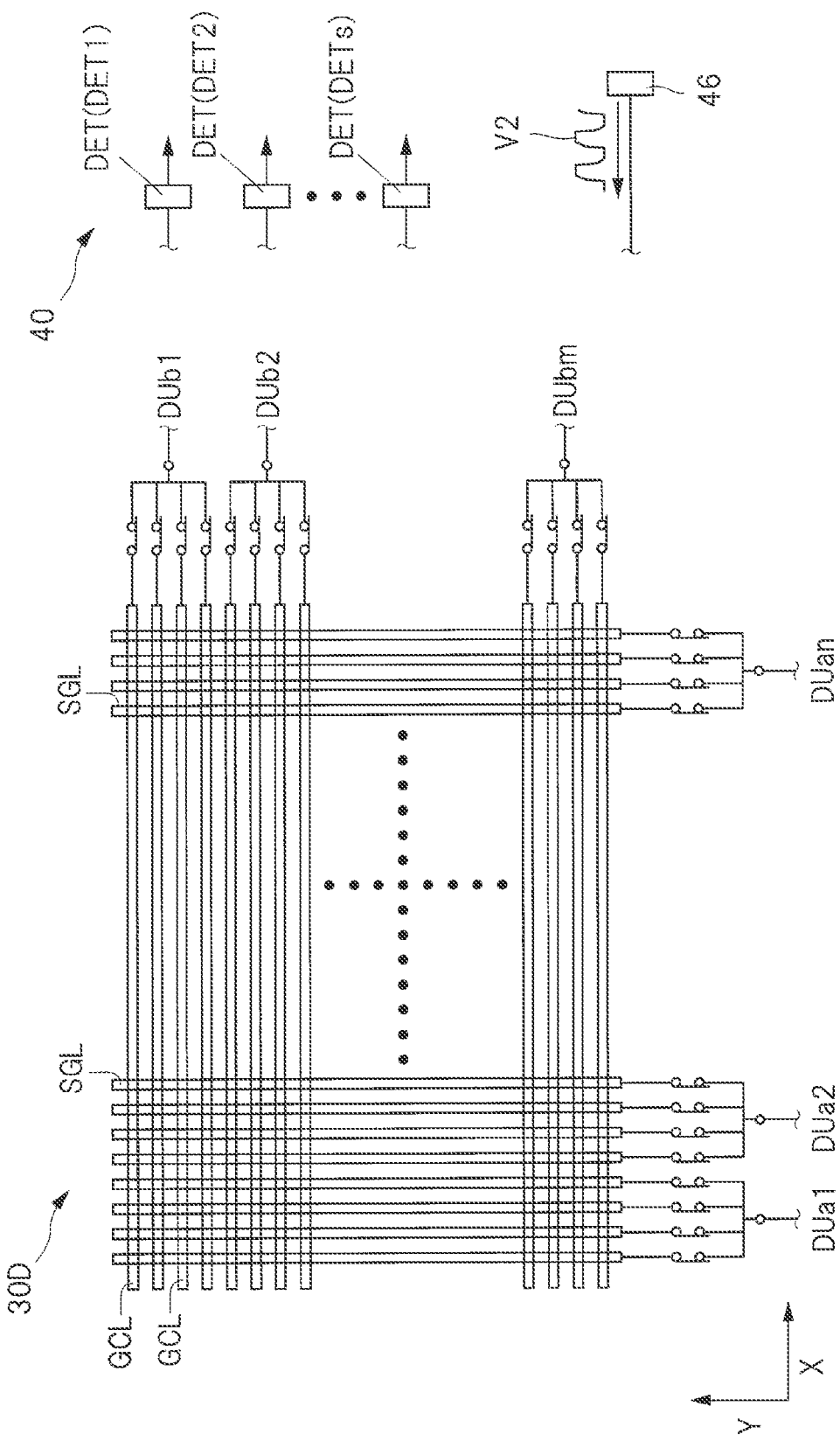
FIG. 18 is an explanatory diagram illustrating a connection example between voltage detectors, and signal lines and scanning lines configuring detection electrodes of a pressure sensor that is another modification example of the pressure sensor of FIG. 16.

As another modification example of the connection example of FIG. 16, it is possible to adopt the connection example as seen in a pressure detection unit 30D illustrated in FIG. 18. FIG. 18 is an explanatory diagram illustrating a connection example between voltage detectors, and signal lines and scanning lines configuring detection electrodes of a pressure sensor that is another modification example of the pressure sensor of FIG. 16.

The detection electrodes of the pressure detection unit 30D illustrated in FIG. 18 are configured by the plurality of signal lines SGL and the plurality of scanning lines GCL. This configuration is the same as the pressure detection unit 30B illustrated in FIG. 16. However, in the case of the pressure detection unit 30D, timing for outputting the detection signal Vdet1 (see FIG. 12) from the plurality of signal lines SGL and timing for outputting the detection signal Vdet2 (see FIG. 12) from the plurality of scanning lines GCL are temporally divided. In other words, in a pressure detection method using the pressure detection unit 30D, a detection operation period for outputting the detection signal Vdet1 from the plurality of signal lines SGL and a detection operation period for outputting the detection signal Vdet2 from the plurality of scanning lines GCL are performed by time-division. Further, in other words, the pressure detection unit 30D outputs the detection signal Vdet from either one of the plurality of signal lines SGL and the plurality of scanning lines GCL, and then outputs the detection signal Vdet from the other thereof.

For example, in an example illustrated in FIG. 18, the plurality of signal lines SGL are divided into n detection units including a detection block DUa1, a detection block DUa2, . . . , and a detection block DUan. The plurality of scanning lines GCL are divided into m detection units including a detection block DUb1, a detection block DUb2, . . . , and a detection block DUbm. On the other hand, the detection circuit unit 40 includes s voltage detectors DET including a voltage detector DET1, voltage detector DET2, . . . , and a voltage detector DETs.

Here, in a period for outputting the detection signal Vdet1 (see FIG. 12) from the plurality of signal lines SGL, in order of the detection block DUa1 and the voltage detector DET1, the detection block DUa2 and voltage detector DET2, and . . . , the plurality of signal lines SGL and the plurality of voltage detectors DET are each electrically connected to each other. At that time, each of the plurality of scanning lines GCL is electrically separated from the voltage detectors DET. Thus, the detection signals Vdet1 output from the plurality of signal lines SGL are selectively detected.

On the other hand, in a period for outputting the detection signal Vdet2 (see FIG. 12) from the plurality of scanning lines GCL, in order of the detection block DUb1 and the voltage detector DET1, the detection block DUb2 and the voltage detector DET2, and . . . , the plurality of scanning lines GCL and the plurality of voltage detectors DET are each electrically connected to each other. At that time, each of the plurality of signal lines SGL is electrically separated from the voltage detector DET. Thus, the detection signals Vdet2 output from the plurality of scanning lines GCL are selectively detected.

Switching of the connection between the period for outputting the detection signal Vdet1 (see FIG. 12) from the plurality of signal lines SGL and the period for outputting the detection signal Vdet2 (see FIG. 12) from the plurality of scanning lines GCL can be performed by using a switch not illustrated.

In the case of the pressure sensor illustrated in FIG. 18, the number of voltage detectors DET only has to be larger than the above n or m. Thus, compared to the examples illustrated in FIG. 16 and FIG. 17, the number of voltage detectors DET can be significantly reduced.

When pressure detection is performed by using the pressure detection unit 30D, as described above, the wiring which is not connected to the voltage detectors DET is present during pressure detection operation. Accordingly, as described above, from the viewpoint of reducing the parasitic capacitance to improve the detection accuracy of pressure detection, it is preferable to adopt the active shield method by supplying the waveform V2 to the plurality of wirings electrically separated from the voltage detectors DET during pressure detection operation.

Figure 19:
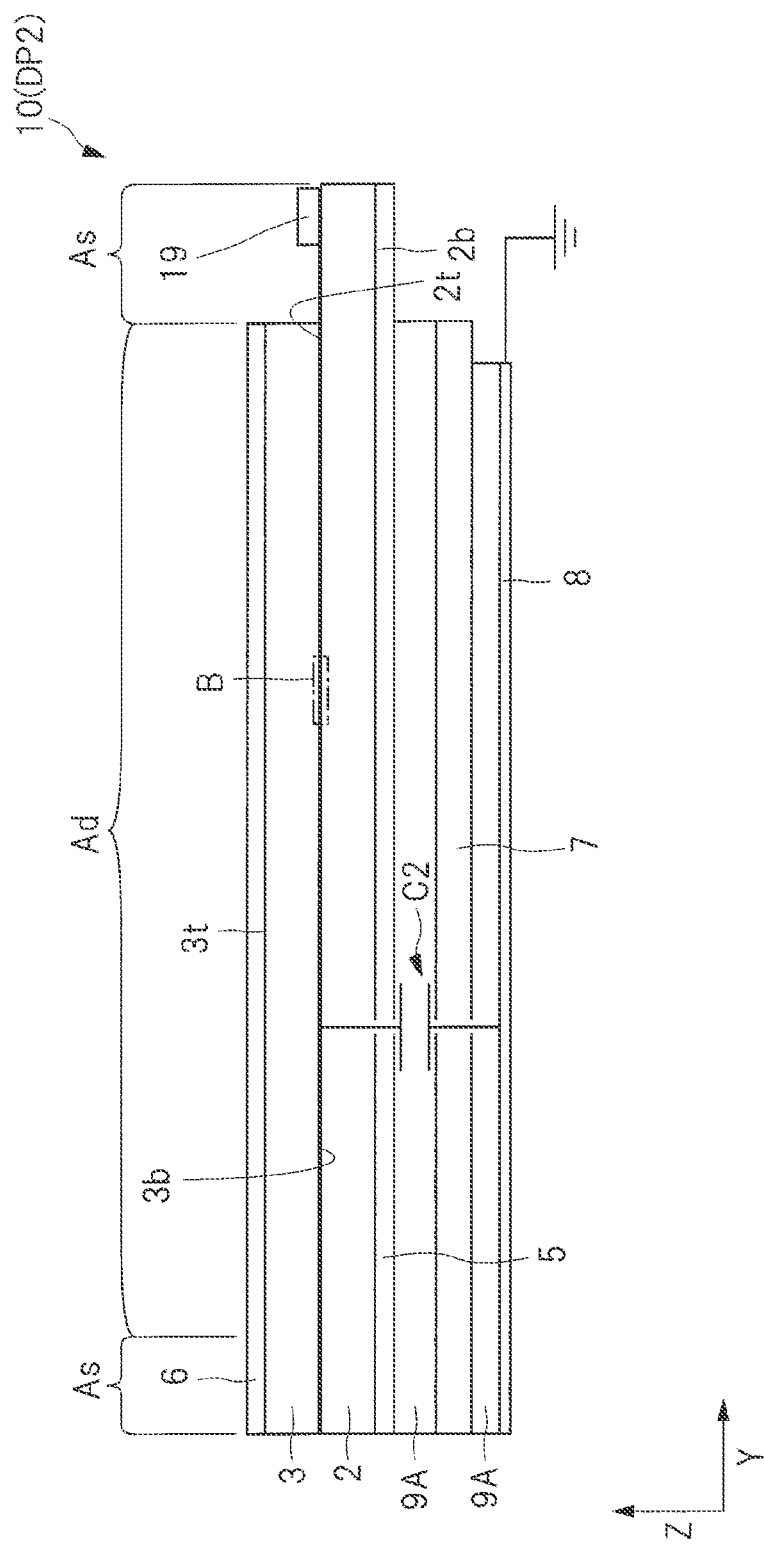
FIG. 19 is a cross-sectional view illustrating an example of a display device that is a modification example of the display device of FIG. 5.

In the example illustrated in FIG. 5, the example of the display device DP1 in which the hollow space 9 is provided between the conductor pattern 8 and the array substrate 2 has been described. However, as in a display device DP2 illustrated in FIG. 19, the elastic body 9A that is elastically deformed more easily than the array substrate 2 can be provided between the conductor pattern 8 and the array substrate 2. FIG. 19 is a cross-sectional view illustrating an example of a display device that is a modification example of the display device of FIG. 5.

The display device DP2 illustrated in FIG. 19 includes the elastic body 9A provided between the conductor pattern 8 and the array substrate 2. The elastic body 9A is a member that is elastically deformed more easily than the array substrate 2 and the substrate 21 illustrated in FIG. 6. In other words, the elastic body 9A is a member whose elasticity is lower than elasticity of the array substrate 2 and substrate 21 illustrated in FIG. 6. In an example illustrated in FIG. 19, the plurality of elastic bodies 9A are provided between the conductor pattern 8 and the array substrate 2. The thickness of the plurality of elastic bodies 9A, that is, the total length in the direction perpendicular to the lower surface 2b of the array substrate 2 is large compared to the thickness of the liquid crystal layer 4 illustrated in FIG. 6.

When the elastic bodies 9A in the plurality of layers of are provided as in the display device DP2, the amount of change can be increased in the capacitance value of the capacitive element C2 illustrated in FIG. 13 and FIG. 14, as a total thickness of the hollow space 9 is large. That is, according to the present modification example, the change in the capacitance value that is changed due to pressure applied from the outside can be increased, so that influence of the noise component can be reduced. Thus, detection accuracy of the pressure sensor can be improved.

Incidentally, as a modification example of the display device of FIG. 19, the elastic body 9A in one layer can be provided. In this case, by making the thickness of the elastic body 9A in the one layer larger than at least the thickness of the liquid crystal layer 4 illustrated in FIG. 6, the amount of change can be increased in the capacitance value of the capacitive element C2 illustrated in FIG. 13 and FIG. 14. It is preferable that the thickness of the elastic body 9A in the one layer is equal to or larger than the thickness of the array substrate 2.

Incidentally, when the plurality of elastic bodies 9A are provided between the conductor pattern 8 and the array substrate 2 as described above, "a thickness of the elastic body" means a total thickness of the plurality of elastic bodies 9A.

As the elastic deformation layer for promoting local elastic deformation of the pressure sensor, there have been described the examples of providing the hollow space 9 in FIG. 5, and of providing the elastic body 9A in FIG. 19. However, the combination of the example illustrated in FIG. 5 and the example illustrated in FIG. 19 can be applied. For example, when gaps are provided at a plurality of positions between the conductor pattern 8 and the array substrate 2, the hollow space 9 can be provided in some of the gaps, and the elastic body 9A can be provided in the other gaps, although not illustrated.

FIG. 19 illustrates the example using the pressure sensor of the self-capacitance method. Thus, the wiring WFS illustrated in FIG. 5 is not provided in the display device of FIG. 19. However, as illustrated in FIG. 5, in the pressure sensor of the mutual-capacitance method, the elastic body 9A illustrated in FIG. 19 can be provided. In the pressure sensor of the self-capacitance method illustrated in FIG. 19, the hollow space 9 illustrated in FIG. 5 can be provided.

In FIG. 5 and FIG. 19, in order to increase the separation distance between the conductor pattern 8 and the array substrate 2, the conductor pattern 8 is provided below the light-guiding plate 7 provided on the lower surface 2b side of the array substrate 2. In other words, in the display device DP1 and the display device DP2, the polarizing plate 5 and the light-guiding plate 7 are provided between the conductor pattern 8 and the array substrate 2.

However, as long as the detection accuracy of the pressure sensor is sufficiency improved, the other members may not be arranged between the conductor pattern 8 and the array substrate 2. For example, when the organic EL is used as the display function layer, an optical function film such as the polarizing plate 5 and the light-guiding plate 7 is not provided in some cases.

Figure 20:
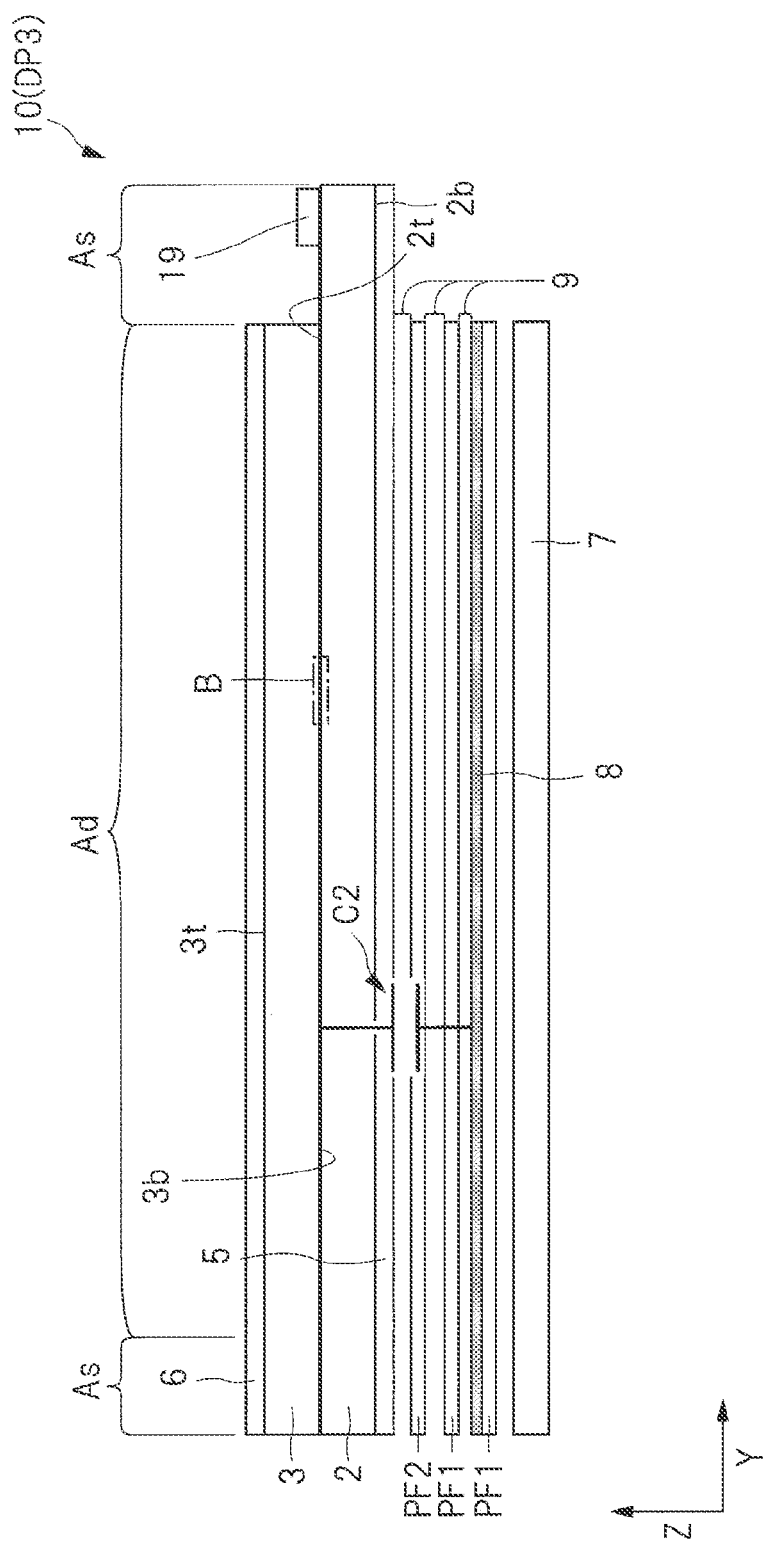
FIG. 20 is a cross-sectional view illustrating an example of a display device that is a modification example of the display device of FIG. 19.

FIG. 20 is a cross-sectional view illustrating an example of a display device that is a modification example of the display device of FIG. 19. Incidentally, in FIG. 20, in order to easily see the position of the conductor pattern 8, the conductor pattern 8 is illustrated with a pattern. When the pressure sensor is stably deformed depending on pressure applied from the outside, the detection accuracy of pressure can be improved, so that a member other than the polarizing plate 5 and the light-guiding plate 7 can be provided between the conductor pattern 8 and the array substrate 2. For example, in the case of the liquid crystal display device using the liquid crystal layer 4 (see FIG. 6) as the display function layer, a plurality of optical function films, such as a prism sheet PF1 (see FIG. 20) and a light diffusion sheet PF2 (see FIG. 20), are provided between the light-guiding plate 7 and the polarizing plate 5 in some cases. When the optical function film is provided, such as the prism sheet PF1 and the light diffusion sheet PF2 each as the optical function film, between the light-guiding plate 7 and the polarizing plate 5, as in a display device DP3 illustrated in FIG. 20, the conductor pattern 8 can be deposited on one main surface of the optical function film. In this case, optical transparency is required for the conductor pattern 8, so that it is preferable to form the conductor pattern 8 by transparent conductive material such as indium tin oxide (ITO), indium zinc oxide (IZO), or tin oxide (SnO).

Second Embodiment

Figure 21:
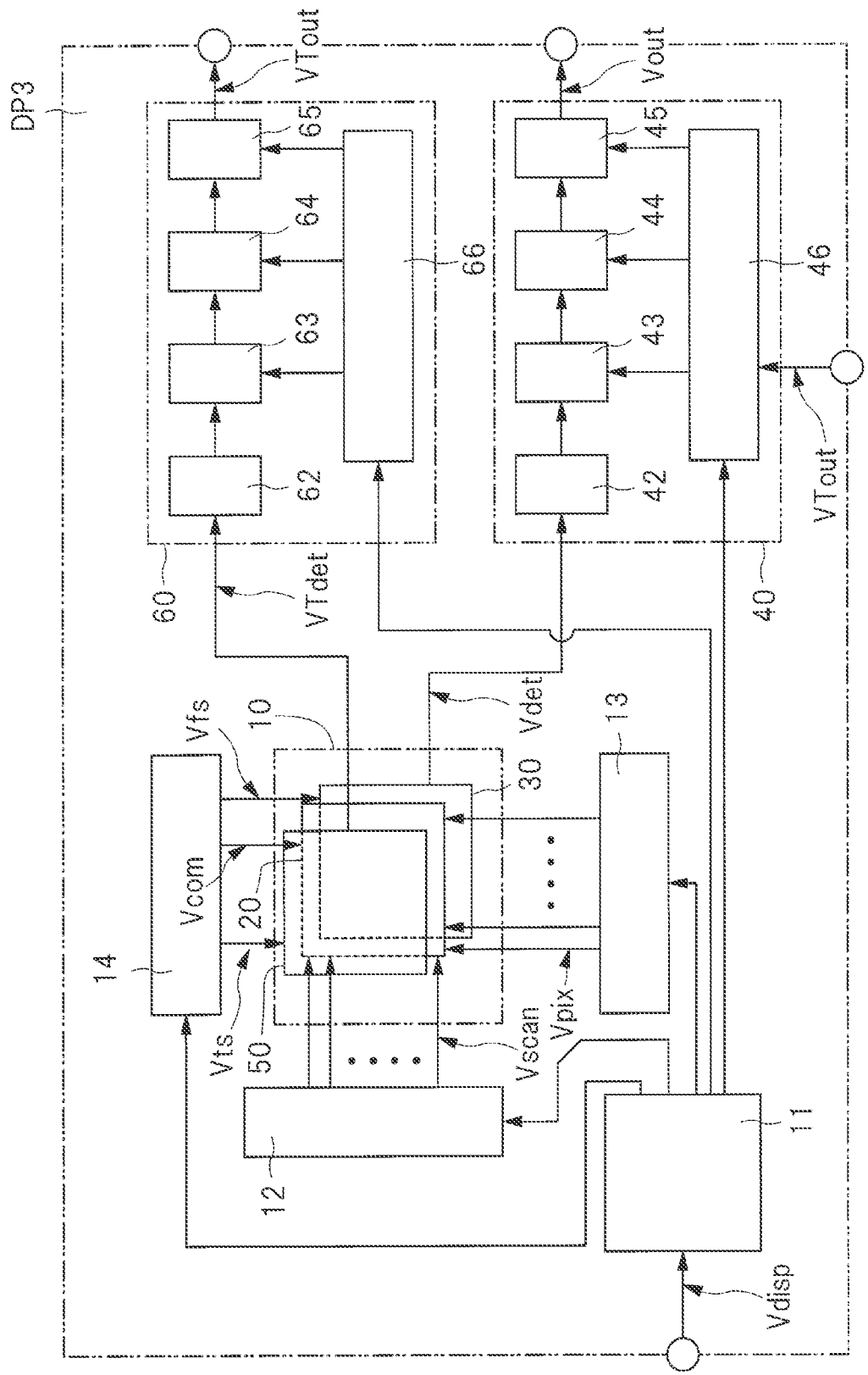
FIG. 21 is a block diagram illustrating an overall configuration of a display device that is a modification example of the display device of FIG. 1.

In the above first embodiment, the display device including the pressure sensor as the input device has been described. In the present embodiment, a display device including the pressure sensor and the touch sensor as the input device will be described. FIG. 21 is a block diagram illustrating an overall configuration of the display device that is a modification example of the display device of FIG. 1.

Incidentally, the display device of the present embodiment is different from the above first embodiment in that the display device further includes the touch sensor as the input device. However, the pressure sensor and the display unit are the same as those of the first embodiment, so that the redundant description is omitted, and a difference from the above first embodiment will be mainly described.

A main body unit 10 included in a display device DP3 illustrated in FIG. 21 includes a pressure detection function, a touch detection function, and a display function. That is, the main body unit 10 includes a display unit 20 as the display device for outputting an image or video, a pressure detection unit 30 as the pressure sensor, and a touch detection unit 50 as the touch sensor. The display device DP3 is different from the above first embodiment in that the display device includes a detection circuit unit 60 as a circuit unit for touch detection in addition to a detection circuit unit 40 described as a circuit unit for pressure detection in the above first embodiment.

The main body unit 10 is a display device into which the display unit 20, the pressure detection unit 30, and the touch detection unit 50 are integrated, and is a display device incorporating the pressure detection function and the touch detection function, that is, an in-cell type display device with the touch detection function and the pressure detection function.

The touch detection unit 50 operates based on a principle of touch detection utilizing the electrostatic capacitance change due to the fact that the dielectric such as the finger described later is close, and outputs a detection signal VTdet.

A control unit 11 is a control circuit for supplying respective control signals to a gate driver 12, a source driver 13, a drive driver 14, the detection circuit unit 40, and the detection circuit unit 60 based on a video signal Vdisp supplied from the outside, and controlling such drivers and units to be operated in synchronization with each other.

The drive driver 14 is a circuit for supplying a drive signal Vcom to a drive electrode COML (see FIG. 24 and FIG. 25 described later) included in the main body unit 10, based on the control signal supplied from the control unit 11. Incidentally, for ease of viewing, FIG. 21 illustrates each one of drive signals Vts used for the touch detection unit 50, the drive signals Vcom used for the display unit 20, and drive signals Vfs applied for the pressure sensor.

The detection circuit unit 60 is a circuit for detecting presence or absence of the fact that the finger and an input tool is close to the touch detection unit 50, based on the control signal supplied from the control unit 11 and the detection signal VTdet supplied from the touch detection unit 50 of the main body unit 10. The detection circuit unit 60 is also a circuit for electrically determining presence or absence of the fact that the finger and the input tool is close to a touch detection area of the touch detection unit 50 of the main body unit to output the obtained information. In an example illustrated in FIG. 21, the detection circuit unit 60, for example, includes a detection signal amplification unit 62, an A/D (Analog/Digital) conversion unit 63, a signal processing unit 64, a coordinate extraction unit 65, and a detection control unit 66.

Incidentally, functions included in respective units of the detection circuit unit 60 illustrated in FIG. 21 correspond to the functions included in the units of the detection circuit unit 40 described in the above first embodiment, so that the redundant description is omitted.

<Principle of Touch Detection Utilizing Electrostatic Capacitance Change>

Figure 22:
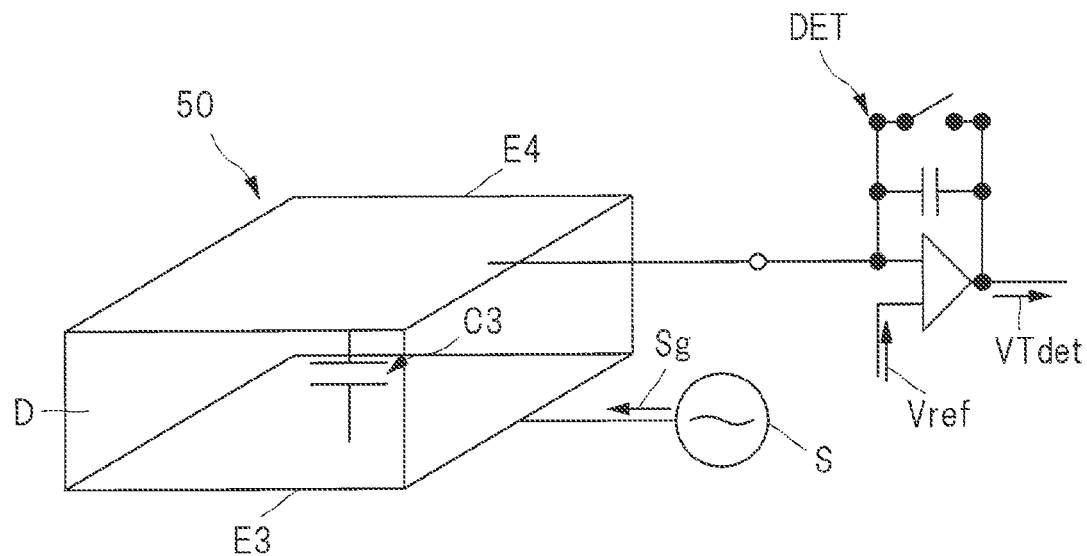
FIG. 22 is an explanatory diagram schematically illustrating a state in which a touch sensor and a finger are separated from each other.
Figure 23:
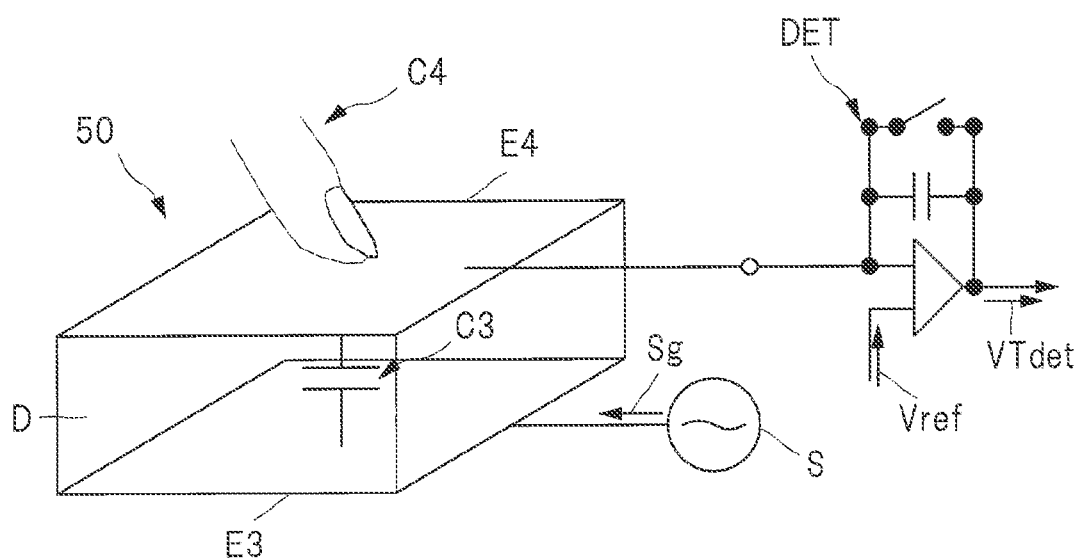
FIG. 23 is an explanatory diagram schematically illustrating a state in which the finger is in contact with the touch sensor.

Next, a principle of touch detection in the display device DP3 of the present embodiment will be described with reference to FIG. 21 to FIG. 23. FIG. 22 is an explanatory diagram schematically illustrating a state in which the touch sensor and the finger are separated from each other. FIG. 23 is an explanatory diagram schematically illustrating a state in which the finger is in contact with the touch sensor.

Incidentally, the pressure sensor described in the above first embodiment is the same as the touch sensor of the present embodiment in that both of the sensors electrically detect an electrostatic capacitance change in the capacitive element and convert the change into a voltage signal for output. Accordingly, in the present section, descriptions common to the pressure sensor described in the above first embodiment are omitted.

As illustrated in FIG. 22 and FIG. 23, an electrostatic capacitance-type touch sensor includes an electrode E3 and an electrode E4 arranged to be opposite to each other via a dielectric D. A capacitive element C3 is formed between the electrode E3 and the electrode E4. One end of the capacitive element C3 is connected to an AC signal source S as a drive signal source, and the other end of the capacitive element C3 is connected to a voltage detector DET as a touch detection circuit. The voltage detector DET includes, for example, an integration circuit included in the detection signal amplification unit 62 illustrated in FIG. 21. Structure of the voltage detector DET is the same as that in the above first embodiment.

When an AC square wave Sg having a frequency about, for example, a few kHz to a few hundred kHz is applied to one end of the capacitive element C3, for example, to the electrode E3 from the AC signal source S, the detection signal VTdet as an output waveform is generated via the voltage detector DET connected to the other end of the capacitive element C3, for example, to the electrode E4 side. Incidentally, the AC square wave Sg corresponds to, for example, the drive signal Vfs illustrated in FIG. 4.

In a state in which the finger is not in contact or not close, that is, in a non-contact state, as illustrated in FIG. 22, current flows depending on a capacitance value of the capacitive element C3 in association with charging and discharging to the capacitive element C3.

On the other hand, in a state in which the finger is in contact or close as illustrated in FIG. 23, that is, in a contact state, and the capacitance value of the capacitive element C3 formed by the electrode E3 and the electrode E4 is decreased due to the influence of an electrostatic capacitance C4 formed by the finger is received. Thus, the current flowing through the capacitive element C3 illustrated in FIG. 23 varies.

In the voltage detector DET, variation of the current flowing through the capacitive element C3 is converted into variation of the voltage to be output as the detection signal VTdet. Operation of the voltage detector DET is the same as that in the above first embodiment.

After the above operation, the operation which is the same as that in each unit included in the detection circuit unit 40 described in the above first embodiment is performed in each of the detection signal amplification unit 62, A/D conversion unit 63, signal processing unit 64, coordinate extraction unit 65, and detection control unit 66 included in the detection circuit unit 60 illustrated in FIG. 21, and a touch panel coordinate is output as an output signal VTout.

<Configuration Example of Display Device Including Touch Detection Unit>

Figure 24:
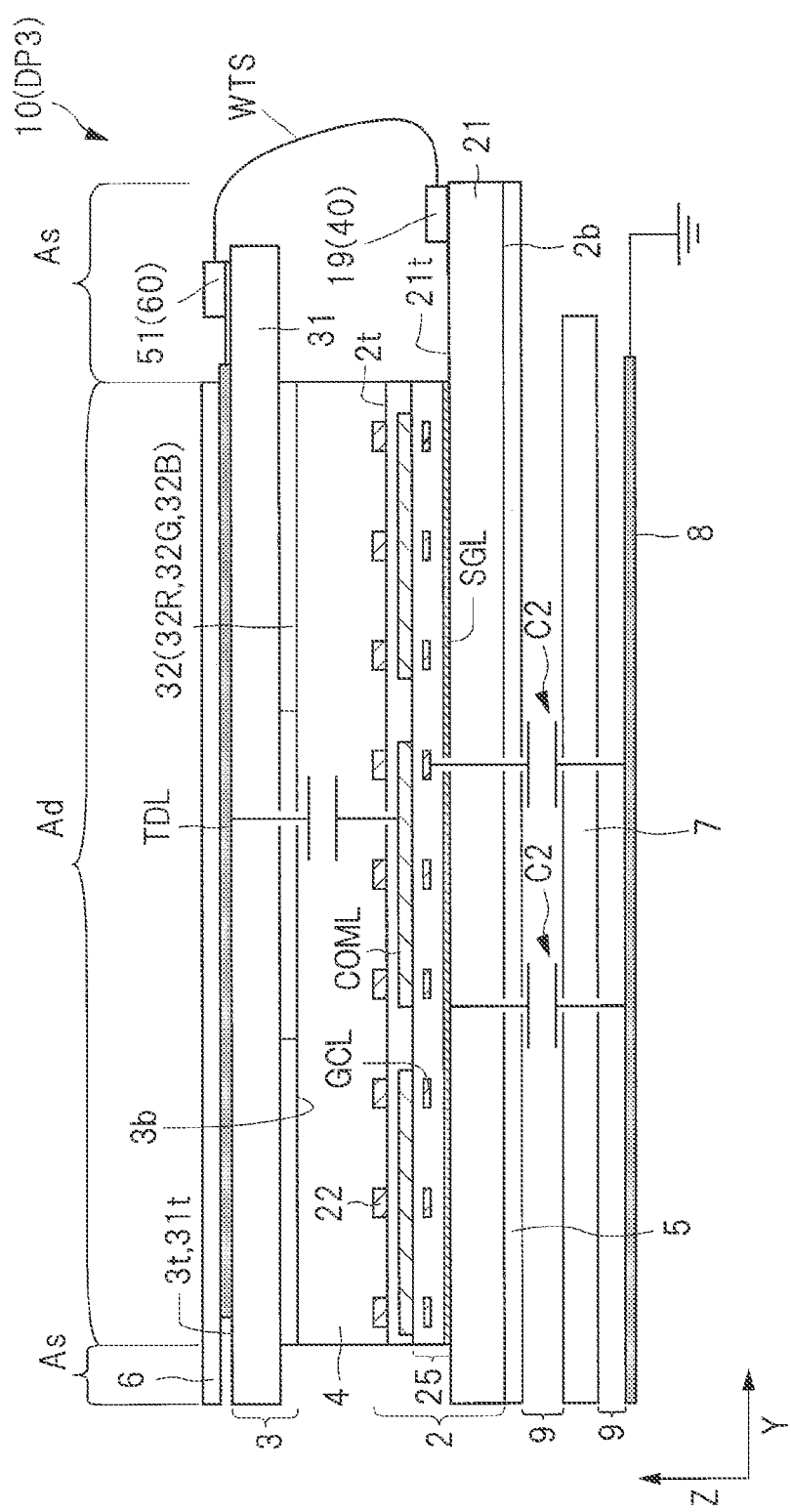
FIG. 24 is a cross-sectional view illustrating an example of the display device illustrated in FIG. 21.
Figure 25:
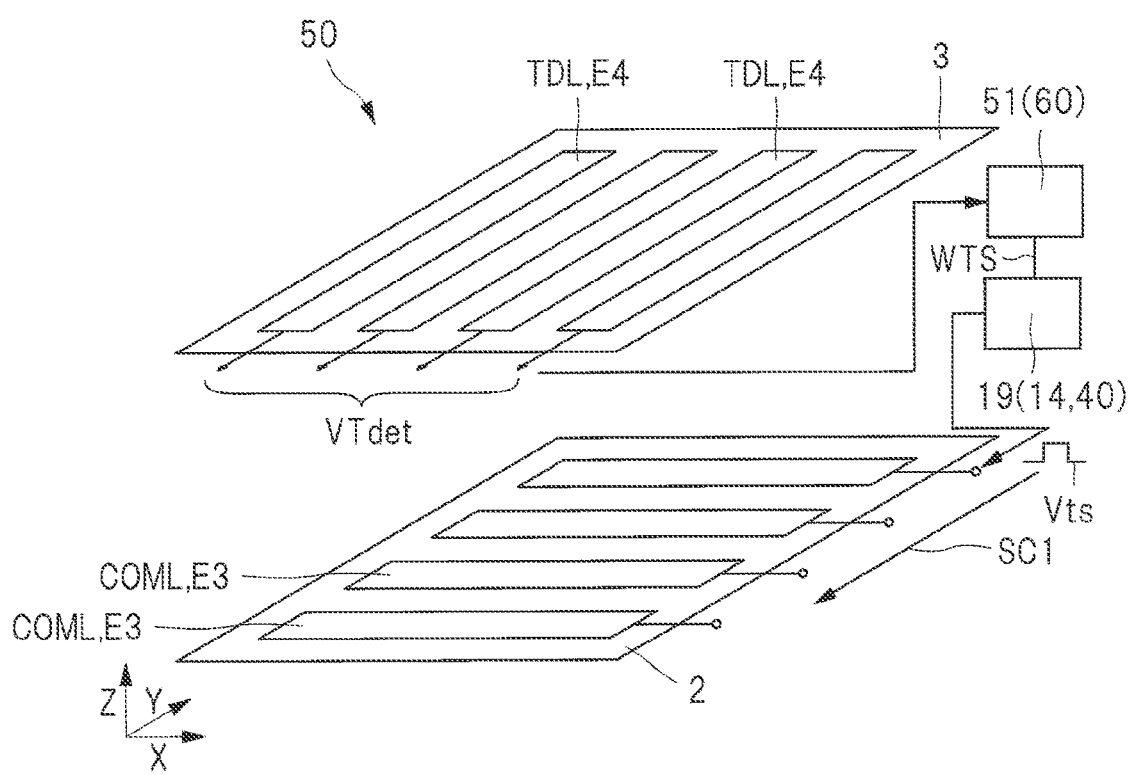
FIG. 25 is an explanatory diagram illustrating an example of a configuration of a touch sensor included in the display device illustrated in FIG. 24.

Next, a configuration example of the display device including the touch sensor will be described. FIG. 24 is a cross-sectional view illustrating an example of the display device illustrated in FIG. 21. FIG. 25 is an explanatory diagram illustrating an example of a configuration of a touch sensor included in the display device illustrated in FIG. 24.

Incidentally, in order to easily see a liquid crystal layer 4 and a TFT layer 25 and the like which are provided between an array substrate 2 and a counter substrate 3 in one figure, FIG. 24 locally illustrates a portion between the TFT layer 25 and a color filter layer 32 in an enlarged manner. In FIG. 24, in order to easily distinguish electrodes and a conductor pattern, hatching is added to pixel electrodes 22, the drive electrodes COML, scanning lines GCL and a signal line SGL, and dot patterns are added to a detection electrode TDL of the touch sensor and a conductor pattern 8 of the pressure sensor. The pressure sensor illustrated in FIG. 24 is illustrated by the example of the pressure sensor of the self-capacitance method described with reference to FIG. 12 to FIG. 14. Thus, wiring WFS illustrated in FIG. 5 is not connected to the conductor pattern 8 of the display device DP3 illustrated in FIG. 24.

FIG. 25 illustrates, as a configuration example of a touch sensor of the mutual-capacitance method, an embodiment in the drive electrodes COML are utilized as drive electrodes for the touch sensor.

As illustrated in FIG. 25, the touch detection unit 50 includes the plurality of detection electrodes TDL provided on an upper surface 3t of the counter substrate 3 and operating as detection electrodes for the touch detection, and the plurality of drive electrodes COML provided on the array substrate 2 and operating as drive electrodes for the touch detection.

The plurality of drive electrodes COML each extend in a direction intersecting with a direction in which each of the plurality of detection electrodes TDL extends, in a planar view. In other words, the plurality of drive electrodes COML are arrayed to be spaced from each other so as to intersect with each of the plurality of detection electrodes TDL, in a planar view. Each of the plurality of drive electrodes COML is opposite to the detection electrodes TDL in a direction perpendicular to an upper surface 21t (see FIG. 24) of a substrate 21 included in the array substrate 2.

The detection circuit unit 60 is formed on, for example, a semiconductor chip 51 for touch detection illustrated in FIG. 24, and the plurality of detection electrodes TDL illustrated in FIG. 25 are each connected to the detection signal amplification unit 62 (see FIG. 21) of the detection circuit unit 60.

The drive driver 14 for outputting the drive signal Vts in touch detection operation is formed on a semiconductor chip 19 illustrated in FIG. 24, and the plurality of drive electrodes COML are electrically connected to the drive driver 14 of the semiconductor chip 19. The semiconductor chip 51 for touch detection is electrically connected to the semiconductor chip 19 via wiring WTS.

In the case of the present embodiment, the detection signals VTdet output from the plurality of detection electrodes TDL illustrated in FIG. 25 are output to the detection circuit unit 60 for touch detection formed on the semiconductor chip 51. The semiconductor chip 51 is mounted on, for example, the upper surface 3t of the counter substrate 3 as illustrated in FIG. 24.

Incidentally, operation of each unit of the detection circuit unit 60 during touch detection operation is the same as the pressure detection operation described with reference to FIG. 9, so that the redundant description is omitted.

Incidentally, FIG. 22 and FIG. 23 illustrate a basic detection principle of a touch sensor of the electrostatic capacitance method, and there are various modification examples. For example, in FIG. 22 to FIG. 25, the example of the touch sensor of the mutual-capacitance method has been described; however, a touch sensor of the self-capacitance method can be utilized, as described with reference to FIG. 12 to FIG. 14 in the above first embodiment.

In FIG. 24 and FIG. 25, an in-cell type touch sensor, utilizing the drive electrode COML included in the display unit 20 (see FIG. 21) as the drive electrode for touch detection, has been described. However, an on-cell type touch sensor in which an electrode for touch detection is separately formed from an electrode and wiring for the display device can be utilized.

<Preferred Aspect of Display Device Including Pressure Detection Unit and Touch Detection Unit>

As described with reference to FIG. 22 and FIG. 23, in the case of the touch sensor, presence or absence of touch is detected by utilizing that current flowing through the capacitive element C3 varies by bringing the dielectric such as the finger and the input tool close to the capacitive element C3. Accordingly, the touch sensor is different from the pressure sensor in that it is preferable not to change a separation distance between the electrode E3 and the electrode E4.

In the case of the touch sensor, to bring the dielectric such as the finger close to or into contact with the sensor is a premise of detection operation. Thus, in the case of the display device including both of the touch sensor and the pressure sensor as in the present embodiment, it is particularly preferable to reduce influence of noise to the pressure sensor due to the fact that the finger is close.

As described in the above first embodiment, the drive electrode COML is provided between the liquid crystal layer 4 (see FIG. 6) and the plurality of signal lines SGL. In a planar view, the drive electrode COML is provided to overlap with the plurality of signal lines SGL. Thus, the detection accuracy of the pressure sensor can be improved by reducing noise influence to the pressure sensor due to the fact that the finger is close to the display surface side.

By supplying a fixed potential or a pulse potential to the drive electrode COML in the pressure detection operation period FLfs (see FIG. 10), shield effect by the drive electrode COML is significantly improved, so that the noise influence to the pressure sensor due to the fact that the finger is close to the display surface side can be further reduced.

As described above, in the case of the pressure sensor of the electrostatic capacitance method, presence or absence of pressure application is determined based on the capacitance change depending on a distance between electrodes configuring the capacitive element. In this case, a waveform of the detection signal is easily changed when a state of detection environment of the pressure sensor, for example, a situation of environment temperature, presence or absence of vibration, or presence or absence of a noise source in the periphery is changed. Particularly, in the case of the pressure sensor of the self-capacitance method described with reference to FIG. 12 to FIG. 14, the waveform is easily changed depending on a state change of the environment.

Accordingly, it is preferable to reduce a detection error, which is caused by an environment change, by performing calibration for a waveform V0 (see FIG. 4) of the detection signal of the pressure sensor. Thus, detection sensitivity of the pressure sensor can be improved.

Here, in the case of the display device including the touch sensor and the pressure sensor as in the present embodiment, a finger is in contact with the display device in some cases when calibration is performed. As described above, it may be possible to reduce the noise influence to the pressure sensor by providing the drive electrode COML between the liquid crystal layer 4 (see FIG. 6) and the plurality of signal lines SGL. However, it is difficult to completely eliminate the noise influence generated when the finger is in contact with the display device. Thus, when the calibration is performed, it is preferable to preferentially utilize calibration data of when the noise influence due to the finger is small.

Accordingly, from the viewpoint of considering influence of the finger when calibration is performed, it is preferable to input the output signal VTout, which is output from the detection circuit unit 60 for the touch sensor, to the detection circuit unit 40 for the pressure detection, as illustrated in FIG. 21. For example, in the example illustrated in FIG. 21, the output signal VTout is input to a detection control unit 46 of the detection circuit unit 40.

In the detection control unit 46, for example, when coordinate position information of the finger of when calibration has performed is acquired, data of the detection signal in the periphery of the coordinate position of the finger can be excluded. For example, when information of presence or absence of touch of when calibration has performed is acquired, the calibration can be performed again based on such information.

In this way, in order to input the output signal VTout, which is output from the detection circuit unit 60 for the touch sensor, to the detection circuit unit 40 for the pressure detection, it is necessary to electrically connect the detection circuit unit 40 and the detection circuit unit 60 to each other. In an example illustrated in FIG. 24 and FIG. 25, the semiconductor chip 51 in which the detection circuit unit 60 is formed is electrically connected to the semiconductor chip 19 in which the detection circuit unit 40 is formed via the wiring WTS. Thus, the detection circuit unit 40 and the detection circuit unit 60 can be electrically connected to each other.

Figure 26:
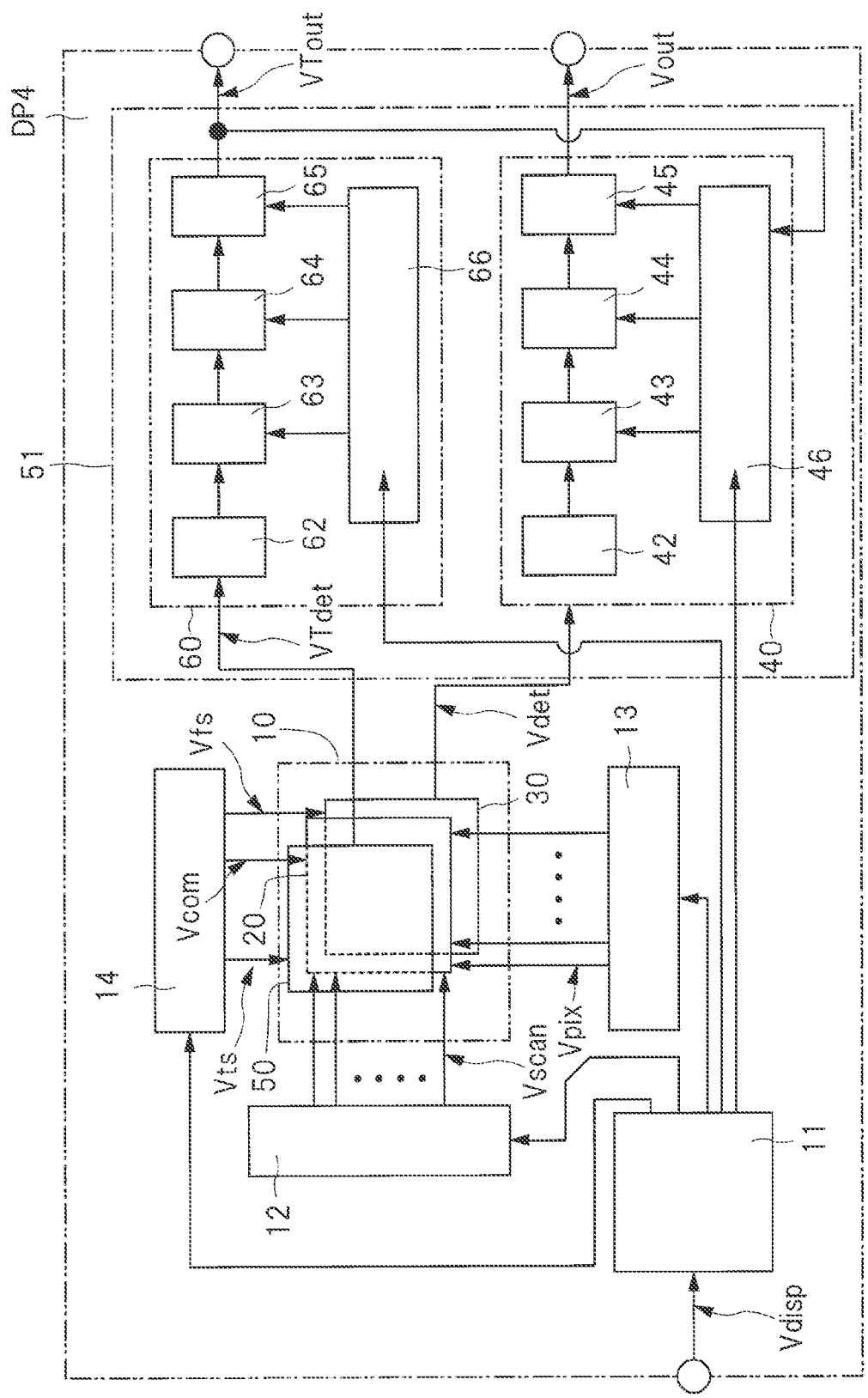
FIG. 26 is a block diagram illustrating an overall configuration of a display device that is a modification example of the display device of FIG. 21.

From the viewpoint of speeding up of processing for inputting the output signal VTout, which is output from the detection circuit unit 60 for the touch sensor, to the detection circuit unit 40 for the pressure detection, it is preferable that the detection circuit unit 40 and the detection circuit unit 60 are formed on the same device. FIG. 26 is a block diagram illustrating an overall configuration of a display device that is a modification example of the display device of FIG. 21.

Figure 27:
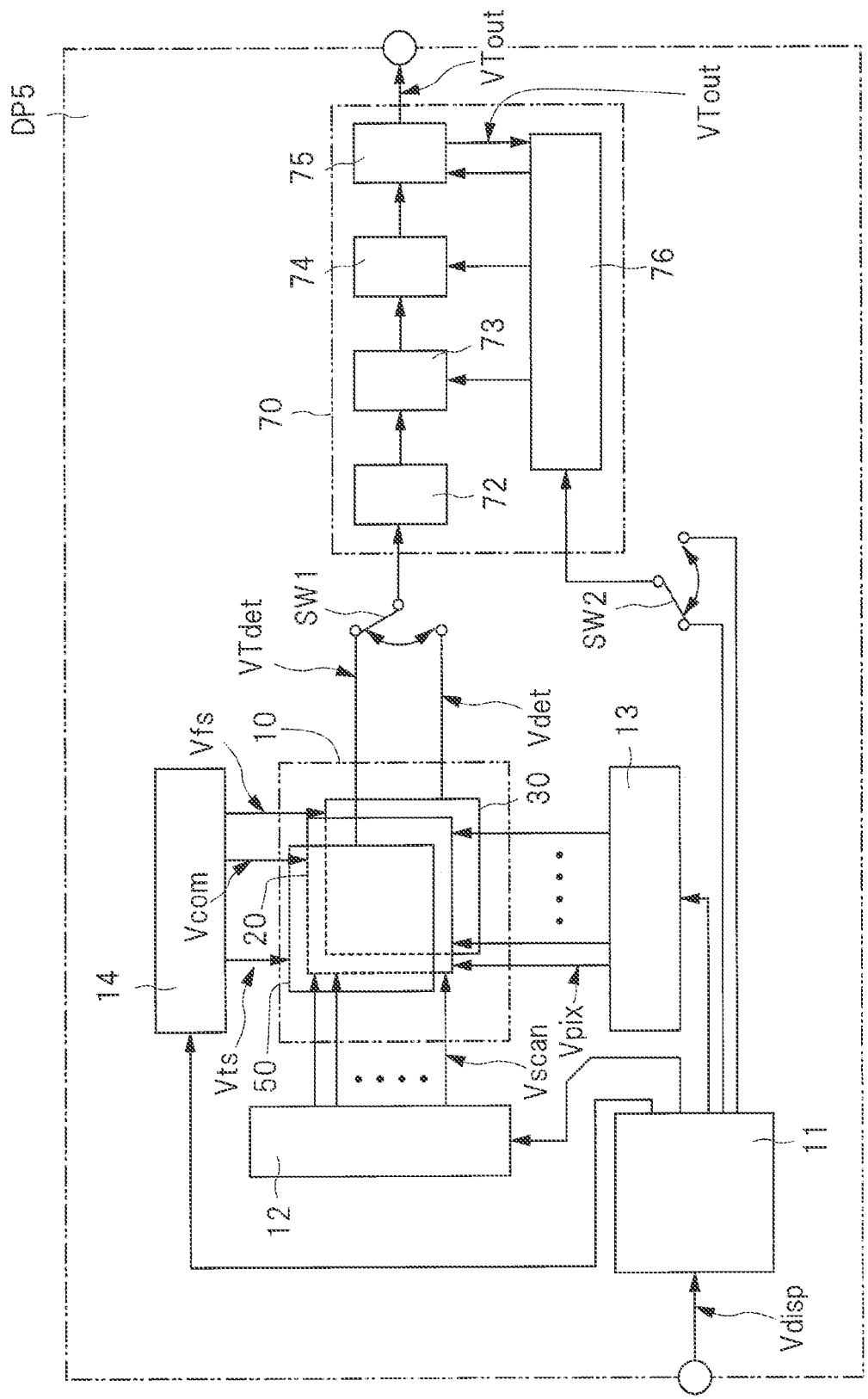
FIG. 27 is a block diagram illustrating an overall configuration of a display device that is another modification example of the display device of FIG. 21.

FIG. 27 is a block diagram illustrating an overall configuration of a display device that is another modification example of the display device of FIG. 21.

In a case of display device DP4 illustrated in FIG. 26, the detection circuit unit 40 and the detection circuit unit 60 are formed on the semiconductor chip 51. In other words, the display device DP4 illustrated in FIG. 26 includes the semiconductor chip 51 in which the detection circuit unit 40 for performing a pressure detection operation and the detection circuit unit 60 for performing a touch detection operation are formed. The semiconductor chip 51 is a device, for example, mounted on an upper surface 31t of a substrate 31 included in the counter substrate 3, as with the display device DP3 illustrated in FIG. 24. In this way, when the detection circuit unit 40 and the detection circuit unit 60 are formed on the same device and electrically connected to each other, it is possible to speed up the processing for inputting the output signal VTout, which is output from the detection circuit unit 60 for the touch sensor, to the detection circuit unit 40 for the pressure detection.

In a case of a display device DP5 illustrated in FIG. 27, the display device DP5 includes a detection circuit unit 70 for operating pressure detection operation and touch detection operation described above. As described above, the pressure sensor described in the first embodiment and the touch sensor described in the present embodiment are common in that both the sensors transmit the change in the capacitance value of the capacitive element to the detection circuit unit as the detection signal, and determine presence or absence of pressure application or presence or absence of touch by the detection circuit unit to output the result.

Thus, electrical processing to the detection signal is the same, and pressure detection operation and touch detection operation can be sequentially performed by using one detection circuit unit 70, as illustrated in FIG. 27. The detection circuit unit 70 is a circuit for electrically determining presence or absence of pressure application to a pressure detection area of the pressure detection unit 30 of the main body unit to output the obtained information. In addition, the detection circuit unit 70 is a circuit for electrically determining presence or absence of touch to a touch detection area of the touch detection unit 50 of the main body unit to output the obtained information.

The detection circuit unit 70 includes, for example, a detection signal amplification unit 72, an A/D (Analog/Digital) conversion unit 73, a signal processing unit 74, a coordinate extraction unit 75, and a detection control unit 76 in an example illustrated in FIG. 27. The detection signal amplification unit 72 has a function of the detection signal amplification unit 42 and a function of a detection signal amplification unit 62 illustrated in FIG. 21. The A/D conversion unit 73 illustrated in FIG. 27 has a function of the A/D conversion unit 43 and a function of an A/D conversion unit 63 illustrated in FIG. 21. The signal processing unit 74 illustrated in FIG. 27 has a function of the signal processing unit 44 and a function of the signal processing unit 64 illustrated in FIG. 21. The coordinate extraction unit 75 illustrated in FIG. 27 has a function of the coordinate extraction unit 45 and a function of the coordinate extraction unit 65 illustrated in FIG. 21. The detection control unit 76 illustrated in FIG. 27 has a function of the detection control unit 46 and a function of the detection control unit 66 illustrated in FIG. 21.

In the example illustrated in FIG. 27, a type of the detection signal input to the detection circuit unit 70 and a type of the control signal are switched by using a switch SW1 and a switch SW2 respectively. Thus, in the detection circuit unit 70, pressure detection operation and touch detection operation can be sequentially performed.

By using the detection circuit unit 70 for both of pressure detection and touch detection as in the display device DP5, the number of circuits can be reduced. As a result, an area of the semiconductor chip 51 in which the detection circuit unit 70 is formed can be reduced.

In the case of the display device DP5, the output signal VTout can be transmitted to the detection control unit 76 by wiring in the detection circuit unit 70. In other words, pressure detection operation and touch detection operation are controlled by the detection control unit 76 as the same control circuit. Thus, it is possible to speed up the processing for inputting the output signal VTout, which is output from the detection circuit unit 60 for the touch sensor, to the detection circuit unit 40 for the pressure detection.

Third Embodiment

Figure 28:
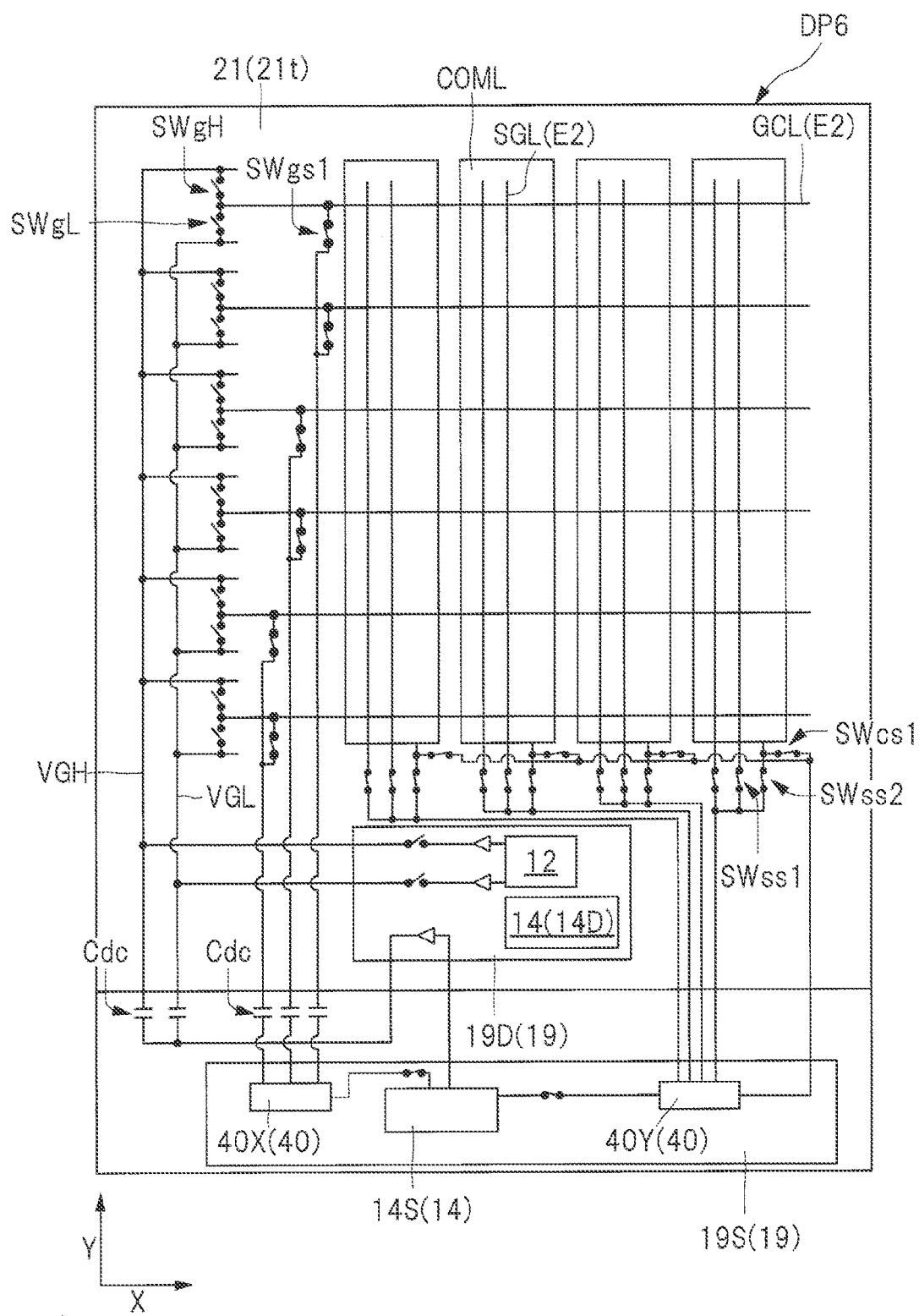
FIG. 28 is an explanatory diagram schematically illustrating a configuration example of a display device including any one of the pressure sensors illustrated in FIG. 16 to FIG. 18.
Figure 29:
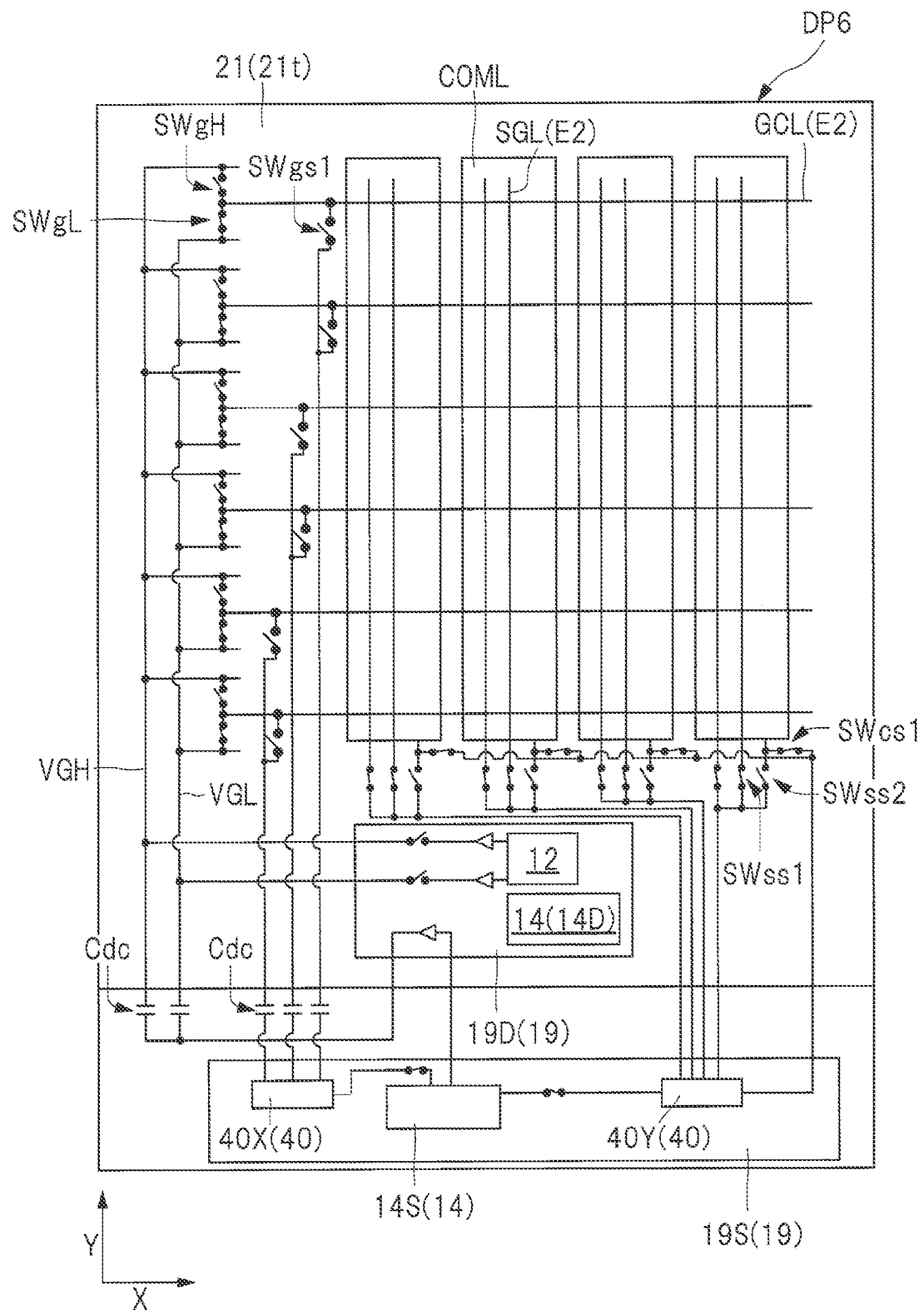
FIG. 29 is an explanatory diagram schematically illustrating a configuration example of a display device including any one of the pressure sensors illustrated in FIG. 16 to FIG. 18.
Figure 30:
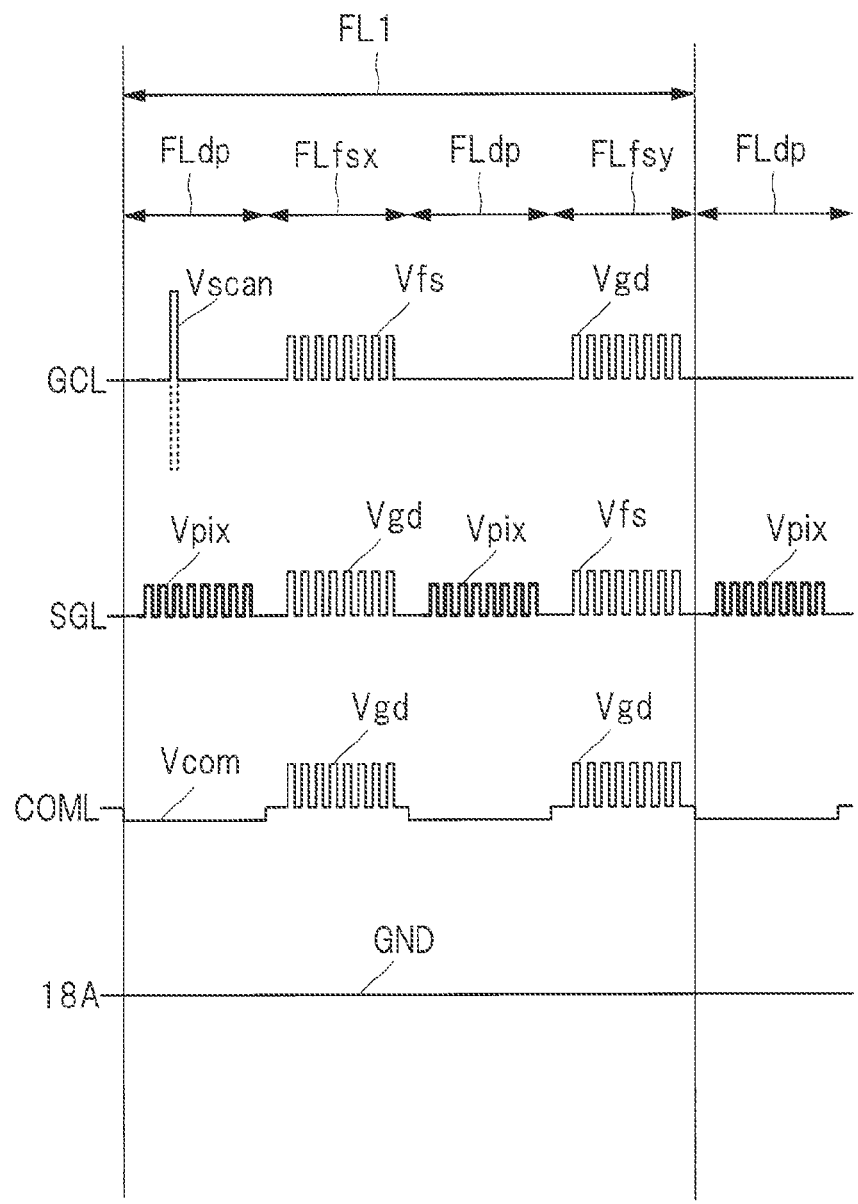
FIG. 30 is an explanatory diagram illustrating an example of timing for performing a display operation and a pressure detection operation of the display device illustrated in FIG. 28 and FIG. 29.

In the above first embodiment, the embodiment of the pressure sensor of the self-capacitance method has been described with reference to FIG. 12 to FIG. 20. In the third embodiment, there will be described a preferred embodiment of a peripheral circuit connected to the pressure sensor of the self-capacitance method. FIG. 28 and FIG. 29 are explanatory diagrams schematically illustrating configuration examples of a display device including any one of the pressure sensors illustrated in FIG. 16 to FIG. 18. FIG. 30 is an explanatory diagram illustrating an example of timing for performing a display operation and a pressure detection operation of the display device illustrated in FIG. 28 and FIG. 29. FIG. 28 and FIG. 29 illustrate the display device in a state in which the number of scanning lines GCL, the number of signal lines SGL, and the number of drive electrodes COML are small, for ease of viewing. FIG. 28 illustrates on-off states of a plurality of switches in a detection operation period FLfsx illustrated in FIG. 30, and FIG. 29 illustrates on-off states of the plurality of switches in a detection operation period FLfsy illustrated in FIG. 30.

In the third embodiment, a plurality of types of display devices will be described, including a modification example described later. Each of the plurality of display devices described in the third embodiment is a display device including a pressure sensor utilizing the self-capacitance method, of the display devices described in the above first embodiment. In the third embodiment, description is made on a configuration of a circuit connected to the pressure sensor of the self-capacitance method, by supplementarily describing contents already described in the above first embodiment. Accordingly, in the third embodiment, the descriptions already described in the above first embodiment are omitted, and differences from the above first embodiment will be mainly described. Techniques to be described in the third embodiment can be applied in combination with the techniques described in the above the second embodiment.

In the circuit configuration example of the display device illustrated in FIG. 8 described in the above first embodiment, the plurality of scanning lines GCL and the plurality of drive electrodes COML each extend along the X direction, and the plurality of signal lines SGL extend along the Y direction intersecting with (for example, orthogonally intersecting with) the X direction. In a display operation period FLdp (see FIG. 10), a common potential is supplied to a plurality of pixels Pix (see FIG. 8). The structure in which the drive electrodes COML extend along X direction is referred to as horizontal COM structure. On the other hand, in an example illustrated in FIG. 28, the plurality of scanning lines GCL extend along the X direction, and the plurality of signal lines SGL and the plurality of drive electrodes COML each extend along the Y direction intersecting with (for example, orthogonally intersecting with) the X direction. The structure in which the drive electrodes COML extend along the Y direction is referred to as vertical COM structure, as in a display device DP6 illustrated in FIG. 28. In the third embodiment, first, a display device of the vertical COM structure will be exemplarily described, and then a display device of the horizontal COM structure will also be described.

In the display device DP6 illustrated in FIG. 28 and FIG. 29, as with the pressure detection unit 30B described with reference to FIG. 12, the plurality of scanning lines GCL and the plurality of signal lines SGL are each utilized as electrodes E2 (see FIG. 12), which are detection electrodes for detecting pressure with the self-capacitance method. In other words, configuration of the display device DP6 can be expressed as follows. That is, the plurality of scanning lines GCL extending along the X direction, and the plurality of signal lines SGL extending along the Y direction intersecting with the X direction are provided on the upper surface 21*t* side, in a planar view along an upper surface 21*t* of a substrate 21. Each of the plurality of scanning lines GCL is electrically connected to a detection circuit unit 40X for detecting pressure due to contact of an external object by the change in the capacitance value between the plurality of scanning lines GCL and a conductor pattern 8A (see FIG. 12). As illustrated in FIG. 30, in the detection operation period FLfsx for detecting the change in the capacitance value between the plurality of scanning lines GCL and the conductor pattern 8A (see FIG. 12), the plurality of scanning lines GCL are a drive signal Vfs serving as a pulse potential. A detection signal Vdet2 (see FIG. 12) based on the drive signal Vfs is output to the detection circuit unit 40X illustrated in FIG. 28 via the plurality of scanning lines GCL. As illustrated in FIG. 29, each of the plurality of signal lines SGL is electrically connected to a detection circuit unit 40Y for detecting pressure due to contact of an external object by the change in the capacitance value between the plurality of signal lines SGL and the conductor pattern 8A. As illustrated in FIG. 30, in the detection operation period FLfsy for detecting the change in the capacitance value between the plurality of signal lines SGL and the conductor pattern 8A, the plurality of signal lines SGL are supplied with the drive signal Vfs serving as the pulse potential. A detection signal Vdet1 (see FIG. 12) based on the drive signal Vfs is output to the detection circuit unit 40Y (see FIG. 29) via the plurality of signal lines SGL.

Incidentally, in the example illustrated in FIG. 28 and FIG. 29, the detection circuit unit 40X for detecting output signals from the detection electrodes (that is, scanning lines GCL) extending along the X direction is provided to be independent from the detection circuit unit 40Y for detecting output signals from the detection electrodes (that is, signal lines SGL) extending along the Y direction. However, the detection circuit unit 40X may not be independent from the detection circuit unit 40Y. For example, a semiconductor chip 19S can include one detection circuit unit 40, and the detection electrodes extending along the X direction and the detection electrodes extending along the Y direction can output the detection signal Vdet1 and the detection signal Vdet2 to the one detection circuit unit 40.

In the example illustrated in FIG. 28 and FIG. 29, a drive driver 14S is provided independently from the detection circuit units 40. The drive driver 14S is a drive circuit for detection operation for outputting the drive signal Vfs or a guard signal Vgd illustrated in FIG. 30, in the detection operation period FLfsx and the detection operation period FLfsy illustrated in FIG. 30. Accordingly, the drive driver 14S can configure the detection circuit unit 40 as one unit.

In an example illustrated in FIG. 30, a unit frame FL1 is time-divided into the plurality of display operation periods FLdp, the detection operation period FLfsx, and the detection operation period FLfsy, and the display operation period FLdp and the detection operation period (detection operation period FLfsx or detection operation period FLfsy) are alternately performed. As illustrated in FIG. 30, in the display operation period FLdp, a drive driver 14 (see FIG. 28) supplies a drive signal Vcom to the drive electrode COML. In the example illustrated in FIG. 28, the display device DP6 includes a semiconductor chip 19D as a display device control chip on which a circuit for controlling operation of a display unit 20 (see FIG. 1) mainly is formed, and the semiconductor chip 19S as a detection operation control chip on which a circuit for controlling operation of a pressure detection unit 30 (see FIG. 1) mainly is formed. The drive signal Vcom illustrated in FIG. 30 is supplied to the drive electrode COML from a drive driver 14D, formed in the semiconductor chip 19D, of the drive driver 14 illustrated in FIG. 28. The drive driver 14D is a drive circuit for display operation.

In the display operation period FLdp illustrated in FIG. 30, a gate driver 12 (see FIG. 28) applies a scanning signal Vscan to the scanning lines GCL. The scanning signal Vscan is a signal for controlling on-off operation of a TFT element Tr illustrated in FIG. 8, and has a different waveform from that of the drive signal Vfs. In the example illustrated in FIG. 30, the scanning signal Vscan is a square wave whose absolute value of the potential is larger than that of the drive signal Vfs. When a scanning signal Vscan having a higher potential than a reference potential is input to the TFT element Tr as illustrated in FIG. 30, the TFT element Tr is turned on, and when a scanning signal Vscan having a lower potential than the reference potential is input to the TFT element Tr as illustrated by a dashed line in FIG. 30, the TFT element Tr is turned off. In the example illustrated in FIG. 28, a wiring path VGH, which is a supply path of a relatively high potential, of the wiring paths connected to the scanning lines GCL is electrically connected to the scanning lines GCL via respective switches SWgH. A wiring path VGL, which is a supply path of a relatively low potential, of the wiring paths connected to the scanning lines GCL is electrically connected to the scanning lines GCL via respective switches SWgL. When the switches SWgH are turned on and the switches SWgL are turned off, the relatively high potential is supplied to the scanning lines GCL. Thus, the TFT element Tr (see FIG. 8) is turned on, for example. On the contrary, when the switches SWgL are turned on and the switches SWgH are turned off, the relatively low potential is supplied to the scanning lines GCL. Thus, the TFT element Tr is turned off, for example. By controlling on-off operation of the switches SWgH and the switches SWgL, the waveform illustrated in FIG. 30 is formed.

As described in the above first embodiment, the gate driver 12 has a function for sequentially selecting a horizontal line to be a target of display drive of the display unit 20 (see FIG. 1) based on a control signal supplied from a control unit 11 (see FIG. 1), that is, a function for controlling on-off operation of the TFT element Tr illustrated in FIG. 8. When an error operation is generated in selection operation by the scanning signal Vscan, the error operation becomes a cause of display failure. On the TFT element Tr used as a switch of selection operation, on-off control is performed at a relatively high voltage compared to the other switch. Thus, the scanning signal Vscan supplied to the TFT element Tr on which on-off control is performed at the high voltage becomes a high potential compared to the other drive signals. For example, the drive signal Vfs for pressure detection illustrated in FIG. 30 operates at a potential of about 1.5 V±1 V (volt). On the other hand, on-off control is performed on the TFT element Tr at a potential of, for example, about ±4.0 V, and a potential of the scanning signal Vscan of when the TFT element Tr is turned off, is about −6 V±1 V (volt).

In the display operation period FLdp illustrated in FIG. 30, a source driver 13 (see FIG. 1) supplies a pixel signal Vpix to the signal lines SGL. The pixel signal Vpix is a video signal for generating an electric field to change orientation of a liquid crystal molecule of a liquid crystal layer serving as a display function layer, and has a different waveform from that of the drive signal Vfs. However, the pixel signal Vpix is not a signal for performing on-off control on the TFT element Tr (see FIG. 8), so that the pixel signal Vpix is controlled by a potential of a relatively small absolute value compared to the scanning signal Vscan.

Next, in the detection operation period FLfsx for detecting the change in the capacitance value between the plurality of scanning lines GCL and the conductor pattern 8A (see FIG. 12), the drive driver 14S supplies the drive signal Vfs to the scanning lines GCL. In the detection operation period FLfsx, as illustrated in FIG. 28, switches SWgs1 which are connected to each of the plurality of scanning lines GCL are turned on. In other words, in the detection operation period FLfsx, the drive driver 14S supplies the drive signal Vfs to the scanning lines GCL via the respective switches SWgs1. The switches SWgH and the switches SWgL which are connected between each of the plurality of scanning lines GCL and the gate driver 12 are each turned off. In the example illustrated in FIG. 28, the drive driver 14S is electrically connected to the switches SWgs1 via the detection circuit unit 40X. That is, the drive driver 14S supplies the drive signal Vfs to the scanning lines GCL via the detection circuit unit 40X.

In the example illustrated in FIG. 30, the active shield method is applied to the signal lines SGL and the drive electrodes COML. That is, in the detection operation period FLfsx, the drive driver 14S supplies the guard signal Vgd, serving as the pulse potential having the same waveform as that of the drive signal Vfs, to the signal lines SGL and the drive electrodes COML. In the detection operation period FLfsx, as illustrated in FIG. 28, the switches SWss1 which are connected between each of the plurality of signal lines SGL and the drive driver 14S turned on. In other words, in the detection operation period FLfsx, the drive driver 14S supplies the guard signal Vgd to the signal lines SGL via the respective switches SWss1. In the detection operation period FLfsx, switches SWcs1 which are connected between the respective drive electrodes COML and the drive driver 14S are turned on. In other words, in the detection operation period FLfsx, the drive driver 14S supplies the guard signal Vgd to the drive electrodes COML via the respective switches SWcs1. In the example illustrated in FIG. 28, the drive driver 14S is electrically connected to the switches SWss1 and switches SWcs1 via the detection circuit unit 40Y. That is, the drive driver 14S supplies the guard signal Vgd to the signal lines SGL and the drive electrodes COML via the detection circuit unit 40Y. As a modification example of the display device of FIG. 28, that is, the drive driver 14S can be electrically connected to the signal lines SGL and the drive electrodes COML without going through the detection circuit unit 40Y although not illustrated. In this case, the drive driver 14S supplies the guard signal Vgd to the signal lines SGL and the drive electrodes COML without going through the detection circuit unit 40Y.

FIG. 28 illustrates an example of applying the drive signal Vfs (see FIG. 30) to each of the plurality of scanning lines GCL at the same timing. However, as a modification example, the drive signal Vfs can be sequentially applied for each detection block of the plurality of scanning lines GCL. In this case, some of the switches SWgs1 which are connected to each of the plurality of scanning lines GCL are turned on, and some of them are turned off. In this case, it is preferable to apply the active shield method to scanning lines GCL, which are not selected, of the plurality of scanning lines GCL. When the active shield method is applied to the scanning lines GCL not selected, the switches SWgs1 which are connected to the respective scanning lines GCL not selected are turned off, and at least either one of the switches SWgH and the switches SWgL which are connected to the respective scanning lines GCL not selected is turned on. Thus, influence of the parasitic capacitance which is formed between the scanning lines GCL operating as electrodes for pressure detection and the conductor pattern around the scanning lines GCL can be reduced in the detection operation period FLfsx.

In the example illustrated in FIG. 30, the display operation period FLdp is present between the detection operation period FLfsx for detecting the change in the capacitance value between the plurality of scanning lines GCL and the conductor pattern 8A (see FIG. 12) and the detection operation period FLfsy for detecting the change in the capacitance value between the plurality of signal lines SGL and the conductor pattern 8A. In the detection operation period FLfsy, the drive driver 14S (see FIG. 29) supplies the drive signal Vfs to the signal lines SGL. In the detection operation period FLfsy, as illustrated in FIG. 29, the switches SWss1 which are connected to each of the plurality of signal lines SGL are turned on. In other words, in the detection operation period FLfsy, the drive driver 14S supplies the drive signal Vfs (see FIG. 30) to the signal lines SGL via the respective switches SWss1. In the example illustrated in FIG. 29, the drive driver 14S is electrically connected to the switches SWss1 via the detection circuit unit 40Y. That is, the drive driver 14S supplies the drive signal Vfs to the signal lines SGL via the detection circuit unit 40Y. The switches SWss2 which are connected between each of the plurality of signal lines SGL and the drive electrode COML are turned off. In the detection operation period FLfsy, the plurality of switches SWgs1 which connect the detection circuit unit 40X and each of the plurality of scanning lines GCL are each turned off.

In the example illustrated in FIG. 30, the active shield method is applied to the scanning lines GCL and the drive electrodes COML. That is, in the detection operation period FLfsy, the drive driver 14S (see FIG. 29) supplies the guard signal Vgd, serving as the pulse potential having the same waveform as that of the drive signal Vfs, to the scanning lines GCL and the drive electrodes COML. In the detection operation period FLfsy, as illustrated in FIG. 29, at least either one of the switches SWgH and the switches SWgL which are connected between each of the plurality of scanning lines GCL and the drive driver 14S is turned on. In other words, in the detection operation period FLfsy, the drive driver 14S supplies the guard signal Vgd to the scanning lines GCL via at least either one of the switches SWgH and the switches SWgL. "At least either one of the switches SWgH and the switches SWgL" has the following meaning. That is, in the example illustrated in FIG. 29, the switches SWgL are turned on, and the switches SWgH are turned off. However, as a modification example, both of the switches SWgH and switches SWgL can be turned on. Alternatively, the switches SWgH can be turned on and the switches SWgL can be turned off.

In the detection operation period FLfsy, the switches SWcs1 which are connected between the respective drive electrodes COML and the drive driver 14S are turned on. In other words, in the detection operation period FLfsy, the drive driver 14S supplies the guard signal Vgd to the drive electrodes COML via the respective switches SWcs1.

FIG. 29 illustrates an example of applying the drive signal Vfs (see FIG. 30) to each of the plurality of signal lines SGL at the same timing. However, as a modification example, the drive signal Vfs can be sequentially applied for each detection block of the plurality of signal lines SGL. In this case, some of the switches SWss1 which are connected to each of the plurality of signal lines SGL are turned on, and some of them are turned off. In this case, it is preferable to apply the active shield method to the signal lines SGL, which are not selected, of the plurality of signal lines SGL. When the active shield method is applied to the signal lines SGL not selected, the switches SWss2 which are connected to the respective signal lines SGL not selected are turned on. Thus, influence of the parasitic capacitance which is formed between the signal lines SGL operating as the electrodes for pressure detection and the conductor pattern around the signal lines SGL can be reduced in the detection operation period FLfsy.

When the plurality of scanning lines GCL and the plurality of signal lines SGL are each utilized as the electrodes E2 (see FIG. 12), which are the detection electrodes for detecting pressure with the self-capacitance method as in the third embodiment, a coordinate of a plane position to which pressure is applied can be determined, even in with the self-capacitance method.

<Preferred Aspect when Supplying Drive Signal to Scanning Lines>

By the way, as described above, the absolute value of the potential of the scanning signal Vscan illustrated in FIG. 30 becomes a high potential compared to the absolute value of the potential of other drive signals. For example, the drive signal Vfs for pressure detection illustrated in FIG. 30, and the detection circuit unit 40 illustrated in FIG. 28 operate at a potential of about 1.5 V±1 V (volt). On the other hand, on-off control is performed on the TFT element Tr (see FIG. 8) at a potential of, for example, about ±4.0 V, and a potential of the scanning signal Vscan of when the TFT element Tr is turned off is about −6 V±1 V (volt).

Here, as illustrated in FIG. 28, when the plurality of scanning lines GCL are used as the detection electrodes for pressure detection, the TFT element Tr (see FIG. 8) is operated by the drive signal Vfs in some cases when the drive signal Vfs for pressure detection is supplied directly to the scanning lines GCL. For example, when the drive signal Vfs for pressure detection of +1.5 V is supplied at the time that the TFT element Tr supplied with a potential of −6 V (volt) is turned off, the TFT element Tr may be turned on. In this case, in pixels in which the TFT element Tr is turned on, the image is erroneously displayed based on the potential supplied to the signal lines SGL when the TFT element Tr is turned on.

Accordingly, when the plurality of scanning lines GCL are used as the detection electrodes for pressure detection, it is preferable that each of the plurality of scanning lines GCL and the detection circuit unit 40 are electrically connected to each other via a capacitive element Cdc as illustrated in FIG. 28. The capacitive element Cdc functions as an AC coupling element for coupling two circuits, which are connected in series via the capacitive element Cdc and operate with different AC voltages from each other. In other words, an AC signal having a first voltage is offset to a second voltage when passing through the capacitive element Cdc.

For example, in the example illustrated in FIG. 28, the drive signal Vfs (see FIG. 30) as the AC signal is output at a voltage of 1.5 V±1 V via the detection circuit unit 40X from the drive driver 14S. Then when the drive signal Vfs passes through the capacitive element Cdc, the drive signal Vfs is offset to a voltage of −6 V±1 V. Thus, each of the plurality of scanning lines GCL is supplied with a potential in a range of −6 V±1 V, so that the TFT element Tr (see FIG. 8) can be prevented from being turned on.

When a voltage of about −6 V±1 V is output from the scanning line GCL as the detection signal Vdet2 (see FIG. 12), the voltage is offset to a voltage of 1.5 V±1 V when the detection signal Vdet2 passes through the capacitive element Cdc. Thus, the voltage of 1.5 V±1 V is input to the detection circuit unit 40, so that the detection circuit unit 40 can be operated properly.

Incidentally, when the drive signal Vfs for pressure detection illustrated in FIG. 30 and the detection circuit unit 40 illustrated in FIG. 28 are operated at a potential of about −6 V±1 V (volt), the TFT element Tr (see FIG. 8) can be prevented from being turned on even when there is no capacitive element Cdc illustrated in FIG. 28 and FIG. 29. Accordingly, as a modification example of the examples illustrated in FIG. 28 and FIG. 29, the capacitive element Cdc illustrated in FIG. 28 and FIG. 29 may not be included.

However, in the above case, the drive signal Vfs for pressure detection and the detection circuit unit 40 illustrated in FIG. 28 are operated at the high voltage, so that power consumption is increased. In other words, when each of the plurality of scanning lines GCL and the detection circuit unit 40 are electrically connected to each other via the capacitive element Cdc as in the example illustrated in FIG. 28 and FIG. 29, erroneous display due to malfunction of the TFT element Tr (see FIG. 8) can be prevented, and power consumption of the pressure sensor can be reduced.

In the examples illustrated in FIG. 28 and FIG. 29, the drive driver 14S is connected to each of the switches SWgH and the switches SWgL, and capable of supplying the guard signal Vgd (see FIG. 30) to the scanning lines GCL via the switches SWgH or the switches SWgL. The guard signal Vgd has the same waveform as that of the drive signal Vfs (see FIG. 30), so that the scanning lines GCL malfunctions in some cases, depending on the potential of the guard signal Vgd. Accordingly, as illustrated in FIG. 28 and FIG. 29, the display device DP6 includes the capacitive element Cdc connected in series between the drive driver 14S and each of the switches SWgH and switches SWgL.

As described above, when the plurality of scanning lines GCL are used as the detection electrodes for pressure detection, it is preferable that each of the plurality of scanning lines GCL and the detection circuit unit 40 are electrically connected to each other via the capacitive element Cdc as illustrated in FIG. 28. However, when the signal lines SGL are used as the detection electrodes for pressure detection, the situation is different. That is, as illustrated in FIG. 30, the signal lines SGL are wirings to be supplied with the pixel signal Vpix in the display operation period FLdp. The pixel signal Vpix is the signal having a different waveform from that of the drive signal Vfs. However, for example, even when the drive signal Vfs and the guard signal Vgd are supplied to the signal lines SGL in the detection operation period FLfsx or the detection operation period FLfsy, such signals do not become a cause of erroneous display if TFT element Tr (see FIG. 8) is turned on. Thus, in the examples illustrated in FIG. 28 and FIG. 29, each of the plurality of signal lines SGL and the detection circuit unit 40 are connected to each other without going through the capacitive element Cdc.

Modification Example of Third Embodiment

Figure 31:
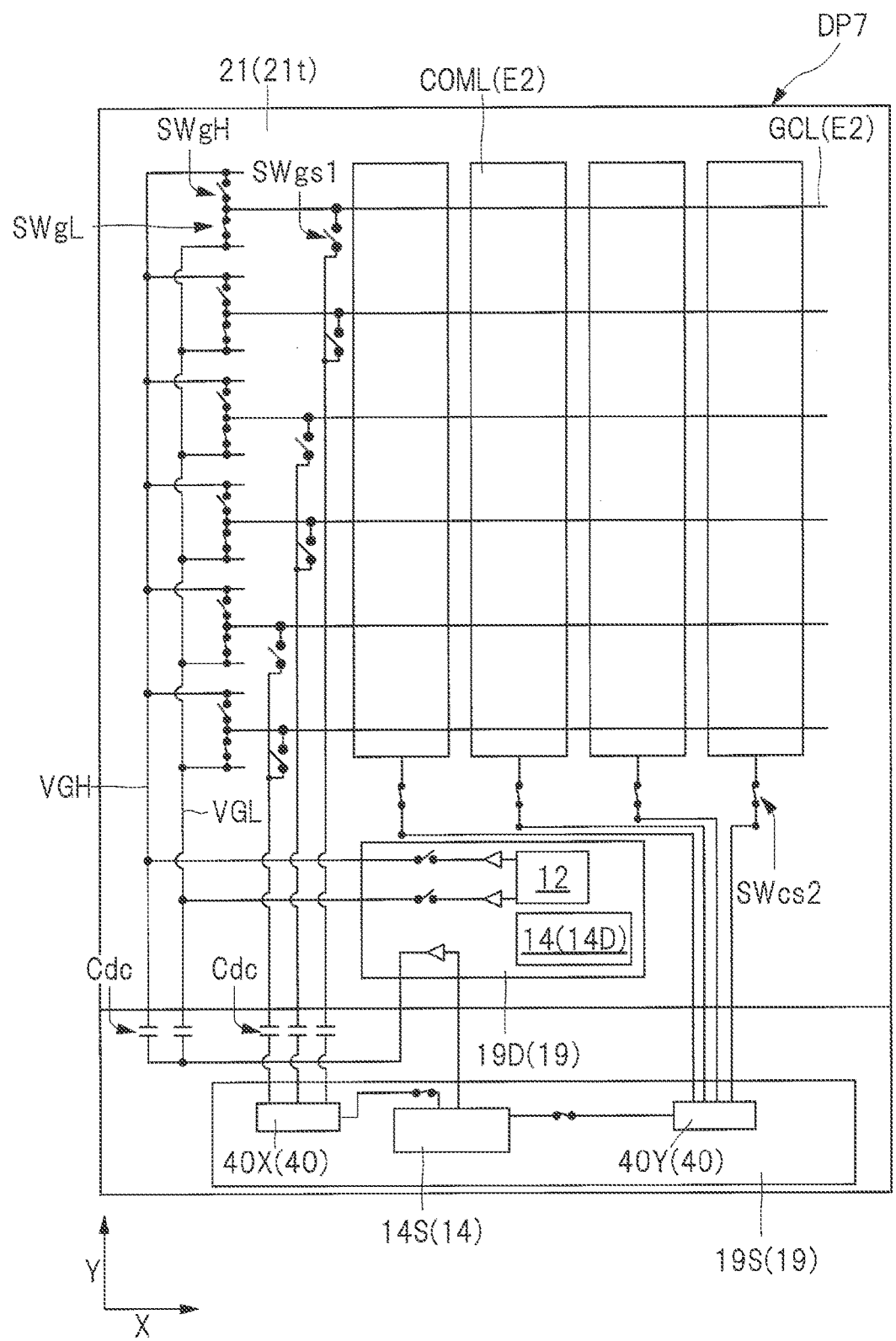
FIG. 31 is an explanatory diagram schematically illustrating a configuration example of a display device that is a modification example of the display device of FIG. 29.
Figure 32:
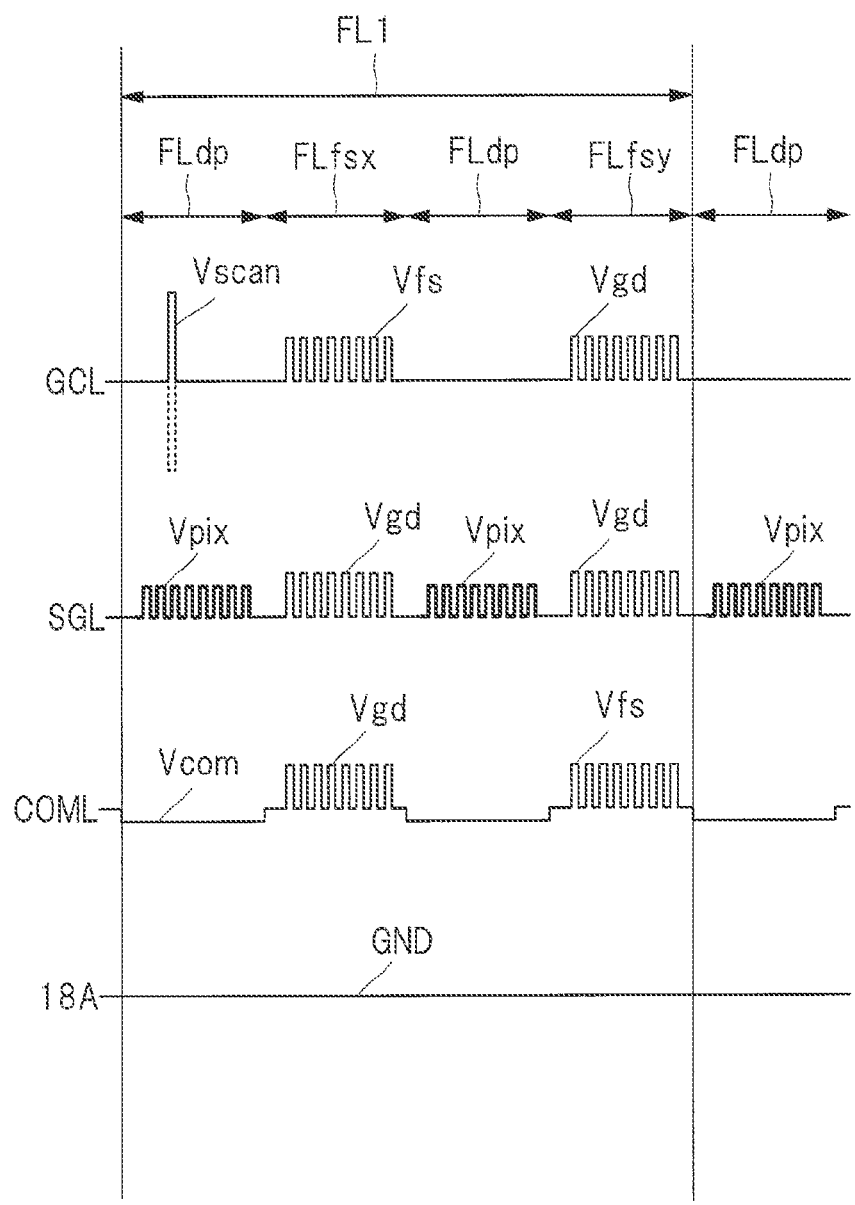
FIG. 32 is an explanatory diagram illustrating an example of timing for performing a display operation and a pressure detection operation of the display device illustrated in FIG. 31.

Next, a modification example of the display device DP6 described with reference to FIG. 28 to FIG. 30 will be described. FIG. 31 is an explanatory diagram schematically illustrating a configuration example of a display device that is a modification example of the display device of FIG. 29. FIG. 32 is an explanatory diagram illustrating an example of timing for performing a display operation and a pressure detection operation of the display device illustrated in FIG. 31. For ease of viewing, FIG. 31 does not illustrate the plurality of signal lines SGL illustrated in FIG. 29, and the wiring path for supplying the guard signal Vgd (see FIG. 32) to the plurality of signal lines SGL and the plurality of drive electrodes COML. The configuration of the wiring path for supplying the guard signal Vgd (see FIG. 32) to the plurality of signal lines SGL and the plurality of drive electrodes COML is the same as that in FIG. 29, so that, in the present modification example, the description will be made with reference to FIG. 29 when needed.

In FIG. 28 and FIG. 29, as the configuration capable of determining the coordinate of the plane position in the pressure sensor of the self-capacitance method, the embodiment in which the plurality of scanning lines GCL and the plurality of signal lines SGL are each utilized as the detection electrodes has been described; however, wiring and electrodes other than the plurality of scanning lines GCL and the plurality of signal lines SGL can be utilized as the detection electrodes of the pressure sensor. For example, a display device DP7 illustrated in FIG. 31 is different from the display device DP6 illustrated in FIG. 28 in that the plurality of scanning lines GCL and the plurality of drive electrodes COML are each utilized as the electrodes E2, which are the detection electrodes for detecting pressure with the self-capacitance method.

The configuration of the display device DP7 can be expressed as follows. That is, the plurality of scanning lines GCL extending along the X direction and the plurality of drive electrodes COML extending along the Y direction intersecting with the X direction are provided on the upper surface 21t side, in a planar view along the upper surface 21t of the substrate 21. Each of the plurality of drive electrodes COML is electrically connected to the detection circuit unit 40Y for detecting pressure due to contact of an external object by the change in the capacitance value between the plurality of drive electrodes COML and the conductor pattern 8A. As illustrated in FIG. 32, in the detection operation period FLfsy for detecting the change in the capacitance value between the plurality of drive electrodes COML and the conductor pattern 8A, the drive signal Vfs as the pulse potential is supplied to the plurality of drive electrodes COML. The detection signal Vdet1 (see FIG. 12) based on the drive signal Vfs is output to the detection circuit unit 40Y illustrated in FIG. 31 via the plurality of drive electrodes COML.

Also in the case of the display device DP7 (see FIG. 31) illustrated in FIG. 32, the display device DP7 has the display operation period FLdp and the detection operation period FLfsx. However, the operation of each unit in the display operation period FLdp is the same as the operation in the case of the display device DP6 (see FIG. 28) described with reference to FIG. 28 and FIG. 30. In addition, the display device DP7 uses the plurality of scanning lines GCL as the detection electrodes, so that the operation of each unit in the detection operation period FLfsx is the same as the operation of the display device DP6 described with reference to FIG. 28 and FIG. 30. Accordingly, the redundant description is omitted.

In a modification example illustrated in FIG. 32, in the detection operation period FLfsy, the drive driver 14S (see FIG. 31) supplies the drive signal Vfs to the drive electrodes COML. In the detection operation period FLfsy, as illustrated in FIG. 31, the switches SWcs2 which are connected to each of the plurality of drive electrodes COML are turned on. In other words, in the detection operation period FLfsy, the drive driver 14S supplies the drive signal Vfs (see FIG. 32) to the drive electrodes COML via the respective switches SWcs2. In an example illustrated in FIG. 31, the drive driver 14S is electrically connected to the switches SWcs2 via the detection circuit unit 40Y. That is, the drive driver 14S supplies the drive signal Vfs to the drive electrodes COML via the detection circuit unit 40Y. Although not illustrated in FIG. 31, the switches SWss2 (see FIG. 29) which are connected between each of the plurality of signal lines SGL (see FIG. 29) and the drive electrode COML are turned off. In the detection operation period FLfsy, the plurality of switches SWgs1 which connect the detection circuit unit 40X and each of the plurality of scanning lines GCL are each turned off.

In an example illustrated in FIG. 32, the active shield method is applied to the scanning lines GCL and the drive electrodes COML. That is, in the detection operation period FLfsy, the drive driver 14S (see FIG. 31) supplies the guard signal Vgd, serving as the pulse potential having the same waveform as that of the drive signal Vfs, to the scanning lines GCL and the signal lines SGL. In the detection operation period FLfsy, as illustrated in FIG. 31, at least either one of the switches SWgH and the switches SWgL which are connected between each of the plurality of scanning lines GCL and the drive driver 14S is turned on. In other words, in the detection operation period FLfsy, the drive driver 14S supplies the guard signal Vgd to the scanning lines GCL via at least either one of the switches SWgH and the switches SWgL. In the detection operation period FLfsy, the switches (for example, switches SWss1 and switches SWss2 illustrated in FIG. 29) which are connected between the respective signal lines SGL (see FIG. 29) and the drive driver 14S are turned on.

FIG. 31 illustrates an example of applying the drive signal Vfs (see FIG. 32) to each of the plurality of drive electrodes COML at the same timing. However, as a modification example, the drive signal Vfs can be sequentially applied for each detection block of the plurality of drive electrodes COML. In this case, some of the switches SWcs2 which are connected to each of the plurality of drive electrodes COML are turned on, and some of them are turned off. In this case, it is preferable to apply the active shield method to the drive electrodes COML, which are not selected, of the plurality of drive electrodes COML. When the active shield method is applied to the drive electrodes COML not selected, the switches SWcs2 which are connected to the respective drive electrodes COML not selected are turned off, and the switches SWcs1 (see FIG. 29) which are connected to the respective drive electrodes COML not selected are turned on. Thus, influence of the parasitic capacitance which is formed between the drive electrodes COML operating as the electrodes for pressure detection and the conductor pattern around the drive electrodes COML can be reduced in the detection operation period FLfsy.

As described above, when the plurality of scanning lines GCL are used as the detection electrodes for pressure detection, it is preferable that each of the plurality of scanning lines GCL and the detection circuit unit 40X are electrically connected to each other via the capacitive element Cdc as illustrated in FIG. 28. However, when the drive electrodes COML are used as the detection electrodes for pressure detection, the situation is different. That is, as illustrated in FIG. 32, the drive electrodes COML are wirings to be supplied with the drive signal Vcom in the display operation period FLdp. The drive signal Vcom is the signal having a different waveform from that of the drive signal Vfs. However, for example, even when the drive signal Vfs and the guard signal Vgd are supplied to the drive electrodes COML in the detection operation period FLfsx or the detection operation period FLfsy, such signals do not become a cause of erroneous display if TFT element Tr (see FIG. 8) is turned on. Thus, in the example illustrated in FIG. 31, each of the plurality of drive electrodes COML and the detection circuit unit 40Y are connected to each other without going through the capacitive element Cdc.

Figure 33:
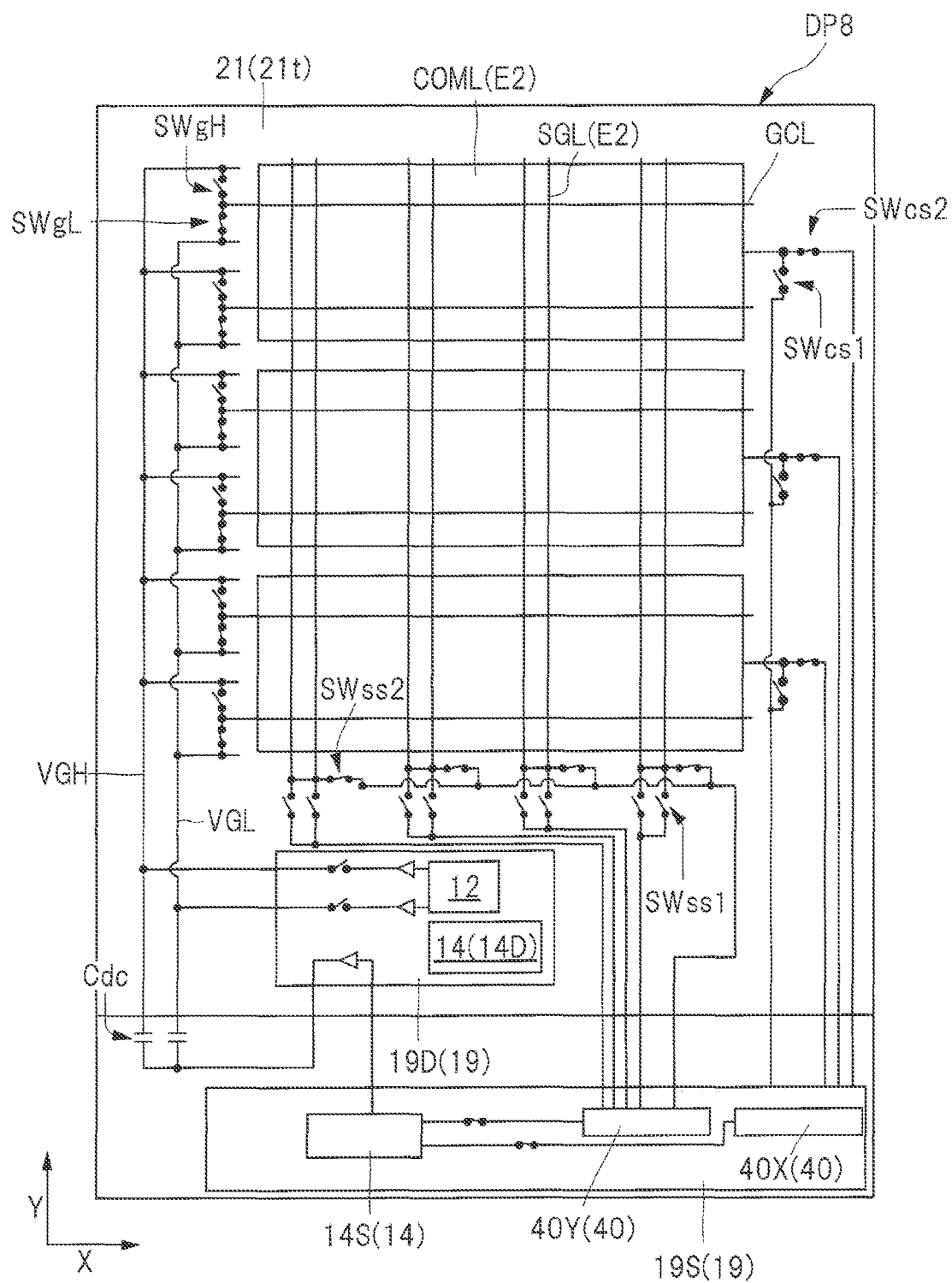
FIG. 33 is an explanatory diagram schematically illustrating a configuration example of a display device that is a modification example of the display device of FIG. 28.
Figure 34:
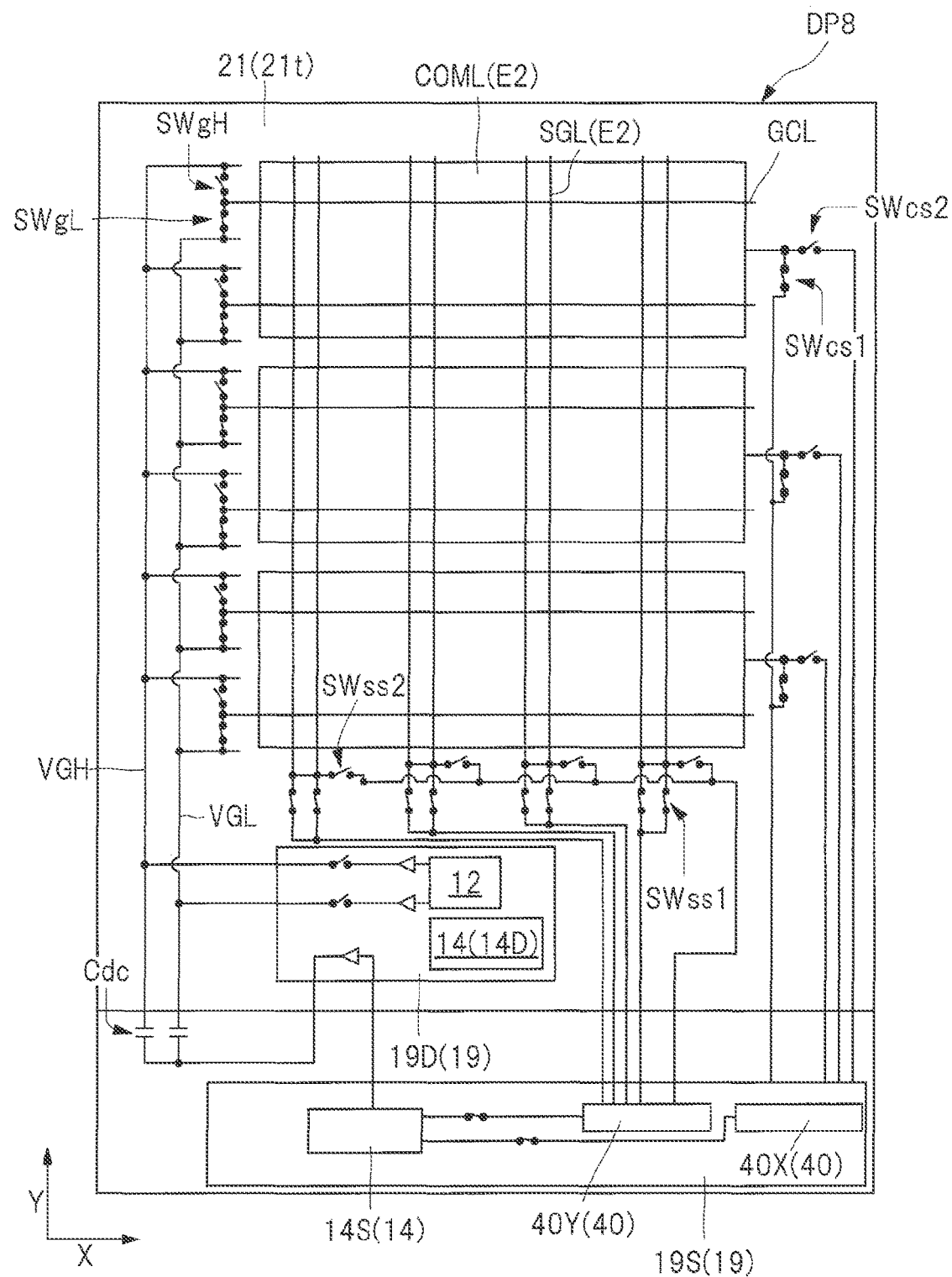
FIG. 34 is an explanatory diagram schematically illustrating a configuration example of a display device that is another modification example of the display device of FIG. 29.
Figure 35:
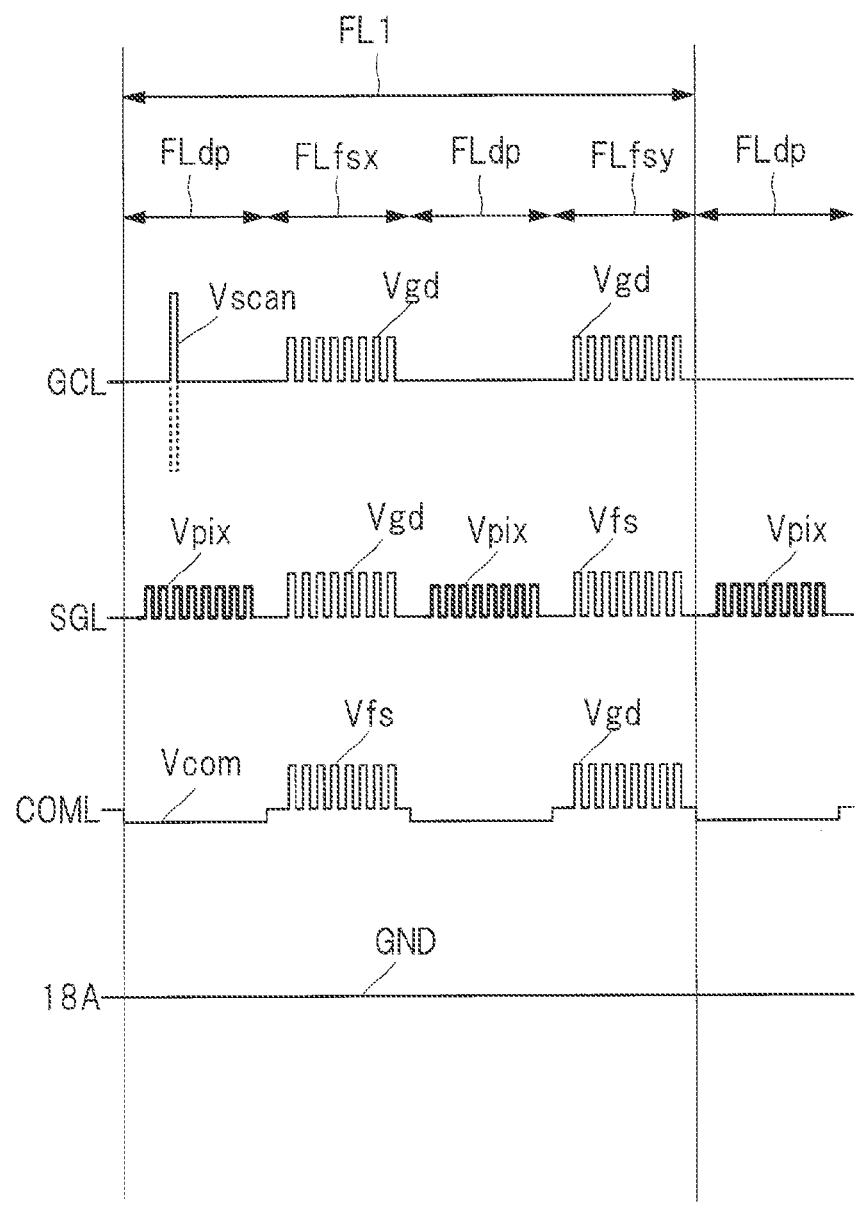
FIG. 35 is an explanatory diagram illustrating an example of timing for performing a display operation and a pressure detection operation of the display device illustrated in FIG. 33 and FIG. 34.

In FIG. 28 to FIG. 32, the display device of the vertical COM structure has been exemplary described in which the plurality of drive electrodes COML extend along the Y direction. However, as illustrated in FIG. 33, the above technique can be applied to a display device of the horizontal COM structure in which each of the plurality of drive electrodes COML extends along the X direction. FIG. 33 is an explanatory diagram schematically illustrating a configuration example of a display device that is a modification example of the display device of FIG. 28. FIG. 34 is an explanatory diagram schematically illustrating a configuration example of a display device that is another modification example of the display device of FIG. 29. FIG. 35 is an explanatory diagram illustrating an example of timing for performing a display operation and a pressure detection operation of the display device illustrated in FIG. 33 and FIG. 34.

A display device DP8 illustrated in FIG. 33 and FIG. 34 is different from the display device DP6 illustrated in FIG. 28 and FIG. 29 in that each of the plurality of drive electrodes COML extends along the Y direction. In addition, the display device DP8 is different from the display device DP6 illustrated in FIG. 28 in that the plurality of signal lines SGL and the plurality of drive electrodes COML are each utilized as the electrodes E2, which are the detection electrodes for detecting pressure with the self-capacitance method.

The configuration of the display device DP8 can be expressed as follows. That is, the plurality of drive electrodes COML extending along the X direction and the plurality of signal lines SGL extending along the Y direction intersecting with the X direction are provided on the upper surface 21t side, in a planar view along the upper surface 21t of the substrate 21. Each of the plurality of drive electrodes COML is electrically connected to the detection circuit unit 40X for detecting pressure due to contact of an external object by the change in the capacitance value between the drive electrodes COML and the conductor pattern 8A. As illustrated in FIG. 33, in the detection operation period FLfsx for detecting the change in the capacitance value between the plurality of drive electrodes COML and the conductor pattern 8A (see FIG. 12), the drive signal Vfs as the pulse potential is supplied to the plurality of drive electrodes COML. The detection signal Vdet2 (see FIG. 12) based on the drive signal Vfs is output to the detection circuit unit 40X illustrated in FIG. 28 via the plurality of drive electrodes COML. As illustrated in FIG. 34, each of the plurality of signal lines SGL is electrically connected to the detection circuit unit 40Y for detecting pressure due to contact of an external object by the change in the capacitance value between the plurality of signal lines SGL and the conductor pattern 8A. As illustrated in FIG. 30, in the detection operation period FLfsy for detecting the change in the capacitance value between the plurality of signal lines SGL and the conductor pattern 8A (see FIG. 12), the drive signal Vfs as the pulse potential is supplied to the plurality of signal lines SGL. The detection signal Vdet1 (see FIG. 12) based on the drive signal Vfs is output to the detection circuit unit 40Y illustrated in FIG. 34 via the plurality of signal lines SGL.

Also in the case of the display device DP8 (see FIG. 33) illustrated in FIG. 35, the display device DP8 has the display operation period FLdp. However, the operation of each unit in the display operation period FLdp is the same as the operation of the display device DP6 (see FIG. 29) described with reference to FIG. 30. Accordingly, the redundant description is omitted.

In a modification example illustrated in FIG. 35, in the detection operation period FLfsx, the drive driver 14S (see FIG. 33) supplies the drive signal Vfs to the drive electrodes COML. In the detection operation period FLfsx, as illustrated in FIG. 33, the switches SWcs2 which are connected to each of the plurality of drive electrodes COML are turned on. In other words, in the detection operation period FLfsy, the drive driver 14S supplies the drive signal Vfs (see FIG. 35) to the drive electrodes COML via the respective switches SWcs2. In an example illustrated in FIG. 33, the drive driver 14S is electrically connected to the switches SWcs2 via the detection circuit unit 40X. That is, the drive driver 14S supplies the drive signal Vfs to the drive electrodes COML via the detection circuit unit 40X. The switches SWss1 which are connected between each of the plurality of signal lines SGL and the detection circuit unit 40Y are turned off.

In an example illustrated in FIG. 35, the active shield method is applied to the scanning lines GCL and the drive electrodes COML. That is, in the detection operation period FLfsx, the drive driver 14S (see FIG. 33) supplies the guard signal Vgd, serving as the pulse potential having the same waveform as that of the drive signal Vfs, to the scanning lines GCL and the signal lines SGL. In the detection operation period FLfsx, as illustrated in FIG. 35, at least either one of the switches SWgH and the switches SWgL which are connected between each of the plurality of scanning lines GCL and the drive driver 14S is turned on. In other words, in the detection operation period FLfsx, the drive driver 14S supplies the guard signal Vgd to the scanning lines GCL via at least either one of the switches SWgH and the switches SWgL. In the detection operation period FLfsx, the switches SWss2 (see FIG. 33) which are connected between the respective signal lines SGL and the drive driver 14S are turned on. In other words, in the detection operation period FLfsx, the drive driver 14S supplies the guard signal Vgd to the signal lines SGL via the respective switches SWss2.

FIG. 33 illustrates an example of applying the drive signal Vfs (see FIG. 35) to each of the plurality of drive electrodes COML at the same timing. However, as a modification example, the drive signal Vfs can be sequentially applied for each detection block of the plurality of drive electrodes COML. In this case, some of the switches SWcs2 which are connected to each of the plurality of drive electrodes COML are turned on, and some of them are turned off. In this case, it is preferable to apply the active shield method to the drive electrodes COML, which are not selected, of the plurality of drive electrodes COML. When the active shield method is applied to the drive electrodes COML not selected, the switches SWcs2 which are connected to the respective drive electrodes COML not selected are turned off, and the switches SWcs1 which are connected to the respective drive electrodes COML not selected are turned on. Thus, influence of the parasitic capacitance which is formed between the drive electrodes COML operating as the electrodes for pressure detection and the conductor pattern around the drive electrodes COML can be reduced in the detection operation period FLfsx.

In a modification example illustrated in FIG. 35, in the detection operation period FLfsy, the drive driver 14S (see FIG. 34) supplies the drive signal Vfs to the signal lines SGL. In the detection operation period FLfsy, as illustrated in FIG. 34, the switches SWss1 which are connected to each of the plurality of signal lines SGL are turned on. In other words, in the detection operation period FLfsy, the drive driver 14S supplies the drive signal Vfs (see FIG. 35) to the signal lines SGL via the respective switches SWss1. In an example illustrated in FIG. 34, the drive driver 14S is electrically connected to the switches SWss1 via the detection circuit unit 40Y. That is, the drive driver 14S supplies the drive signal Vfs to the signal lines SGL via the detection circuit unit 40Y. As illustrated in FIG. 34, the switches SWss2 (see FIG. 34) which are connected between each of the plurality of signal lines SGL (see FIG. 34) and the drive driver 14S are turned off. In the detection operation period FLfsy, the plurality of switches SWcs2 which connect the detection circuit unit 40X and each of the plurality of drive electrodes COML are each turned off.

In the example illustrated in FIG. 35, the active shield method is applied to the scanning lines GCL and the signal lines SGL. That is, in the detection operation period FLfsy, the drive driver 14S (see FIG. 34) supplies the guard signal Vgd, serving as the pulse potential having the same waveform as that of the drive signal Vfs, to the scanning lines GCL and the drive electrodes COML. In the detection operation period FLfsy, as illustrated in FIG. 34, at least either one of the switches SWgH and the switches SWgL which are connected between each of the plurality of scanning lines GCL and the drive driver 14S is turned on. In other words, in the detection operation period FLfsy, the drive driver 14S supplies the guard signal Vgd to the scanning lines GCL via at least either one of the switches SWgH and the switches SWgL. In the detection operation period FLfsy, the switches SWcs1 (see FIG. 34) which are connected between the respective drive electrodes COML and the drive driver 14S are turned on. In the detection operation period FLfsy, the drive driver 14S supplies the guard signal Vgd to the drive electrodes COML via the respective switches SWcs1.

FIG. 34 illustrates an example of applying the drive signal Vfs (see FIG. 35) to each of the plurality of signal lines SGL at the same timing. However, as a modification example, the drive signal Vfs can be sequentially applied for each detection block of the plurality of signal lines SGL. In this case, some of the switches SWss1 which are connected to each of the plurality of signal lines SGL are turned on, and the others are turned off. In this case, it is preferable to apply the active shield method to the signal lines SGL, which are not selected, of the plurality of signal lines SGL. When the active shield method is applied to the signal line SGL not selected, the switches SWss1 which are connected to the respective signal lines SGL not selected are turned off, and the switches SWss2 (see FIG. 34) which are connected to the respective signal lines SGL not selected are turned on. Thus, influence of the parasitic capacitance which is formed between the signal lines SGL operating as the electrodes for pressure detection and the conductor pattern around the signal lines SGL can be reduced in the detection operation period FLfsy.

As described above, as illustrated in FIG. 35, in the present modification example, the scanning lines GCL are not utilized as the detection electrodes for pressure detection, but the drive electrodes COML are utilized as the detection electrode for pressure detection. The drive electrodes COML are wirings to be supplied with the drive signal Vcom in the display operation period FLdp. The drive signal Vcom is a signal having a different waveform from that of the drive signal Vfs. However, for example, even when the drive signal Vfs and the guard signal Vgd are supplied to the drive electrodes COML in the detection operation period FLfsx or the detection operation period FLfsx, such signals do not become a cause of erroneous display if the TFT element Tr (see FIG. 8) is turned on. Thus, in the example illustrated in FIG. 33, each of the plurality of drive electrodes COML and the detection circuit unit 40 are connected to each other without going through the capacitive element Cdc.

In the third embodiment, the description has been made as the modification example of the above first embodiment; however, as described in the above second embodiment, it can be applied to the display device including the pressure sensor and the touch sensor. In this case, as illustrated in FIG. 36, it is preferable that the unit frame FL1 includes the plurality of display operation periods FLdp, a touch detection operation period FLts for performing touch detection, the detection operation period FLfsx, and the detection operation period FLfsy. In the touch detection operation period FLts, for example, as described in the above second embodiment, a touch detection operation can be performed by using a touch sensor of the mutual-capacitance method. Alternatively, as a modification example, touch detection operation can be performed by using a touch sensor of the self-capacitance method. Further, the sensors of the mutual-capacitance method and the self-capacitance method can be used in combination.

FIG. 36 illustrates an example of including one touch detection operation period FLts in the unit frame FL1. However, as a modification example, a plurality of touch detection operation periods FLts which are time-divided can be included in the unit frame FL1. In this case, the touch detection operation period FLts and the display operation period FLdp are alternately performed.

The invention made by the inventor of the present application has been described based on the embodiments and typical modification examples; however, there are various modification examples. For example, in the embodiments described above, the display device has been disclosed using the liquid crystal layer as the display function layer; however, it is not limited thereto. For example, the technique described above can be applied to a routing wiring portion of a so-called organic EL-type display device using a light-emitting element composed of an organic compound as the display function layer. For example, the various modification examples described above can be applied in combination.

In the category of the idea of the present invention, a person with ordinary skill in the art can conceive various modification examples and revised examples, and such modification examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention can be applied for a display device and an electronic device incorporating the display device.

What is claimed is:

1. A display device comprising:
    a first substrate including a first surface and a second surface on an opposite side of the first surface;
    a display function layer provided on the first surface side of the first substrate;
    a plurality of first wirings provided on the first surface side of the first substrate and supplied with a signal for forming an image;
    a first conductive film provided on the second surface side of the first substrate so as to be separated from the first substrate; and
    a first circuit detecting a change in a capacitance value between the plurality of first wirings and the first conductive film,
    wherein pressure due to contact of an external object is calculated by the change in the capacitance value,
    a first layer is provided between the first substrate and the first conductive film, wherein a thickness of the first layer is larger than a thickness of the display function layer.
2. The display device according to claim 1,
    wherein the first layer is a hollow space or an elastic body whose elasticity is lower than that of the first substrate.
3. The display device according to claim 1,
    wherein a second conductive film overlapping with the plurality of first wirings is provided between the plurality of first wirings and the display function layer.
4. The display device according to claim 3,
    wherein a fixed potential or a pulse potential is supplied to the second conductive film, in a first detection operation period in which the first circuit performs a detection operation of the capacitance value.
5. The display device according to claim 1,
    wherein a first pulse potential different from a signal for forming the image is supplied to the plurality of first wirings, and a detection signal based on the first pulse potential is output to the first circuit via the plurality of first wirings, in a first detection operation period for detecting the change in the capacitance value between the plurality of first wirings and the first conductive film, and
    a ground potential is supplied to the first conductive film.
6. The display device according to claim 5,
    wherein the first conductive film is electrically separated from the first circuit.
7. The display device according to claim 5,
    wherein a second conductive film overlapping with the plurality of first wirings is provided between the plurality of first wirings and the display function layer, and the second conductive film is supplied with a pulse potential having the same waveform as that of the first pulse potential supplied to the plurality of first wirings, in the first detection operation period.
8. The display device according to claim 5,
    wherein the plurality of first wirings include a plurality of first direction wirings extending along a first direction along the first surface and a plurality of second direction wirings extending along a second direction along the first surface intersecting with the first direction, and
    the first conductive film is provided at a position overlapping with each of the plurality of first direction wirings and the plurality of second direction wirings, in a planar view.
9. The display device according to claim 8,
    wherein the first circuit includes a plurality of first detectors to which the detection signal from the plurality of first wirings is transmitted,
    the plurality of first detectors include a first direction detector outputting detection signals from the plurality of first direction wirings and a second direction detector outputting detection signals from the plurality of second direction wirings, and
    the detection signal from the first direction wirings and the detection signal from the second direction wirings are output in parallel, in the first detection operation period in which the first circuit performs a detection operation of the capacitance value.
10. The display device according to claim 8,
    wherein the first circuit includes a plurality of first detectors to which the detection signal from the plurality of first wirings is transmitted, and
    the first detection operation period in which the first circuit performs a detection operation of the capacitance value includes:
      a first direction detection operation period in which the detection signal from the plurality of first direction wirings is output to the plurality of first detectors; and
      a second direction detection operation period obtained by time-diving the first detection operation period into the first direction detection operation and the second direction detection operation and in which the detection signal from the plurality of second direction wirings is output to the plurality of first detectors.
11. The display device according to claim 8,
    wherein a coordinate of a position at which pressure is detected is calculated based on detection signals from the first direction wirings and detection signals from the second direction wirings.
12. The display device according to claim 5,
    wherein the plurality of first wirings extending along a first direction along a first surface of the first substrate and a plurality of second wirings extending along a second direction along the first surface of the first substrate, and intersecting with the first direction are provided on the first surface side,
    the display device further includes a second circuit detecting pressure due to contact of an external object by a change in a capacitance value between the plurality of second wirings and the first conductive film, and
    the first pulse potential is supplied to the plurality of second wirings, and a detection signal based on the first pulse potential is output to the second circuit via the plurality of first wirings, in a second detection operation period detecting the change in the capacitance value between the plurality of second wirings and the first conductive film.

13. The display device according to claim 12,
wherein each of the plurality of first wirings is a scanning line supplied with a scanning signal having a different waveform from that of the first pulse potential, in a display period for displaying the image, and
each of the plurality of first wirings is electrically connected to the first circuit via a capacitive element.

14. The display device according to claim 13,
wherein each of the plurality of second wirings is a signal line supplied with a video signal having a different waveform from that of the first pulse potential, in the display period for displaying the image, and
each of the plurality of second wirings is connected to the second circuit without going through the capacitive element.

15. The display device according to claim 13,
wherein each of the plurality of second wirings is a second conductive film supplied with a drive signal having a different waveform from that of the first pulse potential, in the display period for displaying the image, and
each of the plurality of second wirings is connected to the second circuit without going through the capacitive element.

16. The display device according to claim 1, further comprising:
a second substrate including a third surface opposite to the first surface of the first substrate and a fourth surface on an opposite side of the third surface;
a plurality of detection electrodes formed on the third surface or the fourth surface of the second substrate; and
a second circuit detecting a change in the capacitance value of the plurality of detection electrodes.

17. The display device according to claim 16,
wherein a second conductive film covering the plurality of first wirings is provided between the plurality of first wirings and the display function layer.

18. The display device according to claim 16,
wherein the first circuit is electrically connected to the second circuit.

19. The display device according to claim 18, further comprising
a semiconductor chip on which the first circuit and the second circuit are formed.

20. The display device according to claim 1, further comprising:
a second substrate including a third surface opposite to the first surface of the first substrate and a fourth surface on an opposite side of the third surface;
a plurality of detection electrodes formed on the third surface or the fourth surface of the second substrate;
a first detection operation period detecting the change in the capacitance value between the plurality of first wirings and the first conductive film by the first circuit; and
a second detection operation period detecting the change in the capacitance value between the plurality of detection electrodes by the first circuit.

21. A display device comprising:
a first substrate including a first surface and a second surface on an opposite side of the first surface;
a display function layer provided on the first surface side of the first substrate;
a plurality of first wirings provided on the first surface side of the first substrate and supplied with a signal for forming an image;
a first conductive film provided on the second surface side of the first substrate;
a first layer which is provided between the first substrate and the first conductive film and is elastically deformed more easily than the first substrate; and
a first circuit detecting a change in a capacitance value between the plurality of first wirings and the first conductive film,
wherein a thickness of the first layer is larger than a thickness of the display function layer.

* * * * *